(12) United States Patent
Chou et al.

(10) Patent No.: US 11,733,151 B2
(45) Date of Patent: *Aug. 22, 2023

(54) ASSAY DETECTION, ACCURACY AND RELIABILITY IMPROVEMENT

(71) Applicant: Essenlix Corporation, Monmouth Junction, NJ (US)

(72) Inventors: Stephen Y. Chou, Princeton, NJ (US); Wu Chou, Basking Ridge, NJ (US); Xing Li, Metuchen, NJ (US); Hongbing Li, Skillman, NJ (US); Yuecheng Zhang, Yardley, PA (US); Mingquan Wu, Princeton Junction, NJ (US); Wei Ding, Princeton, NJ (US); Jun Tian, Belle Mead, NJ (US)

(73) Assignee: Essenlix Corporation, Monmouth Junction, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/284,083

(22) PCT Filed: Apr. 6, 2020

(86) PCT No.: PCT/US2020/026959
§ 371 (c)(1),
(2) Date: Apr. 9, 2021

(87) PCT Pub. No.: WO2020/206464
PCT Pub. Date: Oct. 8, 2020

(65) Prior Publication Data
US 2021/0312621 A1 Oct. 7, 2021

Related U.S. Application Data

(63) Continuation-in-part of application No. PCT/US2019/048678, filed on Aug. 28, 2019, and a
(Continued)

(51) Int. Cl.
*G01N 15/14* (2006.01)
*G06T 7/62* (2017.01)
(Continued)

(52) U.S. Cl.
CPC ......... *G01N 15/1475* (2013.01); *G06N 20/00* (2019.01); *G06T 7/0012* (2013.01);
(Continued)

(58) Field of Classification Search
None
See application file for complete search history.

(56) References Cited

U.S. PATENT DOCUMENTS

| 10,043,054 B2 | 8/2018 | Remiszewski et al. |
| 2006/0171572 A1* | 8/2006 | Breeuwer ............... G06T 7/00 382/128 |

(Continued)

FOREIGN PATENT DOCUMENTS

WO 2015054695 A2 4/2015

OTHER PUBLICATIONS

International Preliminary Report on Patentability for PCT/US20/26959 established by IPEA/US completed on Mar. 31, 2021.
(Continued)

*Primary Examiner* — Nancy Bitar

(57) ABSTRACT

The present invention is related to, among other things, the devices and methods that improve the accuracy and reliability of an assay, even when the assay device and/or the operation of the assay device has certain errors, and in some embodiments the errors are random.

27 Claims, 13 Drawing Sheets

Related U.S. Application Data continuation-in-part of application No. PCT/US2019/046971, filed on Aug. 16, 2019.

(60) Provisional application No. 62/830,311, filed on Apr. 5, 2019.

(51) Int. Cl.
    *G06T 7/00*    (2017.01)
    *G06T 7/40*    (2017.01)
    *G06T 7/10*    (2017.01)
    *G06N 20/00*    (2019.01)

(52) U.S. Cl.
    CPC ............... *G06T 7/10* (2017.01); *G06T 7/40* (2013.01); *G06T 7/62* (2017.01); *G06T 2207/10056* (2013.01); *G06T 2207/30004* (2013.01); *G06T 2207/30024* (2013.01); *G06T 2207/30204* (2013.01)

(56) References Cited

U.S. PATENT DOCUMENTS

| | | | |
|---|---|---|---|
| 2013/0282609 A1* | 10/2013 | Au | G06Q 50/265 705/325 |
| 2014/0038206 A1 | 2/2014 | Holmes et al. | |
| 2014/0051187 A1* | 2/2014 | Evers | G01N 21/552 436/501 |
| 2017/0097342 A1 | 4/2017 | Sundvor et al. | |
| 2017/0323435 A1* | 11/2017 | Minekawa | H01L 22/20 |
| 2018/0156775 A1* | 6/2018 | Chou | A61B 5/0935 |
| 2018/0202903 A1 | 7/2018 | Chou et al. | |
| 2018/0322327 A1* | 11/2018 | Smith | G06V 20/698 |
| 2018/0322941 A1* | 11/2018 | Krishnan | G16H 40/63 |
| 2021/0210205 A1* | 7/2021 | Drake | G16H 50/70 |

OTHER PUBLICATIONS

Written Opinion of the International Searching authority for PCT/US20/26959 established by ISA/US completed on Jul. 20, 2020.

* cited by examiner

ASSAY DETECTION, ACCURACY AND RELIABILITY IMPROVEMENT

CROSS-REFERENCE

This application is a National Stage entry (§ 371) application of International Application No. PCT/US2020/026959, filed on Apr. 6, 2020, which claims the benefit of priority of U.S. Provisional Patent Application No. 62/830,311, filed on Apr. 5, 2019, and is a continuation-in-part of International Patent Application No. PCT/US2019/048678, filed on Aug. 28, 2019, which claims the benefit of U.S. Provisional Application Ser. No. 62/742,247, filed on Oct. 5, 2018, and 62/724,025, filed on Aug. 28, 2018; this application is also a continuation-in-part of International Patent Application No. PCT/US2019/046971, filed on Aug. 16, 2019, which claims the benefit of U.S. Provisional Application Ser. No. 62/764,886, filed on Aug. 16, 2018, 62/719,129, filed on Aug. 16, 2018, 62/764,887, filed on Aug. 16, 2018, and 62/719,201, filed on Aug. 17, 2019 the contents of which are relied upon and incorporated herein by reference in their entirety. The entire disclosure of any publication or patent document mentioned herein is entirely incorporated by reference.

FIELD

Among other things, the present invention is related to devices and methods of performing biological and chemical assays, particularly related to an improvement in assay detection accuracy, and reliability when the assays are performed under imperfect conditions with distortions and random variables (e.g. limited resource setting).

BACKGROUND

In assaying a biomarker in a sample from a subject (e.g. human) for diagnostic a disorder or diseases, the accuracy of the assay is essential. A wrong result can be harmful to the subject. Traditionally, an accuracy of an assay is achieved by a "perfect protocol paradigm"—namely, performing everything, including a sample handling, precisely. Such approach needs a complex machines, professional operation, ideal environments, etc. to ensure a "perfect" assay device and "perfect" assay performance and operation. However, there are a great need to develop systems and methods that improve the accuracy of an assay that comprising at least one parameters each having an error which can come from the assay device or an operation of the device, and the error can be random depending on a particular device or a particular operation.

SUMMARY

The present invention is related to, among other things, the devices and methods that improve the accuracy and reliability of an assay, even when the assay device and/or the operation of the assay device has certain errors, and in some embodiments the errors are random.

One aspect of the present invention is to overcome the random errors or imperfections of an assay device or the operation of the assay device by measuring, in addition to measuring the analyte in a sample to generate an analyte test result, the trustworthiness of the analyte test result. The analyte test result will be reported, only when the trustworthiness meets a predetermined threshold, otherwise the analyte test result will be discarded.

In some embodiments, the trustworthy measurement is performed by imaging one or more parameters of the sample being assayed and processing the images using an algorithm.

In some embodiments, one or more monitoring structures (i.e. pillar arrays) are placed on the sample contact area of a sample holder to provide information for the trustworthy measurement.

One aspect of the present invention is to overcome distortion of an optical system in an image-based assay by having a monitoring marks on the sample holder, where one or more optical properties of the monitoring marks for an optical system without a distortion are determined prior an assay testing. The monitoring mark are imaged together with the sample using the optical system with distortion. An algorithm is used to compare the monitoring mark in the optical system with distortion with that without distortion to correct the distortions in image-based assay.

In some embodiments, the algorithm is a machine learning model.

In some embodiments, a method for improving the accuracy of an assay that detects an analyte in a sample, wherein one or more parameters of the assay have a random variation, the method comprising:

detecting, using the assay, the analyte in the sample, generating a detection result;

determining trustworthiness of the detection result by (i) imaging the sample in the assay and (ii) processing the image(s) using an algorithm; and reporting the detection result, only when the trustworthiness meets a predetermined threshold.

In some embodiments, an apparatus for improving the accuracy of an assay that detects an analyte in a sample, wherein one or more parameters of the assay have a random variation, the apparatus comprising:

an assay that detects the analyte in the sample to generating a detection result, wherein the assay has a sample holder; and an imager that images the sample in the sample holder; and a non-transitory storage medium that stores an algorithm that determines, using the images, the trustworthiness of the detection result.

In some embodiments, the method in any prior embodiments further comprising using one or more monitoring marks on a sample holder on the assay and imaging the monitoring marks in the images for determination of the trustworthiness, wherein the monitoring marks have a predetermined optical property in the manufacturing of the sample holder.

In some embodiments, the apparatus in any prior embodiment further comprising one or more monitoring marks on the sample holder, wherein the monitoring marks have a predetermined optical property in the manufacturing of the sample holder and are imaged in the images for determination of the trustworthiness.

In some embodiments, a method for improving the accuracy of an image-based assay that detects an analyte in a sample, wherein the assay has an optical system with a distortion, the method comprising:

having a sample holder having a sample contact surface, wherein (i) a sample forming a thin layer of 200 nm thick or less on the sample contact surface, and (ii) one or more monitoring marks on the sample on the sample contact surface, wherein the monitoring marks have a first set of parameters predetermined during the manufacturing of the sample holder;

using the optical system of the assay to take one or more images of the sample in the sample holder together with the monitoring marks, wherein the monitoring marks having a second set of parameters in the images;

processing the one or more images using a processor, wherein the processor detects distortion of the optical system by using the algorithm and the first set and the second set of the parameters.

In some embodiments, an apparatus for improving the accuracy of an image-based assay that detects an analyte in a sample, wherein the assay has an optical system with a distortion, the apparatus comprising:

a sample holder having a sample contact surface, wherein (i) a sample forming a thin layer of 200 nm thick or less on the sample contact surface, and (ii) one or more monitoring marks on the sample on the sample contact surface, wherein the monitoring marks have a first set of parameters predetermined during the manufacturing of the sample holder;

an optical system of the assay to take one or more images of the sample in the sample holder together with the monitoring marks, wherein the monitoring marks having a second set of parameters in the images;

a processor with a non-transitory storage medium that stores an algorithm that process the one or more images and correct distortion of the optical system by using the algorithm and the first set and the second set of the parameters.

In some embodiments, the method in any prior embodiment, wherein the algorithm is a machine learning model.

In some embodiments, the method in any prior embodiment, wherein the trustworthiness comprising (1) edge of blood, (2) air bubble in the blood, (3) too small blood volume or too much blood volume, (4) blood cells under the spacer, (5) aggregated blood cells, (6) lysed blood cells, (7) over exposure image of the sample, (8) under exposure image of the sample, (8) poor focus of the sample, (9) optical system error as wrong lever position, (10) not closed card, (12) wrong card as card without spacer, (12) dust in the card, (14) oil in the card, (14) dirty out of the focus plane one the card, (15) card not in right position inside the reader, (16) empty card, (17) manufacturing error in the card, (18) wrong card for other application, (19) dried blood, (20) expired card, (21) large variation of distribution of blood cells, (22) none blood sample or (23) none targeted blood sample.

In some embodiments, the method in any prior embodiment, wherein the algorithm is machine learning.

In some embodiments, the method in any prior embodiment, wherein the sample comprises at least one of parameters that has a random variation, wherein the parameter comprises having dusts, air bubble, non-sample materials, or any combination of thereof.

In some embodiments, the method in any prior embodiment, wherein the assay is a cellular assay, immunoassay, nucleic acid assay, colorimetric assay, luminescence assay, or any combination of thereof.

In some embodiments, the method in any prior embodiment, wherein the assay device comprises two plates facing each other with a gap, wherein at least a part of the sample is inside of the gap.

In some embodiments, the method in any prior embodiment, wherein the assay device comprises a QMAX, comprising two plates movable to each other and spacers that regulate the spacing between the plates.

In some embodiments, the method in any prior embodiment, wherein some of the monitoring structures are periodically arranged.

In some embodiments, the method in any prior embodiment, wherein the sample is selected from cells, tissues, bodily fluids, and stool.

The apparatus and the method of any prior claim, wherein the sample is amniotic fluid, aqueous humour, vitreous humour, blood (e.g., whole blood, fractionated blood, plasma, serum, etc.), breast milk, cerebrospinal fluid (CSF), cerumen (earwax), chyle, chime, endolymph, perilymph, feces, gastric acid, gastric juice, lymph, mucus (including nasal drainage and phlegm), pericardial fluid, peritoneal fluid, pleural fluid, pus, rheum, saliva, sebum (skin oil), semen, sputum, sweat, synovial fluid, tears, vomit, urine, or exhaled breath condensate.

The apparatus and the method of any prior claim, wherein the analyte comprising a molecule (e.g., a protein, peptides, DNA, RNA, nucleic acid, or other molecule), a cell, a tissue, a virus, and a nanoparticle.

The apparatus and the method of any prior claim, wherein the samples are the samples that are non-flowable but deformable.

The apparatus and the method of any prior claim, wherein the algorithm is machine learning, artificial intelligence, statistical methods, or a combination of thereof.

The apparatus and method of any prior embodiment, wherein the spacers are the monitoring mark, wherein the spacers have a substantially uniform height that is equal to or less than 200 microns, and a fixed inter-spacer-distance (ISD).

The apparatus and method of any prior claim, wherein the monitoring mark is used for estimating the TLD (true-lateral-dimension) and true volume estimation.

The apparatus and method of any prior claim, wherein step (b) further comprises an image segmentation for image-based assay.

In some embodiments, the method in any prior embodiment, wherein step (b) further comprises a focus checking in image-based assay.

In some embodiments, the method in any prior embodiment, wherein step (b) further comprises an Evenness of analyte distribution in the sample.

In some embodiments, the method in any prior embodiment, wherein step (b) further comprises an analyze and detection for aggregated analytes in the sample.

In some embodiments, the method in any prior embodiment, wherein step (b) further comprises an analyze for dry-texture in the image of the sample in the sample.

In some embodiments, the method in any prior embodiment, wherein step (b) further comprises an analyze for defects in the sample.

In some embodiments, the method in any prior embodiment, wherein step (b) further comprises a correction of camera parameters and conditions as distortion removal, temperature correction, brightness correction, contrast correction.

BRIEF DESCRIPTION OF THE DRAWINGS

The skilled artisan will understand that the drawings, described below, are for illustration purposes only. The drawings are not intended to limit the scope of the present teachings in any way. The drawings are not entirely in scale. In the figures that present experimental data points, the lines that connect the data points are for guiding a viewing of the data only and have no other means.

DETAILED DESCRIPTION OF EXEMPLARY EMBODIMENTS

The following detailed description illustrates some embodiments of the invention by way of example and not by way of limitation. The section headings and any subtitles used herein are for organizational purposes only and are not to be construed as limiting the subject matter described in any way. The contents under a section heading and/or subtitle are not limited to the section heading and/or subtitle, but apply to the entire description of the present invention.

The citation of any publication is for its disclosure prior to the filing date and should not be construed as an admission that the present claims are not entitled to antedate such publication by virtue of prior invention. Further, the dates of publication provided can be different from the actual publication dates which can need to be independently confirmed.

The terms "trustworthiness", "error risk", "error risk factor" and "risk factor" are interchangeable terms to describe a likelihood of a test result being inaccurate. More "trustworthy" means less "likelihood", (i.e. less a risk) and hence a lower "risk factor".

The terms "instruction" and "arithmetic" are interchangeable.

The term of "imaging based assay" refers to an assay comprising an imager in detecting an analyte in a sample. Improving Assay Accuracy by Checking Trustworthiness of a Test Result Example of reliability based test reporting to improve the test accuracy. In many assaying situations, there are random variations in an assay's operation, sample handling, and other processes related to an assay operation, and these random variations can affect the assay's test result accuracy.

Figure 1:
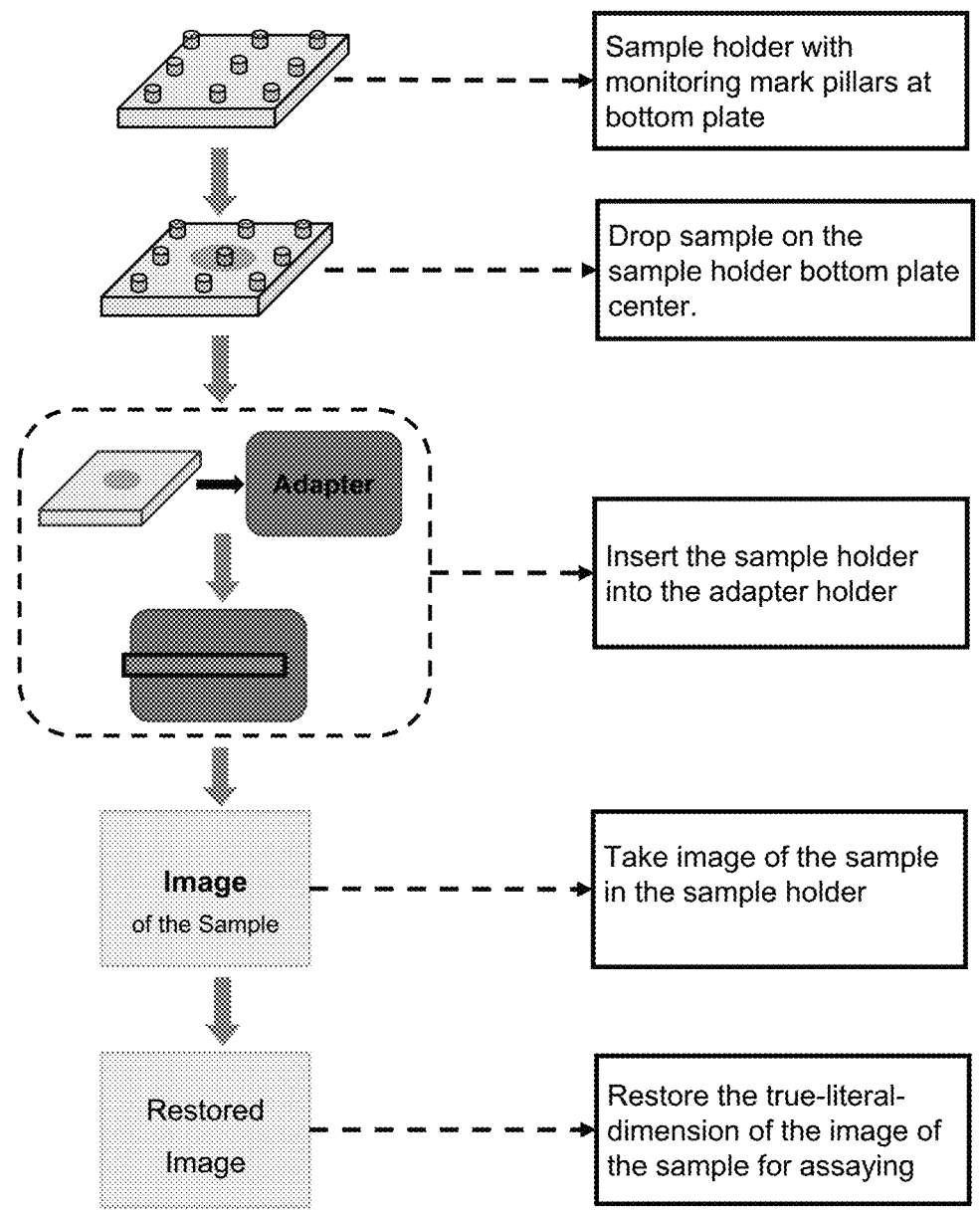
FIG. 1 shows a flow chart of the image-based assay using a special sample holder.

In according to the present invention, monitoring structures for monitoring an assay operation parameter are placed on the sample holder (in some embodiments in the sample area that is being tested). As an example shown in the flowchart in FIG. 1, during a test, both an analyte in a sample and the monitoring structures are measured (either in parallel or sequentially), and from the monitoring structure measurements it determines, through an instruction (a non-transitory storage medium to store the instruction), to determine a trustworthy of the analyte measurement. If the trustworthy is higher than a threshold (i.e. a risk factor is lower than a threshold), the analyte measurement result will be reported, otherwise the analyte measurement result will not be reported.

If an analyte measurement result is not reported due to a poor trustworthy (higher than a threshold, optionally, a second sample and/or second test will be tested in the same manner as that in the first. Should the second sample and/or test still has a poor trustworthy, the third sample and/or test will be performed. The process can be continued until a trustworthy analyte measurement result is reported.

Figure 2:
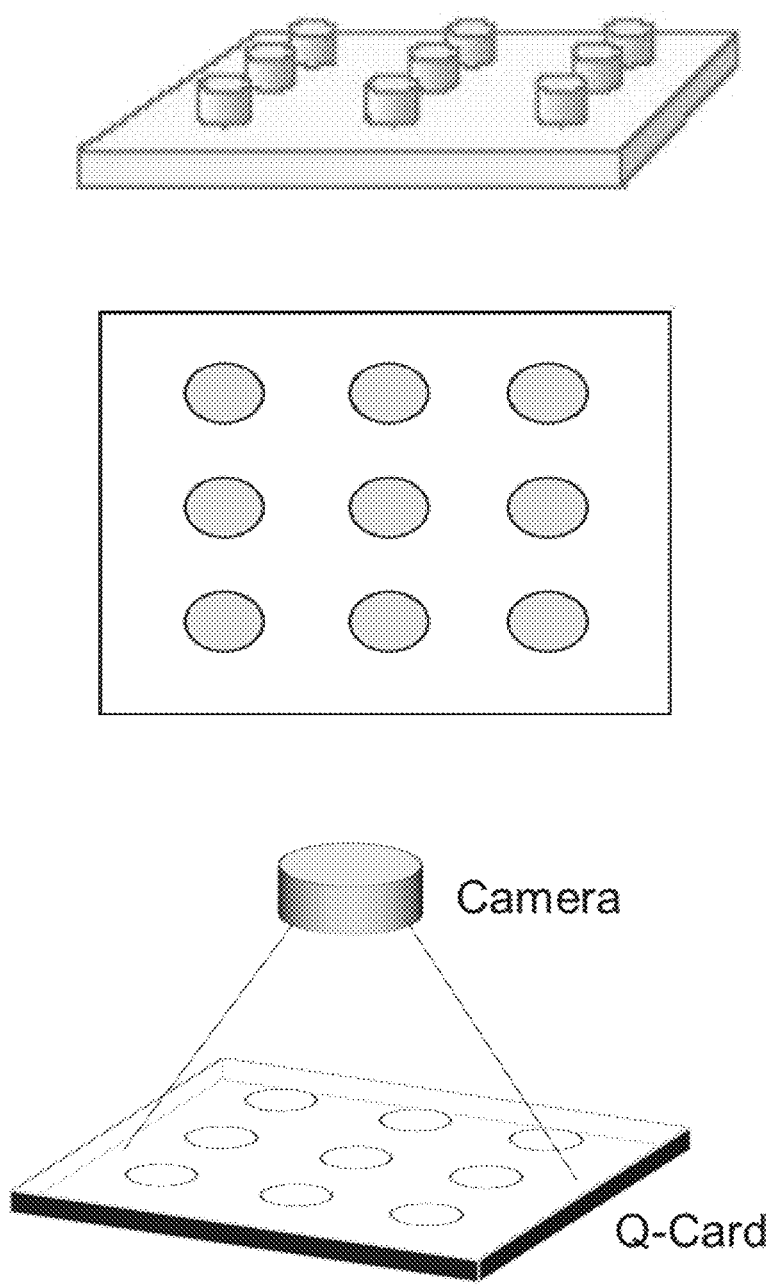
FIG. 2 shows side view and top views of the sample holder, Q-card, with monitoring mark pillars.

Example of monitoring structures include, but not limited to the spacers, scale marks, imaging marks, and location marks on a Q-Card (i.e. QMAX Card). FIG. 2 is a diagram of the sample holder Q-card. The monitoring parameters include, but not limited to, images of the monitoring structures, light transmission, light scattering, color (wavelength spectrum), polarization, etc. The monitoring parameter also include the sample images on the Q-Card. The instruction of determining trustworthy or not can be pertained by performing tests under various conditions that are deviate from an ideal one. In some embodiments, machine learning is used to learn how to determine a threshold of a trustworthy.

In some embodiments, the monitoring parameters are related to the sample holders operation and conditions, sample conditions, or reagent condition, or measurement instrument conditions.

A method for improve test result accuracy of an assay, the method comprising:

having a sample holder with a monitoring mark;

having a sample on the sample holder, wherein the sample is suspected to contain or contains an analyte;

measuring the analyte to generate an analyte measurement result (i.e. test result), and measuring the monitoring mark to generate a monitoring parameter, either in parallel or in sequential;

determining, using an instruction and the monitoring parameter, a trustworthy of the analyte measuring result;

determining a publishing of the analyte measuring result.

Figure 3:
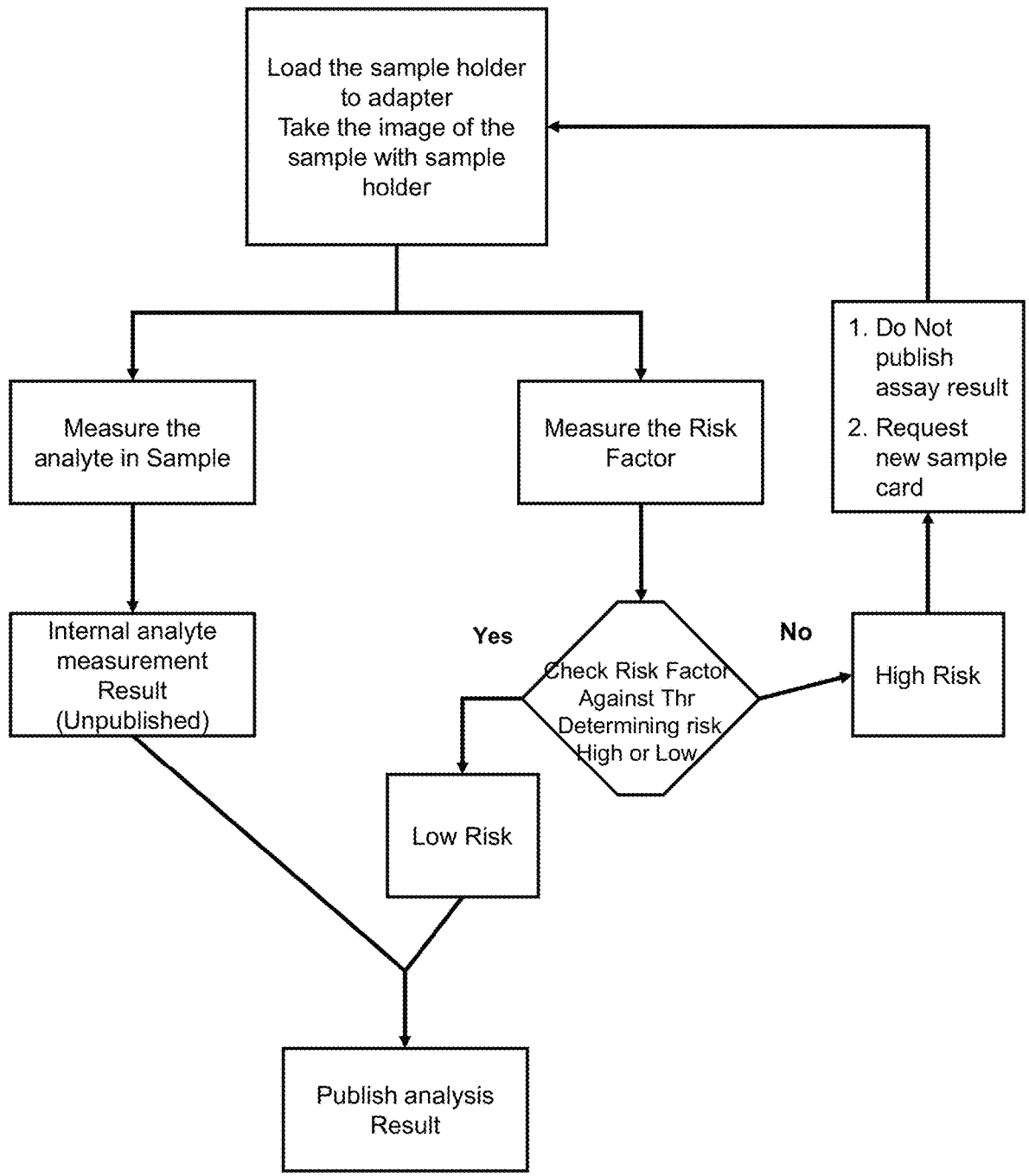
FIG. 3 shows the block diagram of with parallel trustworthy risk estimation.
Figure 4:
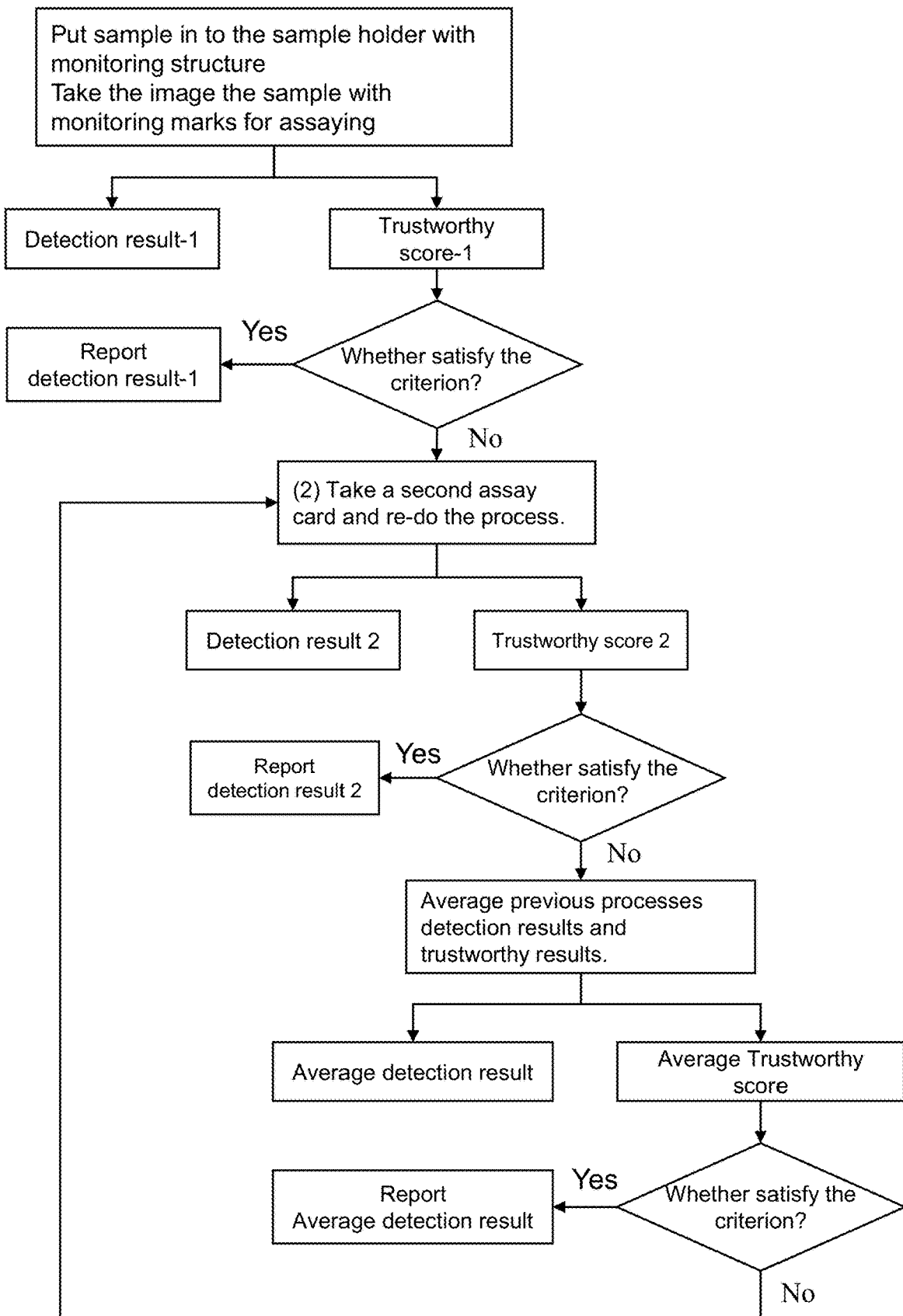
FIG. 4 shows the control flow of imaged-based assay with trustworthy risk estimation.

FIG. 3 shows a diagram of assaying with the trustworthy checking, and in some embodiments, the analyte measuring results published only when the trustworthy is high (the risk factor is low). In some embodiments, when the trustworthy is low, the analyte measuring result will not be published. In some embodiments, when the trustworthy is low, the analyte measuring result of a fires sample will not be published and a second sample will be used to go through the same process as described above. In some embodiments, the process are repeated until a high trustworthy analyte measurement result is achieved.

The device for improving test accuracy by measuring the monitoring parameters, comprising: sample cards with monitoring structures, imagers, and a media that stores an instruction for determining the trustworthiness of a test result.

Examples for Methods and Apparatus of Mobile Assaying (with QMAX Card)—Concentration Estimation (CBC), Segmentation, Etc. With Image Processing and Machine Learning AA-1. A method for correcting a system error of an image system containing a thin-layer sample, the method comprising:

receiving, by a processing device of the image system, an image and first parameters associated with a sample card comprising a sample and a monitor standard;

determine, by the processing device using a first machine learning model, the system error of the image system by comparing the first parameters with second parameters associated with the monitor standard determined during manufacture of the sample card;

correcting, by the processing device, the image of the sample card taking into account the system error; and determining, by the processing device using the corrected image, a biological property of the sample.

AA-2. The method of Example AA-1, wherein the monitor standard comprises a plurality of nanostructures on a plate of the sample card, and wherein the sample is deposited on the plate.

AA-3. The method of Example AA-1, wherein the sample is a biological sample collected from an animal.

Figure 5:
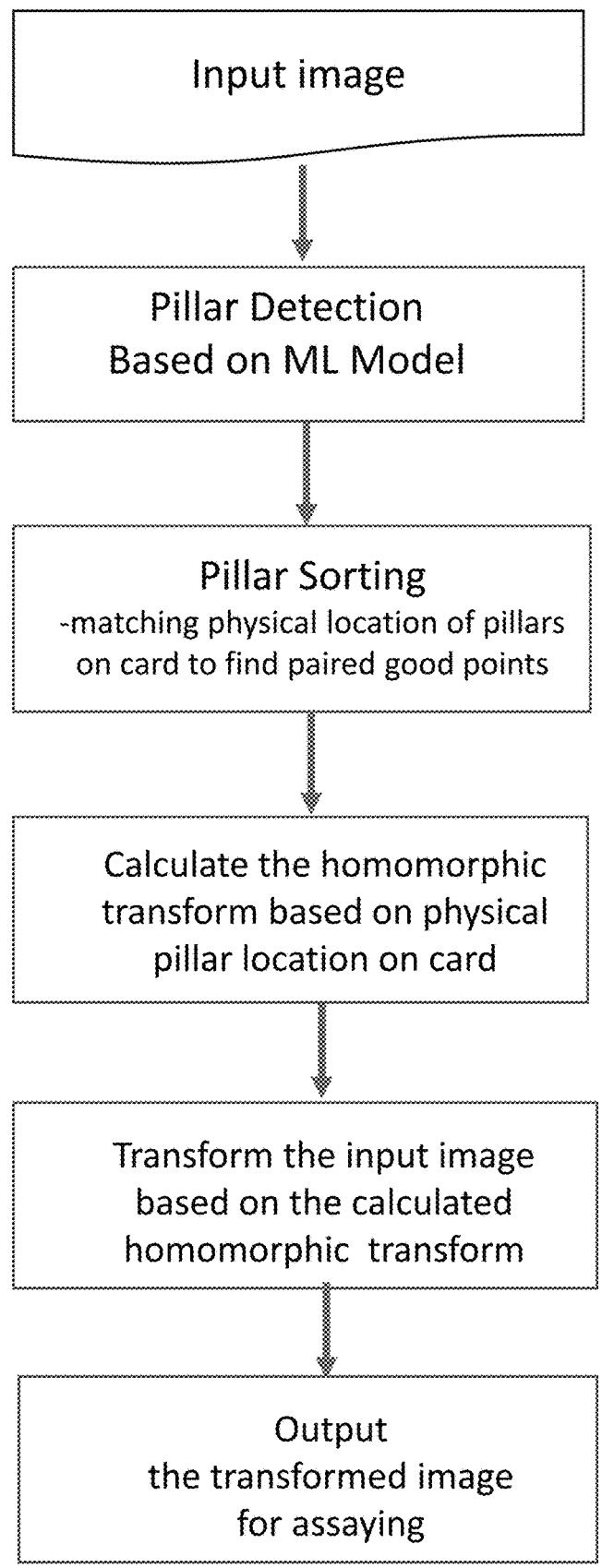
FIG. 5 shows the flow diagram of true-lateral-dimension correction using a trained machine learning model for pillar detection.

FIG. 5 shows a flow chart for true-lateral-dimension (TLD) estimation with pillars and using markers (pillars) to do image correction from the imaging of Q-card BA-1. An intelligent assay monitor method, comprising:

receiving, by a processing device, an image encoding first information of a biological sample deposited in a sample card and second information of a plurality of monitor marks;

determining, by the processing device executing a first machine learning model on the image, a measurement of a geometric feature associated with the plurality of monitor marks;

determining, by the processing device, a variation between the measurement of the geometric feature with a ground truth value of the geometric feature provided with the sample card;

correcting, by the processing device based on the variation, the image encoding the first information and the second information; and determining, by the processing device using the corrected image, a biological property of the biological sample.

BA-2. The method of Example BA-1, wherein the sample card comprises a first plate, a plurality of pillars that are substantially perpendicularly integrated to a surface of the first plate, and a second plate capable of enclosing the first plate to form a thin layer in which the biological sample is deposited.

BA-3. The method of Example BA-2, wherein the plurality of monitor marks corresponds to the plurality of pillars.

BA-4. The method of Example BA-3, wherein at least two of the plurality of pillars are separated by a true-lateral-dimension (TLD), and wherein determining, by the processing device executing a first machine learning model on the image, a measurement of a geometric feature associated with the plurality of monitor marks comprises determining, by the processing device executing the first machine learning model on the image, the TLD.

Figure 6:
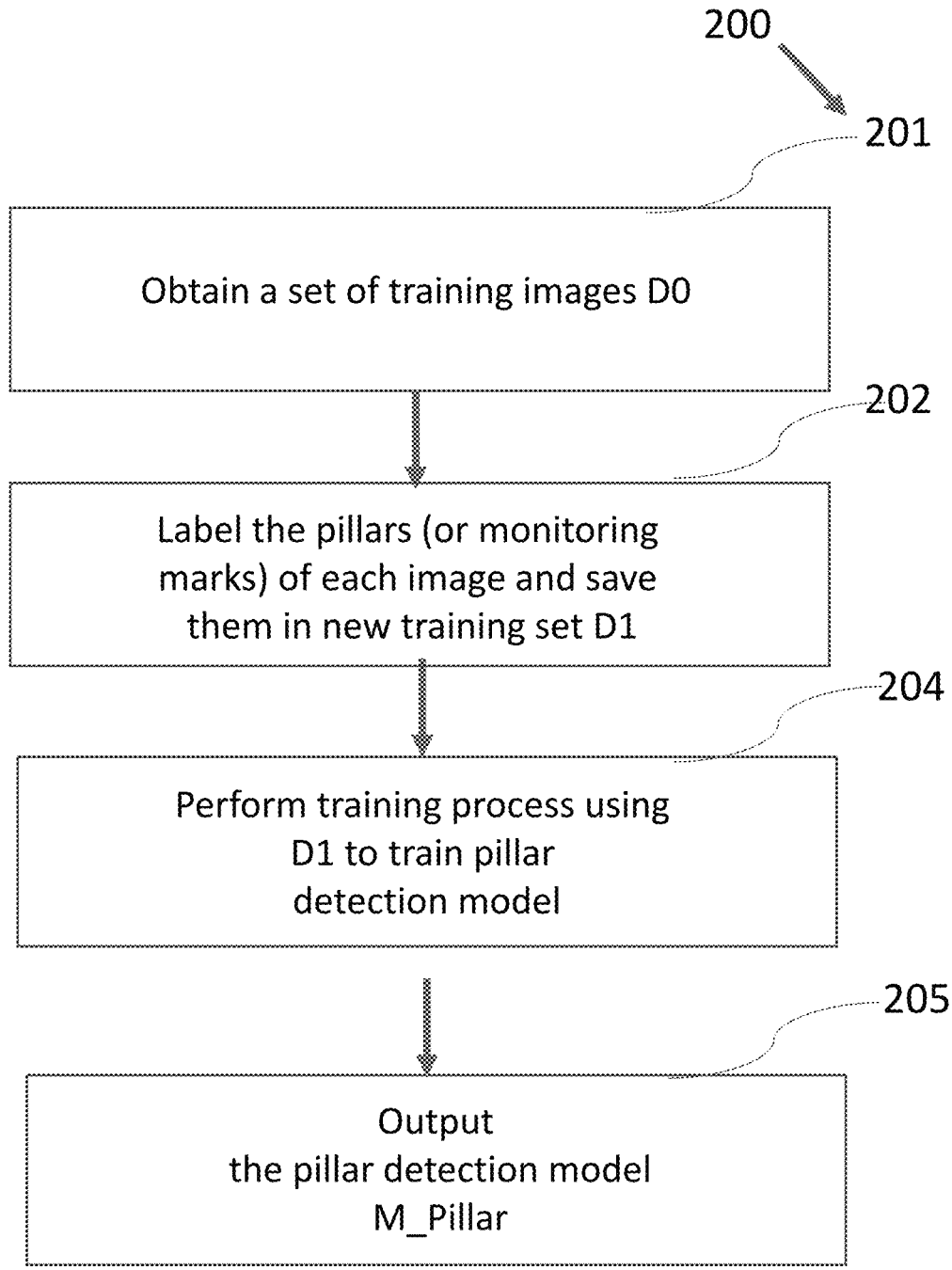
FIG. 6 shows the flow diagram of training a machine learning (ML) model for detecting pillars from the image of the sample.
Figure 7:
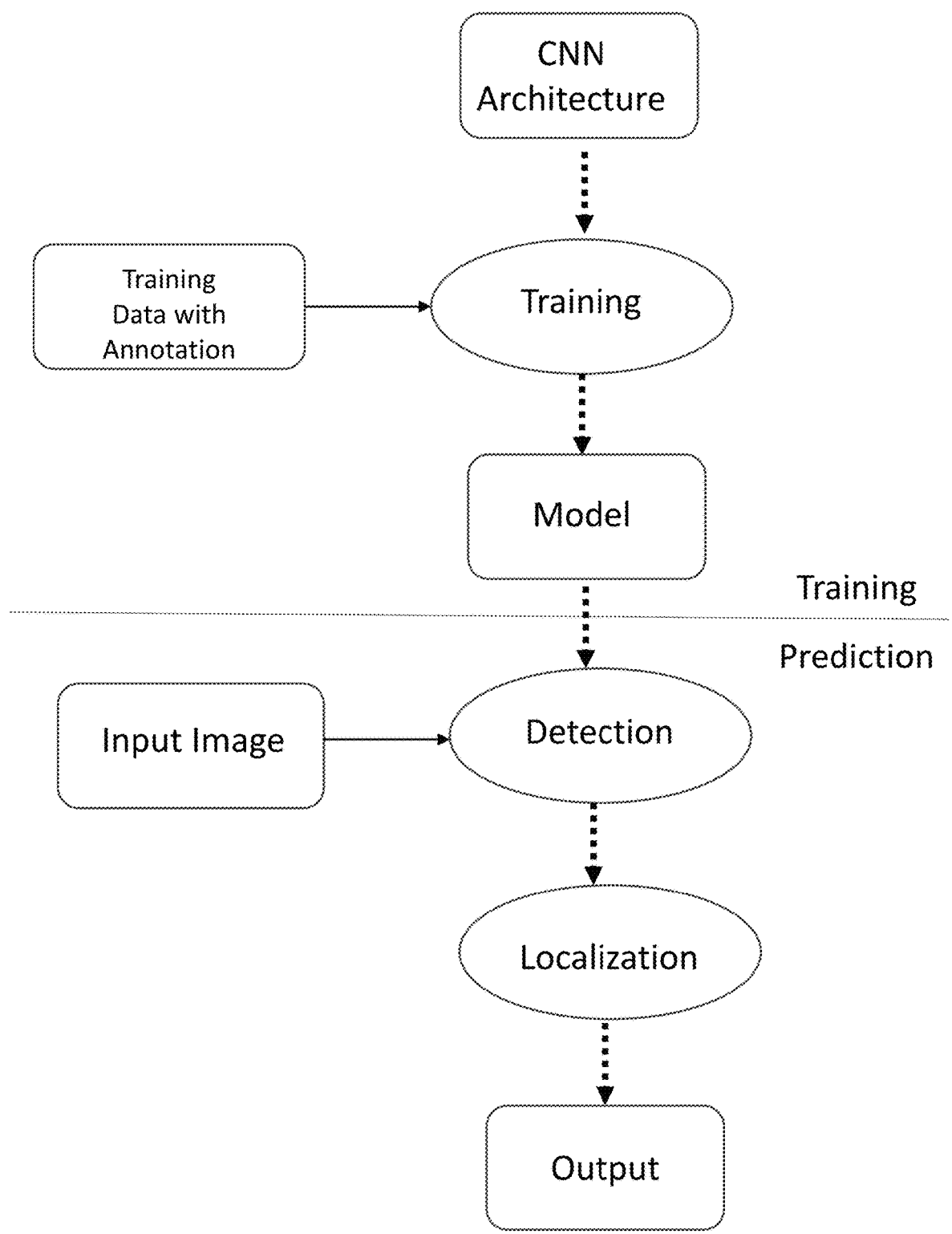
FIG. 7 shows a diagram showing the relation between training a machine learning model and apply the trained machine learning model in predication (inference)

FIG. 6 shows the flow diagram of training a machine learning model for pillar detection in TLD correction using monitoring mark pillars. FIG. 7 shows the relation between training a machine learning model and applying the trained machine learning model in predication (inference)

BB-1 An image system, comprising:

a sample card comprising a first plate, a plurality of pillars substantially perpendicularly integrated to a surface of the first plate, and a second plate capable of enclosing the first plate to form a thin layer in which the biological sample is deposited;

a computing device comprising:

a processing device, communicatively coupled to an optical sensor, to:

receive, from the optical sensor, an image encoding first information of a biological sample deposited in the sample card and second information of a plurality of monitor marks;

determine, using a first machine learning model on the image, a measurement of a geometric feature associated with the plurality of monitor marks;

determine a variation between the measurement of the geometric feature with a ground truth value of the geometric feature provided with the sample card;

correct, based on the variation, the image encoding the first information and the second information; and determine, based on the corrected image, a biological property of the biological sample.

Detection of Objects on Pillars for Improper Closing Detection of the Card in Assaying CA-1. A method for correcting human operation errors recorded in an assay image of a thin-layer sample, the method comprising:

receiving, by a processing device of an image system, an image of a sample card comprising a sample and a monitor standard, wherein the monitor standard comprises a plurality of nanostructures integrated on a first plate of the sample card, and wherein the sample is deposited on the first plate in an open configuration of the sample card and is enclosed by a second plate of the sample card in a close configuration of the sample card;

segmenting, by the processing device, the image into first sub-regions corresponding to the sample and second sub-regions corresponding to the plurality of nanostructures;

comparing, by the processing device, the second sub-regions with the monitor standard provided during manufacture of the sample to determine whether at least one of the second sub-regions contains a foreign object other than the nanostructures;

responsive to determining that at least one of the second sub-regions contains a foreign object other than the nanostructures, determining an error associated with operating the sample card; and correcting the image of the sample card by removing the at least one sub-region from the image.

CA-2. The method of Example CA-1, wherein the foreign object is one of a portion of the sample, an air bubble, or an impurity.

Examples for Defects (e.g. Air Bobble, Dust, Etc.) and Auxiliary Structure (e.g. Pillars) Removal in Assaying DA-1. A method for measuring a volume of a sample in a thin-layered sample card, the method comprising:

receiving, by a processing device of an image system, an image of a sample card comprising a sample and a monitor standard, wherein the monitor standard comprises a plurality of pillars perpendicularly integrated to a first plate of the sample, and each of the plurality of pillars has a substantially identical height (H);

determining, by the processing device using a machine learning model, a plurality of non-sample sub-regions, wherein the plurality of non-sample sub-regions correspond to at least one of a pillar, an air bubble, or an impurity element;

calculating, by the processing device, an area occupied by the sample by removing the plurality of non-sample sub-regions from the image;

calculating, by the processing device, a volume of the sample based on the calculated area and the height (H) and determining, by the processing device based on the volume, a biological property of the sample.

Examples of Determining the Trustworthy of the Assay Results a. Shape segmentation combining ML based bounding box detection and image processing-based shape determination b. Evenness of analyte detection in assaying (IQR based outlier detection)

c. Aggregated analytes detection using ML d. Dry texture on the card detection using ML e. Defects, e.g. dust, oil, etc. detection using ML f. Air bubble detection using ML EA-1. A method for determining a trustworthy of measurement associated with an image assay result, the method comprising:

receiving, by a processing device of an image system, an image of a sample card comprising a sample and a monitor standard comprising a plurality of nanostructures integrated to a first plate of the sample;

segmenting, by the processing device, the image into first sub-regions corresponding to the sample and second sub-regions corresponding to the plurality of nanostructures;

determining, by the processing device using a first machine learning model, non-compliant elements in at least one of the first sub-regions or the second sub-regions;

determining, by the processing device based on the first sub-regions and the second sub-regions, a biological property of the sample;

calculating, by the processing device based on a statistical analysis of the non-compliant elements, the trustworthy measurement associated with the biological property; and determining, by the processing device based on the trustworthy measurement, a further action to the sample.

EA-2. The method of Example EA-1, further comprising:

determining, by the processing device based on the trustworthy measurement, that the biological property is reliable; and providing, by the processing device, the biological property to a display device.

EA-3. The method of Example EA-1, further comprising:

determining, by the processing device based on the trustworthy measurement, that the biological property is less than reliable; and providing, by the processing device, the biological property and the corresponding trustworthy measurement to a display device to allow a user to determine whether to accept or discard the biological property.

EA-4. The method of Example EA-1, wherein segmenting, by the processing device, the image into first sub-regions corresponding to the sample and second sub-regions corresponding to the plurality of nanostructures:

performing, by the processing device using an image processing method, a first image segmentation on the image to generate a first segmentation result;

performing, by the processing device using a second machine learning model, a second image segmentation on the image to generate a second segmentation result; and combining, by the processing device, the first segmentation result and the second segmentation result to segment the image into the first sub-regions corresponding to the sample and the second sub-regions corresponding to the plurality of nanostructures.

EA-5. The method of Example EA-1, wherein determining, by the processing device using a first machine learning model, non-compliant elements in at least one of the first sub-regions or the second sub-regions comprises: at least one of determining, by the processing device, the non-compliance elements based on a distribution unevenness of at least one analyte in the sample;

determining, by the processing device, the non-compliance elements based on aggregated analyte detection of the sample;

determining, by the processing device, the non-compliance elements based on detection of dry texture in the sample;

determining, by the processing device, the non-compliance elements based on detection of impurities in the sample; or determining, by the processing device, the non-compliance elements based on detection of air bubbles in the sample.

Multi-Segmented Testing on a Single Card with Content Based on Segmentation

FA-1. A method for determining measurements of multiple analytes using a single sample card, the method comprising:

receiving, by a processing device of an image system, an image of a sample card comprising a sample and a monitor standard, wherein the monitor standard comprises a plurality of nanostructures integrated to a first plate of the sample;

segmenting, by the processing device using a first machine learning model, the image into first sub-regions associated with a first analyte contained in the sample, second regions associated with a second analytes contained in the sample, and third sub-regions corresponding to the plurality of nanostructures;

determining, by the processing device based on the third sub-regions corresponding to the plurality of nanostructures, a true lateral distance (TLD) between two adjacent nanostructures;

determining, by the processing device based on the TLD, a first accumulative area of the first sub-regions and further determining a first volume based on the first accumulative area and a height associated with the plurality of nanostructures;

determining, by the processing device based on the TLD, a second accumulative area of the sub-regions and further determining a second volume based on the second accumulative area and the height associated with the plurality of nanostructures;

determining, by the processing device based on a count of the first analyte in the first volume, a first measurement of the first analytes; and determining, by the processing device based on a count of the second analyte in the second volume, a second measurement of the second analytes.

System and Apparatus of Pillar-Based Spectrophotometer

GA-1. A method for measuring a biological property of a sample provided in a sample card comprising a plurality of nano-pillars, the method comprising:

receiving, by a processing device of an image system, an image of a sample card comprising a sample and a monitor standard comprising a plurality of nanostructures integrated to a first plate of the sample;

segmenting, by the processing device, the image into first sub-regions corresponding to the sample and second sub-regions corresponding to the plurality of nano-pillars;

determining, by the processing device, a first spectrophotometric measurement of the first sub-regions;

determining, by the processing device, a second spectrophotometric measurement of the second sub-regions; and determining, by the processing device based on a ratio between the first spectrophotometric measurement and a second spectrophotometric measure, a biological property of the sample.

GA-2. A method of analyzing the compound concentration using the measured response of the compound at a specific wavelength of light or at multiple wavelength of light, the method comprising:

receiving, by a processing device of an image system, an image or multiple images taken on a sample card with a specific or multiple wavelength of light, wherein the sample card comprising a sample and a monitor standard comprising a plurality of nanostructures integrated to a first plate of the sample;

segmenting, by the processing device, each image into first sub-regions corresponding to the sample and second sub-regions corresponding to the plurality of nano-pillars;

determining, from the images of the sample taken at different wavelength, the light absorptions at the first sub-regions from the sample;

determining, from the images of the sample taken at different wavelength, the light absorptions at the second sub-regions from the nano-pillars; and determining the compound concentration from the light absorption measurements of these two sub-regions at one or multiple wavelength.

Moreover, in some embodiments of the present invention, the detection and segmentation of each image into first sub-regions corresponding to the sample and the second sub-regions corresponding to the plurality of nano-pillars is based on a machine learning model trained on the training image samples with labeled nano-pillars.

Labeling Large Amount of Small and Repeated Objects

HA-1. A method for labeling a plurality of objects in an image for preparing a training data, the method comprising:

receiving, by a processing device, the image in a graphic user interface;

receiving, by the processing device through the graphic user interface, a selection of a position in the image;

calculating, by the processing device based on a plurality of pixels local to the position, a bounding box surrounding the position;

providing, by the processing device, a display of the bounding box superposed on the image in the graphic user interface; and responsive to receiving a user confirmation, labeling a region within the bounding box as a training data.

IA-1. A method for preparing an assay image, the method comprising:

providing a sample card comprising a plurality of marker elements;

depositing a sample on a first plate of the sample card in an open configuration;

closing the sample card to press a second plate of the sample card against the first plate to a close configuration, where the first plate and the second plate in the close configuration form a thin layer comprising a substantially uniform thickness of the sample and the plurality of marker elements; and providing an image system comprising a processing device and a non-transitory storage medium to store instructions that, when executed by the processing device, are to:

capture an image of the sample card comprising the substantially uniform thickness of the sample and the plurality of marker elements;

detect the plurality of marker elements in the image;

compare the detected plurality of marker elements with a monitor standard associated with the sample card to determine a geometric mapping between the plurality of marker elements and the monitor standard;

determine a non-ideal factor of the image system based on the geometric mapping; and process the image of the sample card to correct the non-ideal factor.

IB-1. A method for preparing an assay image, the method comprising:

providing a sample card comprising a plurality of marker elements;

depositing a sample on a first plate of the sample card in an open configuration;

closing the sample card to press a second plate of the sample card against the first plate to a close configuration, where the first plate and the second plate in the close configuration form a thin layer comprising a substantially uniform thickness of the sample and the plurality of marker elements; and providing an image system comprising a processing device and a non-transitory storage medium to store instructions that, when executed by the processing device, are to:

capture an image of the sample card comprising the substantially uniform thickness of the sample and the plurality of marker elements;

partition the image into a plurality of sub-regions;

determine, using a machine learning model and the plurality of marker elements, whether each of the plurality of sub-regions meets a requirement of the image system;

responsive to determining that a sub-region fails to meet the requirement, label the first sub-region as non-compliant;

responsive to determining that the sub-region meets the requirement, label the first sub-region as compliant; and perform an assay analysis using the compliant sub-regions of the image.

IC-1. A method for correcting a non-ideal factor of an image system, the method comprising:

receiving, by a processing device of the image system, an image of a sample card comprising a substantially uniform layer of a sample deposited on a plate of the sample card and the plurality of marker elements associated with the sample card;

detecting, by the processing device, the plurality of marker elements in the image;

comparing the detected plurality of marker elements with a monitor standard associated with the sample card to determine a geometric mapping between the plurality of marker elements and the monitor standard;

determining the non-ideal factor of the image system based on the geometric mapping; and processing the image of the sample card to correct the non-ideal factor.

ID-1. A method for correcting a non-ideal factor of an image system, the method comprising:

receiving, by a processing device of the image system, an image of a sample card comprising a substantially uniform layer of a sample deposited on a plate of the sample card and the plurality of marker elements associated with the sample card;

partitioning, by the processing device, the image into a plurality of sub-regions;

determining, by the processing device using a machine learning model and the plurality of marker elements, whether each of the plurality of sub-regions meets a requirement of the image system;

responsive to determining that a sub-region fails to meet the requirement, labeling, by the processing device, the first sub-region as non-compliant;

responsive to determining that the sub-region meets the requirement, labeling, by the processing device, the first sub-region as compliant; and performing, by the processing device, an assay analysis using the compliant sub-regions of the image.

IE-1. An image system, comprising:
an adapter to hold a sample card comprising a first plate, a second plate, and a plurality of marker elements;
a mobile computing device coupled to the adapter, the mobile computing device comprising:
an optical sensor to capture an image of the plurality of marker elements and the sample card comprising a substantially uniform layer of a sample deposited between the first plate and the second plate of the sample card;
a processing device, communicatively coupled to the optical sensor, to:
receive the image captured by the optical sensor;
detect the plurality of marker elements in the image;
compare the detected plurality of marker elements with a monitor standard associated with the sample card to determine a geometric mapping between the plurality of marker elements and the monitor standard;
determine a non-ideal factor of the image system based on the geometric mapping; and
process the image of the sample card to correct the non-ideal factor.

IF-1. An image system, comprising:
an adapter to hold a sample card comprising a first plate, a second plate, and a plurality of marker elements;
a mobile computing device coupled to the adapter, the mobile computing device comprising:
an optical sensor to capture an image of the plurality of marker elements and the sample card comprising a substantially uniform layer of a sample deposited between the first plate and the second plate of the sample card;
a processing device, communicatively coupled to the optical sensor, to:
receive the image captured by the optical sensor;
partition the image into a plurality of sub-regions;
determine, using a machine learning model and the plurality of marker elements, whether each of the plurality of sub-regions meets a requirement of the image system;
responsive to determining that a sub-region fails to meet the requirement, label the first sub-region as non-compliant;
responsive to determining that the sub-region meets the requirement, label the first sub-region as compliant; and
perform an assay analysis using the compliant sub-regions of the image.

IG-1. A mobile imaging device, comprising:
an optical sensor; and
a processing device, communicatively coupled to the optical sensor, to:
receive the image captured by the optical sensor, the image comprising a plurality of marker elements and a substantially uniform layer of a sample deposited between a first plate and a second plate of a sample card;
detect the plurality of marker elements in the image;
compare the detected plurality of marker elements with a monitor standard associated with the sample card to determine a geometric mapping between the plurality of marker elements and the monitor standard;
determine a non-ideal factor of the image system based on the geometric mapping; and
process the image of the sample card to correct the non-ideal factor.

IH-1. A mobile imaging device, comprising:
an optical sensor; and
a processing device, communicatively coupled to the optical sensor, to:
receive the image captured by the optical sensor, the image comprising a plurality of marker elements and a substantially uniform layer of a sample deposited between a first plate and a second plate of a sample card;
partition the image into a plurality of sub-regions;
determine, using a machine learning model and the plurality of marker elements, whether each of the plurality of sub-regions meets a requirement of the image system;
responsive to determining that a sub-region fails to meet the requirement, label the first sub-region as non-compliant;
responsive to determining that the sub-region meets the requirement, label the first sub-region as compliant; and
perform an assay analysis using the compliant sub-regions of the image.

II-1. An intelligent assay monitor method, comprising:
receiving, by a processing device, an image encoding first information of a biological sample deposited in a sample card and second information of a plurality of monitor marks;
determining, by the processing device executing a first machine learning model on the image, a measurement of a geometric feature associated with the plurality of monitor marks;
determining, by the processing device, a variation between the measurement of the geometric feature with a ground truth value of the geometric feature provided with the sample card;
correcting, by the processing device based on the variation, the image encoding the first information and the second information; and
determining, by the processing device using the corrected image, a biological property of the biological sample.

II-2. The method of Example II-1, wherein the sample card comprises a first plate, a plurality of pillars that are substantially perpendicularly integrated to a surface of the first plate, and a second plate capable of enclosing the first plate to form a thin layer in which the biological sample is deposited.

II-3. The method of claim II-2, wherein the plurality of monitor marks corresponds to the plurality of pillars.

II-4. The method of claim II-2, wherein the plurality of monitor marks are provided in at least one of the first plate or the second plate.

II-5. The method of II-1, wherein determining, by the processing device executing a first machine learning model on the image, the measurement of the geometric feature associated with the plurality of monitor marks further comprises:
identifying, by the processing device executing a first machine learning model the plurality of monitor marks from the image; and
determining, by the processing device based on the identified plurality of monitor marks, the measurement of the geometric feature.

II-6. The method of claim II-1, wherein determining, by the processing device, the variation between the measurement of the geometric feature with a ground truth value of the geometric feature provided with the sample card further comprises:
determining, by the processing device, one of a system error or a human operator error; and presenting the determined one of the system error or the human operator error on a display device associated with the processing device.

II-7. An image system, comprising:
a sample card comprising a first plate, a plurality of pillars substantially perpendicularly integrated to a surface of the first plate, and a second plate capable of enclosing the first plate to form a thin layer in which the biological sample is deposited;
a computing device comprising:
a processing device, communicatively coupled to an optical sensor, to:
receive, from the optical sensor, an image encoding first information of a biological sample deposited in the sample card and second information of a plurality of monitor marks;
determine, using a first machine learning model on the image, a measurement of a geometric feature associated with the plurality of monitor marks;
determine a variation between the measurement of the geometric feature with a ground truth value of the geometric feature provided with the sample card;
correct, based on the variation, the image encoding the first information and the second information; and
determine, based on the corrected image, a biological property of the biological sample.

IJ-1. A method for correcting non-ideal factors in an assay image of a thin-layer sample, the method comprising:
providing a sample card comprising a monitor standard which comprises a plurality of nanostructures on a plate of the sample card;
depositing a sample on the plate of the sample card; and
providing an image system comprising a processing device and a non-transitory storage media to store instructions that, when executed by the processing device, are to:
capture an image of the sample card comprising the sample and the monitor standard;
determine a non-ideal factor of the image system by comparing the image of the sample card with a plurality of geometric values of the monitor standard determined during manufacture of the sample card; and
correct the image of the sample card taking into account the non-ideal factor.

IJ-2. A method for correcting non-ideal factors in an assay image of a thin-layer sample, the method comprising:
receiving, by a processing device of an image system, an image of a sample card comprising a sample and a monitor standard, wherein the monitor standard comprises a plurality of nanostructures on a plate of the sample card, and wherein the sample is deposited on the plate;
determining, by the processing device, a non-ideal factor of the image system by comparing the image of the sample card with a plurality of geometric values of the monitor standard determined during manufacture of the sample card; and
correcting the image of the sample card taking into account the non-ideal factor.

IJ-3. A method for correcting non-ideal factors in an assay image of a thin-layer sample, the method comprising:
receiving, by a processing device of an image system, an image of a sample card comprising a sample and a monitor standard, wherein the monitor standard comprises a plurality of nanostructures on a plate of the sample card, and wherein the sample is deposited on the plate;
determining, by the processing device using a machine learning model, a non-ideal factor of the image system, wherein the machine learning model is trained by comparing images of the sample card with geometric values of the monitor standard determined during manufacture of the sample card; and
correcting the image of the sample card taking into account the non-ideal factor.

IJ-4. A mobile imaging device, comprising:
an optical sensor; and
a processing device, communicatively coupled to the optical sensor, to:
receive an image of a sample card comprising a sample and a monitor standard, wherein the monitor standard comprises a plurality of nanostructures on a plate of the sample card, and wherein the sample is deposited on the plate;
determine a non-ideal factor of the mobile imaging system by comparing the image of the sample card with a plurality of geometric values of the monitor standard determined during manufacture of the sample card; and correct the image of the sample card taking into account the non-ideal factor.

IJ-5. An image system, comprising:
an adapter to hold a sample card comprising a monitor standard, wherein the monitor standard comprises a plurality of nanostructures on a plate of the sample card, and wherein a sample is deposited on the plate;
a mobile computing device coupled to the adapter, the mobile device comprising: an optical sensor; and
a processing device, communicatively coupled to the optical sensor, to:
receive an image of the sample card;
determine a non-ideal factor of the image system by comparing the image of the sample card containing a sample deposited on the plate with a plurality of geometric values of the monitor standard determined during manufacture of the sample card; and correct the image of the sample card taking into account the non-ideal factor.

IJ-6. A sample card, comprising:
a monitor standard which comprises a plurality of nanostructures on a plate of the sample card, wherein a sample is deposited on the plate, and wherein the sample card is plugged into an adapter coupled to an image system comprising a processing device and an optical sensor to capture an image of the sample card, the processing device to:
receive the image of the sample card;
determine a non-ideal factor of the image system by comparing the image of the sample card containing a sample deposited on the plate with a plurality of geometric values of the monitor standard determined during manufacture of the sample card; and correct the image of the sample card taking into account the non-ideal factor.

IJ-7. A method for correcting a system error of an image system containing a thin-layer sample, the method comprising:
receiving, by a processing device of the image system, an image and first parameters associated with a sample card comprising a sample and a monitor standard, wherein the monitor standard comprises a plurality of nanostructures on a plate of the sample card, and wherein the sample is deposited on the plate;
determine, by the processing device, the system error of the image system by comparing the first parameters with second parameters associated with the monitor standard determined during manufacture of the sample card; and
correcting the image of the sample card taking into account the system error.

IJ-8. A method for correcting human operation errors recorded in an assay image of a thin-layer sample, the method comprising:

receiving, by a processing device of an image system, an image of a sample card comprising a sample and a monitor standard, wherein the monitor standard comprises a plurality of nanostructures on a plate of the sample card, and wherein the sample is deposited on the plate;

determining, by the processing device using a machine learning model, a human operation error reflected in the image by comparing the image of the sample card with a plurality of geometric values of the monitor standard determined during manufacture of the sample card, wherein the human operation error comprises mis-handling of the image system; and correcting the image of the sample card by removing the human operation error reflected in the image.

Assay Device Operation Error Monitoring and Correction

A method of monitoring and correcting the errors occurred in operating an assay device, comprising:
(a) having a Q-CARD with monitoring marks on the plate (inside of the sample);
(b) performing the sample deposition,
(c) imaging using an imager, during the measurements, the monitoring marks;
(d) determining operation errors by comparing the images of the monitoring mark with the ideal image of the monitoring mark;
wherein the ideal image of the monitoring mark is the image of the monitoring mark when an operation is performed correctly;
wherein the monitoring mark is prefabricated.

A method of monitoring an imperfection in operating an assay device, comprising:
(a) having a Q-CARD with monitoring marks on the plate (inside of the sample);
(b) performing the sample deposition,
(c) imaging using an imager, during the measurements, the monitoring marks;
(d) determining operation errors by comparing the images of the monitoring mark with the ideal image of the monitoring mark;
wherein the ideal image of the monitoring mark is the image of the monitoring mark when an operation is performed correctly;
wherein the monitoring mark is prefabricated.

OA-1 In some embodiments of the present invention, a method for improving accuracy of an assay that has one or more operation conditions unpredictable and random, comprising:
(a) detecting an analyte in a sample that contains or is suspected of containing the analyte, comprising:
  (i) having the sample into a detection instrument, and
  (ii) using the detection instrument to measure the sample to detect the analyte, generating a detection result of the detection;
(b) determining trustworthiness of the detection result in step (a), comprising:
  (i) taking one or more images of (1) a portion of the sample and/or (2) a portion of the detection instrument that is surrounded the portion of the sample, wherein the images substantially represent the conditions that the portion of the sample is measured in generating detection result in step (a); and
  (ii) using a computational device with an algorithm to analyze the images taken in step (b)(i) to determine a trustworthiness of the detection result in step (a); and
(c) reporting both the detection result and the trustworthiness;

wherein the step (a) has one or more operation conditions that is unpredictable and random.

In certain embodiments, the method OA-1 further comprises a step of discarding the detection result generated in step (a), if the worthiness determined in the step (b) is below a threshold.

In certain embodiments, the method OA-1 further comprises a step of revising the detection result generated in step (a), if the worthiness determined in the step (b) is below a threshold.

OA-2. An apparatus for improving accuracy of an assay that has one or more operation conditions unpredictable and random, comprising:
(1) a detection device that detects an analyte in a sample to generate a detection result, wherein the sample contains or is suspected of containing the analyte;
(2) a checking device that checks trustworthiness of a particular detection result generated by the detection device, comprising:
  (i) an imager that is capable of taking one or more images of (1) a portion of the sample and/or (2) a portion of the detection instrument that is surrounded the portion of the sample, wherein the images substantially represent the conditions that the portion of the sample is measured in generating detection result in step (a); and
  (ii) a computing unit with an algorithm that is capable of analyzing the features in the images taken in step (b)(i) to determine a trustworthiness of the detection result;
(c) discarding the detection result generated in step (a), if the step (b) determines the detection result is untrustworthy;
wherein the step (a) has one or more operation conditions that is unpredictable and random.

In certain embodiments, the algorithm in OA-1 is machine learning, artificial intelligence, statistical methods, etc. OR a combination of thereof.

The term "operation conditions" in performing an assay refers to the conditions under which an assay is performed. The operation conditions include, but not limited to, at least three classes: (1) defects related to sample, (2) defects related to the sample holder, and (3) defects related to measurement process. The term "defects" means deviate from an ideal condition.

The examples of the defects related to the samples include, but limited to, the air bubble in a sample, the dust in a sample, the foreign objects (i.e. the objects that are not from the original sample, but comes into the sample later), the dry-texture in a sample where certain part of the sample dried out, insufficient amount of sample, the incorrect sample, no sample, samples with incorrect matrix (e.g. blood, saliva), the incorrect reaction of reagents with the sample, the incorrect detection range of the sample, the incorrect signal uniformity of the sample, the incorrect distribution of the sample, the incorrect sample position with the sample holder (e.g. blood cells under spacer), etc.

The examples of the defects related to the sample holder include, but limited to, missing spacers in sample holders, the sample holder is not closed properly, the sample hold is damaged, and the sample holder surface become contaminated, the reagents on the sample was not properly prepared, the sample holder in an improper position, the sample holder with incorrect spacer height, large surface roughness, incorrect transparence, incorrect absorptance, no sample holders, incorrect optical properties of sample holder, incorrect electrical properties of sample holder, incorrect geometry (size, thickness) of sample holder, etc.

The examples of the defects related to the measurement process include, but limited to, the light intensity, the camera conditions, the sample not in focus in the image taken by the imager, the temperature of light, the color of light, the leakage of environment light, the distribution of light, the lens conditions, the filter conditions, the optical components conditions, the electrical components conditions, the assembling conditions of instruments, the relative position of sample, sample holder and instrument, etc.

A. A Thin Layer Sample on a Solid Phase.

A1. A method for assaying a sample with one or more operation conditions random and unpredictable, comprising:

(a) providing a sample that contains or is suspected of containing an analyte;

(b) depositing the sample onto a solid surface;

(c) measuring, after step (b), the sample to detect the analyte and generate a result of the detection, wherein the result can be effected by one more operation conditions in performing the assaying, and wherein the operation conditions are random and unpredictable;

(d) imaging a portion of the sample area/volume where the analyte in the sample is measured in step (c); and (e) determining the error-risk-probability of the result measured in step (c) by analyzing the one or more operation conditions shown in one or more images generated in step (d).

Furthermore, if step (e) determines that the result measured in step (c) has a high error risk probability, the result will be discarded.

AD1. A device for assaying an analyte present in a sample under one or more operational variables, comprising:

(a) a solid surface having a sample contact area for receiving a thin layer of a sample, the sample containing an analyte to be measured;

(b) an imager configured to image a portion of the sample contact area where the analyte is measured; and (c) a non-transitory computer readable medium having an instruction that, when executed, it performs the determination of trustworthy of the assay result by analyzing the operational variables displayed in the image of the portion of the sample.

B. A Thin Layer Sample Between Two Plates

B1. A method for assaying a sample with one or more operational variables, comprising:

(a) depositing a sample containing an analyte between a first plate and a second plate; wherein the sample is sandwiched between the first plate and the second plate which are substantially in parallel;

(b) measuring the analyte contained in the sample to generate a result, wherein the measuring involving one more operational variables that are random and unpredictable;

(c) imaging an area portion of the first plate and the second plate to generate an image, where the area portion contains the sample and the analyte contained in the sample is measured; and (d) determining if the result measured in step (b) is trustworthy by analyzing the operational variables shown in the image of the area portion containing the sample.

Furthermore, if the analysis in step (d) determines that the result measured in step (b) is not trustworthy, the result is discarded.

C. A Thin Layer Sample Between Two Plates with Spacer

C1. A method for assaying a sample with one or more operational variables, comprising:

(a) depositing a sample that contains or suspected to contain an analyte between a first plate and a second plate, wherein the sample is sandwiched between the first plate and the second plate that are movable relative to each other into a first configuration or a second configuration;

(b) measuring the analyte in the sample to generate a result, wherein the measuring involving one more operational variables that are random and unpredictable; and (c) imaging an area portion of the sample where the analyte is measured; and (d) determining if the result measured in step (b) is trustworthy by analyzing the operational variables shown in the image of the area portion, wherein the first configurations is an open configuration, in which the two plates are partially or completely separated apart, the spacing between the plates is not regulated by the spacers, and the sample is deposited on one or both of the plates, and wherein the second configurations is a closed configuration which is configured after the sample is deposited in the open configuration and the plates are forced to the closed configuration by applying the imprecise pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers.

Furthermore, if step (d) determines that the result measured in step (b) is not trustworthy, the result is discarded.

D. Reliability Check in all Devices that are Described

D1. A method for assaying a sample with one or more operational variables, comprising:

(a) depositing a sample that contains or is suspected to contain an analyte, wherein the sample is deposited in an area in the device of any embodiment described in the disclosure;

(b) measuring the analyte in the sample, wherein the measuring involving one more operational variables that are random and unpredictable; and (c) imaging a portion of the sample area wherein the portion is where the analyte is measured; and (d) determining if the result measured in step (b) is trustworthy by analyzing the operational variables shown in the image of the portion of the sample.

Furthermore, if the analysis in step (d) determines that the result measured in step (b) is not trustworthy, the result is discarded.

E. Assaying Using Multiple Assay Devices

E.1 In certain embodiments, multiple assay devices are used to perform the assaying, wherein the assay has a step of using an image analysis to check if an assay result is trustworthy, and wherein if a first assay device is found to be not trustworthy, a second assay device is used, until the assay result is found to be trustworthy.

In some embodiments, the sample is a biological or chemical sample.

In certain embodiments, in the step (d), the analysis uses machine learning with a training set to determine if a result is trustworthy, wherein the training set uses an operational variable with a known analyte in the sample.

In certain embodiments, in the step (d), the analysis uses a lookup table to determine if a result is trustworthy, wherein the lookup table contains an operational variable with a known analyte in the sample.

In certain embodiments, in the step (d), the analysis uses a neural network to determine if a result trustworthy, wherein the neural network is trained using an operational variable with a known analyte in the sample.

In certain embodiments, in the step (d), the analysis uses a threshold for the operational variable to determine if a result is trustworthy.

In certain embodiments, in the step (d), the analysis uses machine learning, lookup table or neural work to determine if a result is trustworthy, wherein the operational variables include a condition of air bubble and/or dust in the image of the portion of the sample.

In certain embodiments, in the step (d), the analysis uses machine learning, that determines if a result is trustworthy, use machine learning, lookup table or neural network to determine the operational variables of air bubble and/or dust in the image of the portion of the sample.

In some embodiments, the step (b) of measuring the analyte, the measuring uses imaging.

In some embodiments, the step (b) of measuring the analyte, the measuring uses imaging, and the same image used for analyte measurement is used for the trustworthy determination in step (d).

In some embodiments, the step (b) of measuring the analyte, the measuring uses imaging, and the same imager used for analyte measurement is used for the trustworthy determination in step (d).

In some embodiments, the device used in A1, B1, and/or C1 further comprised a monitoring mark.

The method, device, computer program product, or system of any prior embodiment, wherein the monitoring mark is used as a parameter together with an imaging processing method in an algorithm that (i) adjusting the imagine, (ii) processing an image of the sample, (iii) determining a property related to the micro-feature, or (iv) any combination of the above.

The method, device, computer program product, or system of any prior embodiment, wherein the monitoring mark is used as a parameter together with step (b).

The method, device, computer program product, or system of any prior embodiment, the spacers are the monitoring mark, wherein the spacers have a substantially uniform height that is equal to or less than 200 microns, and a fixed inter-spacer-distance (ISD);

In some embodiments of the present invention, the monitoring mark is used for estimating the TLD (true-lateral-dimension) and true volume estimation.

In certain embodiments, the step (b) further comprises an image segmentation for image-based assay.

In certain embodiments, the step (b) further comprises a focus checking in image-based assay.

In certain embodiments, the step (b) further comprises an Evenness of analyte distribution in the sample.

In certain embodiments, the step (b) further comprises an analyze and detection for aggregated analytes in the sample.

In certain embodiments, the step (b) further comprises an analyze for Dry-texture in the image of the sample in the sample.

In certain embodiments, the step (b) further comprises an analyze for Defects in the sample.

In certain embodiments, the step (b) further comprises a correction of camera parameters and conditions as distortion removal, temperature correction, brightness correction, contrast correction.

In certain embodiments, the step (b) further comprises methods and operations with Histogram-based operations, Mathematics-based operations, Convolution-based operations, Smoothing operations, Derivative-based operations, Morphology-based operations.

F. System for Reliability Checking

Figure 8:
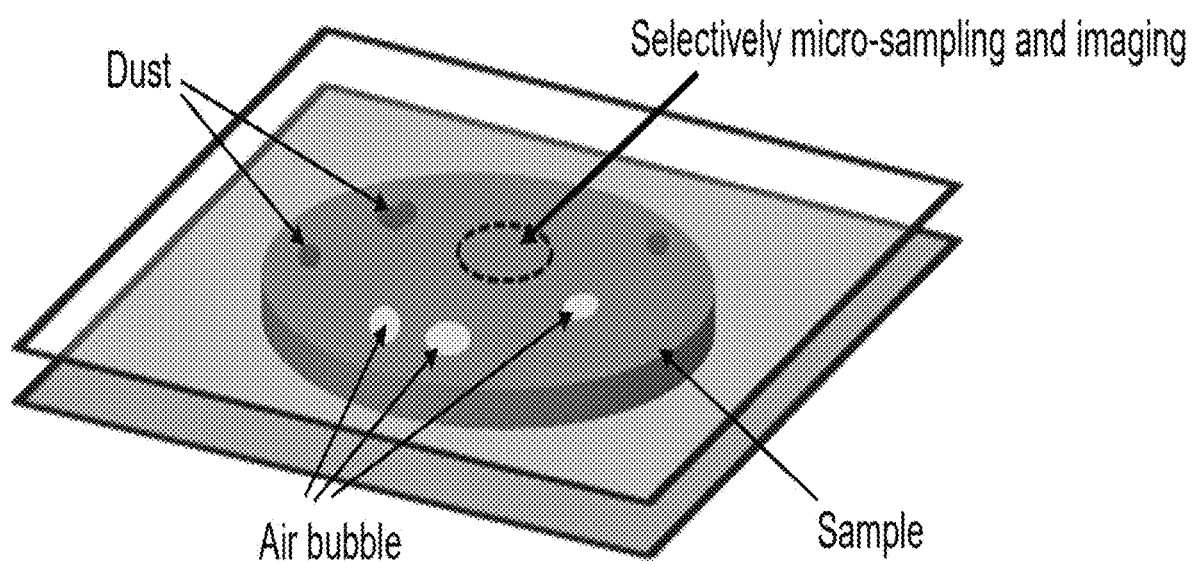
FIG. 8 shows a diagram of defects, such as dusts, air bubbles, and so forth that can appear in the sample for assaying.
Figure 9:
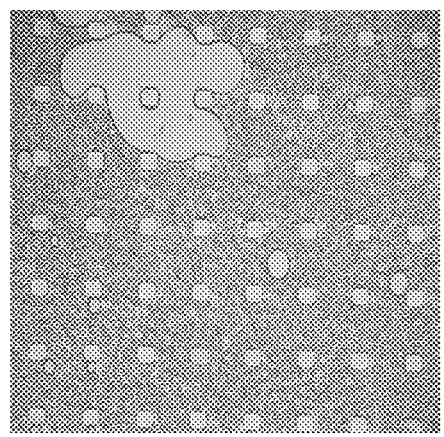
FIG. 9 shows a real image in blood testing with defects in the image of the sample for assaying.

FIG. 8 is an illustrative diagram that defects, such as dusts, air bubbles, and so forth, can occur in the sample at the sample holder. FIG. 9 is an image of real blood sample that contains multiple defects occurred in an image-based assaying.

F1. A system for assaying a sample with one or more operation conditions unknown, comprising:
- a) load the sample to a sample holding device, e.g. a QMAX device, whose gap is in proportion to the size of the analyte to be analyzed or the analytes form a mono-layer between the gap;
- b) take an image of the sample in the sample holding device on the area-of-interest (AoI) for assaying with an imager;
- c) segment the image of the sample taken by the said imager from (b) into equal-sized and non-overlapping sub-image patches (e.g. 8×8 equal-sized small image patches);
- d) perform machine learning based inference with a trained machine learning model for analyte detection and segmentation on each image patch—to determine and not limited to the analyte count and concentration thereof;
- e) sort the analyte concentration of the constructed sub-image patches in ascending order and determine the 25% quantile Q1 and 75% quantile Q3 thereof;
- f) determine the uniformity of the analytes in the image of the sample with an inter-quantile-range based confidence measure: confidence-IQR=(Q3−Q1)/(Q3+Q1); and
- g) if the confidence-IQR from (f) exceeds a certain threshold (e.g. 30%), raise the flag and the assay result is not trustworthy, wherein the said threshold is derived from the training/evaluation data or from the physical rules that govern the distribution of the analytes.

F2. A system for assaying a sample with one or more operation conditions unknown, comprising:
- a) load the assay into a sample holding device, e.g. a QMAX device, whose gap is in proportion to the size of the analyte to be analyzed or the analytes form a mono-layer between the gap;
- b) take an image of the sample in the sample holding device on the area-of-interest (AoI) for assaying with an imager;
- c) perform machine learning based inference with a trained machine learning model for dry texture detection and segmentation—to detect the dry texture areas and determine the area-dry-texture-in-AoI associated with the segmentation contour masks that cover those areas of dry-texture in the AoI of the image of the sample;
- d) determine the area ratio between the area-dry-texture-in-AoI and the area-of-the-AoI: ratio-dry-texture-area-in-AoI=area-dry-texture-in-AoI/area-of-AoI; and
- h) if the ratio-dry-texture-area-in-AoI from (d) exceeds a certain threshold (e.g. 10%), raise the flag and the assay result is not trustworthy, wherein the said threshold is derived from the training/evaluation data or from the physical rules that govern the distribution of the analytes.

F3. A system for assaying a sample with one or more operation conditions unknown, comprising:
- a) load the assay into a sample holding device, e.g. a QMAX device, whose gap is in proportion to the size of the analyte to be analyzed or the analytes form a mono-layer between the gap;
- b) take an image of the sample in the sample holding device on the area-of-interest (AoI) for assaying with an imager;

c) perform machine learning based inference with a trained machine learning model for aggregated analytes detection and segmentation—to detect the clustered analytes and determine the area (area-aggregated-analytes-in-AoI) associated with the segmentation contour masks that cover them in the AoI thereof;
d) determine the area ratio between the area-aggregated-analytes-in-AoI and the area-of-AoI: ratio-aggregated-analytes-area-in-AoI=area-aggregated-analytes-in-AoI/area-of-AoI; and
i) if the ratio-aggregated-analytes-area-in-AoI from (d) exceeds a certain threshold (e.g. 40%), raise the flag and the assay result is not trustworthy, wherein the said threshold is derived from the training/evaluation data or from the physical rules that govern the distribution of the analytes.

F4. A system for assaying a sample with one or more operation conditions unknown, comprising:
a) load the assay into a sample holding device, e.g. a QMAX device, whose gap is in proportion to the size of the analyte to be analyzed or the analytes form a mono-layer between the gap;
b) take an image of the sample in the sample holding device on the area-of-interest (AoI) for assaying with an imager;
c) perform machine learning based inference with a trained machine learning model for detection and segmentation of the defects in the image of the sample; wherein the defects include and not limited to dusts, oil, etc.—to detect the defects and determine the area (area-defects-in-AoI) associated with the segmentation contour masks that cover them in the AoI thereof;
d) determine the ratio between the area-defects-in-AoI and the area-of-AoI ratio-defects-area-in-AoI=area-defects-in-AoI/area-of-AoI; and
j) e) if the ratio-defects-area-in-AoI from (d) exceeds a certain threshold (e.g. 15%), raise the flag and the assay result is not trustworthy, wherein the said threshold is derived from the training/evaluation data or from the physical rules that govern the distribution of the analytes.

F5. A system for assaying a sample with one or more operation conditions unknown, comprising:
a) load the assay into a sample holding device, e.g. a AMAX device, whose gap is in proportion to the size of the analyte to be analyzed or the analytes form a mono-layer between the gap;
b) take an image of the sample in the sample holding device on the area-of-interest (AoI) for assaying with an imager;
c) perform machine learning based inference with a trained machine learning model for air bubble and air gap detection and segmentation—to detect air bubbles and air gaps and determine area-airbubble-gap-in-AoI associated with the segmentation contour masks that cover them in the AoI thereof;
d) determine the area ratio between the area-airbubble-gap-in-AoI and the area-of-AoI: ratio-airbubble-gap-area-in-AoI=area-airbubble-gap-in-AoI/area-of-AoI; and
k) if the ratio-airbubble-gap-area-in_AoI from (d) exceeds a certain threshold (e.g. 10%), raise the flag and the assay result is not trustworthy, wherein the said threshold is derived from the training/evaluation data or from the physical rules that govern the distribution of the analytes.

F6. A system for assaying a sample with one or more operation conditions unknown, comprising:
a) load the assay into a sample holding device, e.g. a QMAX device, wherein the said sample holding device has a gap in proportion to the size of the analyte to be analyzed or the analytes form a mono-layer between the gap, and there are monitor marks (e.g. pillars)-residing in the device and not submerged, that can be imaged by an imager on the sample holding device with the sample;
b) take an image of the sample in the sample holding device on the area-of-interest (AoI) for assaying with an imager;
c) perform machine learning based inference with a trained machine learning model to detect and segment the monitor marks (pillars) with analytes on top—to determine the area (area-analytes-on-pillars-in-AoI) associated with the detected monitor marks (pillars) based on their segmentation contour masks in the AoI;
d) determine the area ratio between the area-analytes-on-pillars-in-AoI and the area-of-AoI: ratio-analytes-on-pillars-area-in-AoI=area-analytes-on-pillars-in-AoI/area-of-AoI; and
l) if the ratio-analytes-on-pillars-area-in-AoI from (d) exceeds a certain threshold (e.g. 10%) raise the flag and the assay result is not trustworthy, wherein the said threshold is derived from the training/evaluation data or from the physical rules that govern the distribution of the analytes.

F7. A system for assaying a sample with one or more operation conditions unknown, comprising:
a) load the assay into a sample holding device, e.g. a QMAX device;
b) take an image of the sample in the sample holding device on the area-of-interest (AoI) for assaying with an imager;
c) perform machine learning based focus check to detect if the image of the sample taken by the imager is in focus to the sample, wherein the machine learning model for detecting the focus of the said imager is built from the multiple images of the imager with known in focus and off focus conditions; and
d) if the image of the sample taken by the said imager is detected off focus from (c), raise the flag and the image-based assay result is not trustworthy.

F8. A system for assaying a sample with one or more operation conditions unknown, comprising:
a) load the assay into a sample holding device, e.g. a QMAX device;
b) take an image of the sample in the sample holding device on the area-of-interest (AoI) for assaying with an imager;
c) perform machine learning based analyte detection; and
d) if the analyte count is extremely low beyond a preset acceptable range, raise the flag and the result is not trustworthy, wherein the acceptable range is specified based on physical or biological conditions of the assay.

F9. A system for assaying a sample with one or more operation conditions unknown, comprising:
a) load the assay into a sample holding device, e.g. a QMAX device;
b) take an image of the sample in the sample holding device on the area-of-interest (AoI) for assaying with an imager;
c) partition the image of the sample into non-overlapping, equal sized sub-image patches;
d) perform machine learning based analyte detection over each sub-image patch thereof; and e) if for some sub-image patches, the count of the detected analytes is unrealistically low (e.g. in complete-blood-count, the number of red blood cell in the sample is below human acceptable range), raise the flag and the result is not trustworthy for having not enough samples or non-uniform distribution of the sample in the assay.

F10. In methods, apparatus and embodiments in all prior claims, wherein the detection and segmentation of abnormalities from the image of the sample taken by the imager in the image-based assay are based on image processing, machine learning or a combination of image processing and machine learning.

F11. In methods, apparatus and embodiments in all prior claims, the estimation of the area covered by segmentation contour masks in the area-of-interest (AoI) of the image of the sample utilizes a per-image or per-sub-image patch based true-lateral-dimension (or Field-of-View (FoV)) estimation to compensate the distortions in microscopic imaging, including and not limited to spherical distortion from the lens, defects at microscopic level, mis-alignment in focusing, etc.

F12. In methods, apparatus and embodiments of F11, there are monitor marks (e.g. pillars) built in with the sample holding device, e.g. QMAX card; and the said monitor marks (e.g. pillars) are applied as detectable anchors to make the estimation of the true-lateral-dimension (or Field-of-View (FoV)) estimation accurate in face of the distortions in microscopic imaging.

F13. In methods, apparatus and embodiments of F12, the monitor marks (e.g. pillars) of the sample holding device have some known configurations with a prescribed periodic distribution in the sample holding device, e.g. QMAX card, to make detection and location of the monitor marks as anchors in true-lateral-dimension (TLD) (or Field-of-View (FoV)) estimation reliable and robust.

F14. In methods, apparatus and embodiments of F1, the detection and characterization of the outliers in the image-based assay are based on the non-overlapping sub-image patches of the input image of the sample described herein, and the determination of the outliers can be based on non-parametric methods, parametric methods and a combination of both in the assaying process.

G-1 A method, comprising:
 (a) detecting an analyte in a sample that comprises or is suspected of comprising the analyte, said detecting comprising:
  (i) depositing the sample into a detection instrument, and
  (ii) measuring the sample using the detection instrument to detect the analyte, thereby generating a detection result;
 (b) determining a reliability of the detection result, said determining comprising:
  (i) taking one or more images of a portion of the sample and/or a portion of the detection instrument adjacent the portion of the sample, wherein the one or more images reflect one or more operation conditions under which the detection result was generated; and
  (ii) using a computational device with an algorithm to analyze the one or more images to determine a reliability of the detection result in step (a); and
 (c) reporting the detection result and the reliability of the detection result;
 wherein the one or more operation conditions are unpredictable and/or random.

The term of "unreliable" in an assay's result means that for assaying a given sample, the results of the assay are not always accurate: sometimes the results of the assay are accurate, but other times the results are inaccurate, wherein the inaccurate results are substantially different from accurate results. Such inaccurate result is termed "erroneous result". In some literatures, the erroneous results are also termed "outliers".

The term of "accurate" in an assay's result means that the result of the assay agrees, within an allowed arrange, with the result of the same sample assayed by a gold standard instrument, operated by a trained professional, under an ideal environment.

Traditionally, diagnostic assays usually are performed using sophisticated (often expensive) instruments and require highly trained personnel and sophisticated infrastructures, which are not available in limited resource settings.

The term "a limited resource setting" or "LRS" for assaying a sample refers to a setting in performing an assay, wherein it uses a simplified/low cost assay process or a simplified/low cost instrument, is performed by an untrained person, is used in an adverse environment (e.g. open and non-lab environment with dusts), or any combination of thereof.

The term "LRS assay" refers to an assay performed under LRS.

The term "trustworthy" in describing a reliability of a particular assay result (or data) refers to a reliability analysis of the particular assay result determines that the result has a low probability of being inaccurate.

The term "untrustworthy" in describing a reliability of a particular assay result (or data) refers to a reliability analysis of the particular assay result determines that the result has a high probability of being inaccurate.

The term "operation conditions" in performing an assay refers to the conditions under which an assay is performed. The operation conditions include, but not limited to, the air bubble in a sample, the dust in a sample, the foreign objects (i.e. the objects that are not from the original sample, but comes into the sample later), the defects of the solid phase surface, and/or handing conditions of the assay.

When assaying a sample in a limited resource setting (LRS), a result from the assaying can be unreliable. However, traditionally, there is no checking on the reliability of a particular result during or after a particular testing for a given sample.

The present invention observes that in LRS assaying (or even in the lab testing environment), one or more unpredictable random operation conditions can occur and affect the assaying result. When that happens, it can be substantially different from one particular assaying to next assaying, even using the same sample. However, instead of taking the assaying result as it is, the reliability of a particular result in a particular testing for a given sample can be assessed by analyzing one or more factors that are related to the assay operation conditions in that particular assay.

The present invention observes that in LRS assaying that has one or more unpredictable random operation conditions, the overall accuracy of the assaying can be substantially improved by using an analysis on the reliability of each particular assaying and by rejecting the untrustworthy assay results.

One aspect of the present invention is the devices, system and the methods that perform an assay by not only measuring the analytes in a particular test, but also checking the trustworthy of the measuring result through an analysis of the operation conditions of that particular test.

In some embodiments of the present invention, the checking of the trustworthy of the measuring result of the assay is modeled in a machine learning framework, and machine learning algorithms and models are devised and applied to handle unpredictable random operation conditions that occur and affect the assay result.

The term "machine learning" refers to algorithms, systems and apparatus in the field of artificial intelligence that often use statistical techniques and artificial neural network to give computer the ability to "learn" (i.e., progressively improve performance on a specific task) from data without being explicitly programmed.

The term "artificial neural network" refers to a layered connectionist system inspired by the biological networks that can "learn" to perform tasks by considering examples, generally without being programmed with any task-specific rules.

The term "convolutional neural network" refers to a class of multilayer feed-forward artificial neural networks most commonly applied to analyzing visual images.

The term "deep learning" refers to a broad class of machine learning methods in artificial intelligence (AI) that learn from data with a network structure consisting of many connected layers.

The term "machine learning model" refers to a trained computational model that is built from a training process in the machine learning from the data. The trained machine learning model is applied during the inference stage by the computer that gives computer the capability to perform certain tasks (e.g. detect and classify the objects) on its own. Examples of machine learning models include ResNet, DenseNet, etc. which are also named as "deep learning models" because of the layered depth in their network structure.

The term "image segmentation" refers to an image analysis process that partitions a digital image into multiple segments (sets of pixels, with a set of bit-map masks that cover the image segments along their segmentation boundary contours). Image segmentation can be achieved through the image segmentation algorithms in image processing, such as watershed, grabcuts, mean-shift, etc., and can also be achieved through machine learning algorithms, such as MaskRCNN.

The term "object" or "object of interest" in an image means an objection that is visible in the image and that has a fixed shape or form.

In present invention, the innovative use of machine learning has the advantage of automating the process of determining the trustworthy of the assay result in face of unpredictable random operation conditions in assaying—directly from the data without making explicit assumptions on the unpredictable conditions which can be complex, hard to predict, and error prone.

The machine learning framework in the present invention involves a process that comprises:
(a) gather training data of the task;
(b) prepare the data with labeling;
(c) select a machine learning model;
(d) train the selected machine learning model with the training data;
(e) tune the hyper-parameters and model structure with the training and evaluation data until the model reaches a satisfactory performance on the evaluation and test data; and
(f) perform the inference on the test data using the trained machine learning model from (e).

Image segmentation for image-based assay: In some embodiments of the present invention for verifying the trustworthy of the test results, it needs to segment the objects of interest from the image of the sample for assaying. Although machine learning based image segmentation algorithms, such as Mask RCNN, is powerful, they require precise contour labeling of the shape of the objects in the microscopic image of the sample to train the machine learning model, which has become a bottleneck for many applications. Moreover, they are very sensitive to the shapes of the objects in the image. For image-based assay, such labeling of the shape contour of the objects is hard to come by, because objects in the sample can be very small, their occurrences are random, and moreover, there are huge variations among them in shape, size and colorations (e.g. dusts, air bubbles, etc.).

In some embodiments of the present invention, a fine-grinned image segmentation algorithm is devised based on a combination of a machine learning based coarse bonding box segmentation and an image processing based fine grind shape determination. It is applied to the image segmentation in the image-based assay, wherein each object only, needs to be labeled in a rough bounding box independent of its shape and shape contour details. By which, it eliminates the need of the fine labeling of the shape dependent contour of the objects in the image of the sample, which is difficult, complex, costly and hard to be accurate. This fine-grinned image segmentation algorithm comprises:
a) collecting multiple images of the sample taken by the imager which contains the objects to be detected in the image of the sample for further assaying;
b) labeling each object in the collected images with a rough bonding box that contains the said object for model training;
c) training a machine learning model (e.g. FRCNN) to detect the said objects in the image of the sample with rough bounding boxes that contain them;
d) taking the image of the sample as input in assaying;
e) applying the trained machine learning model to detect the said objects with their rough bounding boxes in the image of the sample;
f) transforming each image patch corresponding to a detected bonding box into gray color and then to binary with an adaptive thresholding;
g) performing morphological dilation (7×7) and erosion (3×3) to enhance the contour of the shape from the background noise;
h) performing convex contour analysis on each said image patch and using the longest connected contour find in the patch as the contour of the object shape to determine the image mask of the object (e.g. binary bit map that covers the object in the image of the sample); and
i) completing the image segmentation by collecting all image masks from (h).
(if segmentation masks with an extra margin Δ is needed, dilate each detected contour in (h) with margin Δ as new masks)

Figure 10:
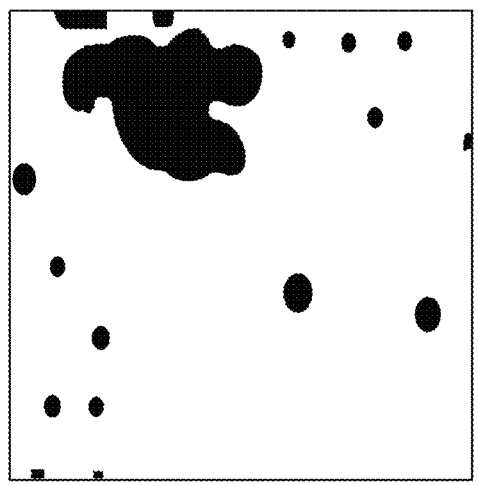
FIG. 10 shows the defects detection and segmentation on the image of the sample using the approach described approach.

FIG. 10 is an example of the described fine-grinned image segmentation algorithm applied to the image of the blood sample depicted in FIG. 9 in the image-based assay. As illustrated in the example, the described fine-grinned image segmentation algorithm can handle objects with different size and shape properly in the image-based assay with very tight masks covering the objects in the image of the sample.

Focus checking in image-based assay: In image-based assay, the image of the sample taken by the imager needs to be in focus on the sample by the imager for assaying, and off focus in the image of the sample taken by the imager blurs analytes in the image of the sample, and consequently, the assaying results become untrustworthy. However, there are many random factors that can cause the image of the sample being partially or even totally oft focus, including and not limited to vibrations/hand-shaking during the image taken, the mis-placement of the sample holding device with the image sensor plane, etc. Moreover, prior art mostly relies on certain edge content-based measure, e.g. Tenengrad, etc., and some preset content dependent thresholds, which are unreliable, fragile, and falls short for the requirements in microscopic imaging based assay.

In some embodiments of the present invention, a verification process based on machine learning is devised and applied to determine if an image of the sample taken by an imager in the image-based assay is in focus or off focus, wherein the image of the samples taken by the imager under both in focus and off focus conditions are collected as training data, and they are labeled based on their known focus conditions. A machine learning model is selected and it is trained with the labeled training data. During the assaying process, the trained machine learning model is applied to the image of the sample taken by the imager to infer/predict if the image of the sample taken by the imager for assaying is in focus and to decide if the assaying result is trustworthy without requiring the preset and content dependent thresholds as in prior art.

In some embodiments, the monitor marks in the form of pillars are on the sample holding QMAX card to keep the gap between the two parallel plates of the sample holding QMAX card uniform. As such, the volume of the sample under the area-of-interest (AoI) in the image taken by the imager on the sample holding QMAX card can be determined by the AoI and the said gap between the two parallel plates thereof.

Evenness of analyte distribution in the sample: One factor that can affect the trustworthy of the assaying results is the evenness of the analytes distributed in the sample, and they are hard to detect by eyeball checking even with the experienced technicians.

In some embodiments of the present invention, an algorithm with a dedicated process based on machine learning is devised and applied to determine if analytes are distributed evenly in the sample for assaying from the image of the sample taken by the imager, wherein multiple images of samples taken by the imager are collected, from which analytes in the image of the sample are identified and labeled. A machine learning model (e.g. F-RCNN) is selected and it is trained with the labeled training images to detect the analytes in the image of the sample.

During the assaying process, the algorithm with its dedicated process comprises:
a) taking the image of the sample from the imager as input;
b) segmenting the image of the sample into equal-sized and non-overlapping image patches (e.g. 8×8 equal-sized small image patches);
c) applying the trained machine learning model to each constructed image patch to determine and not limited to the analyte concentration in each patch;
d) sorting the analyte concentration of the constructed image patches in ascending order and determining its 25% quantile Q1 and 75% quantile Q3 in the sorted concentration sequence of the constructed image patches;
e) applying a robust, non-parametric outlier detection algorithm to determine the evenness/uniformity of the analytes in the sample for assaying—from the analyte concentration distribution of the constructed image patches, wherein an inter-quantile-range based confidence measure is constructed and applied in some of the present invention:

confidence-IQR=$(Q3-Q1)/(Q3+Q1)$; and if the confidence-IQR exceeds a certain threshold (e.g. 30%), raise the flag and the assay result is not trustworthy, wherein the threshold depends on the influence of the uneven distribution to the final estimation which can be estimated from the training and evaluation data Aggregated analytes in the sample: In addition, aggregated analytes in the sample can affect the accuracy of the assaying results, especially they occupy a significant portion of the sample. For example, in complete blood count, certain portion of the red blood cells can be aggregated in the sample, especially if they are exposed in the open air for certain period of time. Aggregated analytes in the sample have various size and shape depending on how they are aggregated together. If the portion of the aggregated analytes exceeds a certain percentage in the sample; the sample should not be used for assaying.

In some embodiments of the present invention, a process based on machine learning is devised and applied to determine if analytes are aggregated/clustered in the sample for assaying from the image of the sample taken by the imager, wherein images of good samples and images of samples with various degrees of aggregated analytes in the sample are taken by the imager and collected as training data. Following the fine-grinned image segmentation algorithm described in the present invention, the aggregated analytes in the image are roughly labeled by bounding boxes first, regardless of their shape and shape contour details. A machine learning model (e.g. Fast RCNN) is selected and trained with the labeled training images—to detect the aggregated analyte clusters in the image of the sample with their bonding boxes, and after that, additional processing steps are performed to determine their fine grinned image segmentation based on the described fine grinned image segmentation algorithm in the present invention.

During the assaying process, the operations for aggregated analytes are performed, comprising:
a) taking the image of the sample from the imager as input;
b) applying the trained machine learning model for aggregated analytes to detect the aggregated analytes in the image pf the sample for assaying in bonding boxes;
c) determining their segmentation contour masks in the image of the sample following the described fine grinned image segmentation algorithm in the present invention;
d) determining the total area (area-aggregated-analytes-in-AoI) occupied by the aggregated analytes in the area-of-interest (AoI) in the image of the sample, by summing up all areas associated with the segmentation contour masks that cover them from (c);
e) determining the area ratio between the area-aggregated-analytes-in-AoI and the area-of-AoI in the image of the sample:

ratio-aggregated-analytes-area-in-AoI=area-aggregated-analytes-in-AoI/area-of-AoI; and f) raising flag on the trustworthy of the assaying results, if the ratio-aggregated-analytes-area-in-AoI exceeds a certain threshold, wherein in some embodiments of the described approach, the threshold is around 10-20%, wherein the threshold depends on the influence of the aggregated analytes area to the final estimation, which can be estimated from the training and evaluation data.

Dry-texture in the image of the sample: Dry-texture in the image of the sample is another factor that affects the trustworthy of the assaying results in image-based assay. This happens when the amount of the sample for assaying is below the required amount or certain portion of the sample in the image holding device dried out due to some unpredictable factors.

In some embodiments of the present invention, a process based on machine learning is devised and applied to detect dry-texture areas in the image of the sample taken by the imager in the image-based assay, wherein images of good samples without the dry-texture areas and images of samples with various degrees of dry-texture areas in the sample are collected as training data—from which dry-texture areas in the image are labeled roughly by bonding boxes, regardless of the shape and shape contour details. A machine learning model (e.g. Fast RCNN) is selected and trained with the labeled training images—to detect the dry-texture areas in the image of the sample with bonding boxes, and then following the described fine-grinned image segmentation algorithm in the present invention to determine the segmentation contour masks that covering them.

During the image-based assaying process, it performs the following processing operations, comprising:

a) taking the image of the sample from the imager as input;
b) applying the trained machine learning model (e.g. Fast RCNN) for dry-texture to the image of the sample for assaying, and detecting the dry-texture areas thereof in bonding boxes;
c) determining the segmentation contour masks by the described fine-grinned image segmentation algorithm in the present invention if there are dry-texture areas detected in the image of the sample in (b);
d) determining the total areas occupied by the dry-texture in the area-of-interest (AoI) (area-dry-texture-in-AoI) in the image of the sample for assaying, by summing up all areas of the detected dry-texture based on the segmentation contour masks that cover them in (c);
e) determining the area ratio between the area-dry-texture-in-AoI and the area-of-AoI in the image of the sample:

ratio-dry-texture-area-in-AoI=area-dry-texture-area-in-AoI/area-of-AoI; and f) raising the flag on the trustworthy of the assaying results, if the ratio-dry-texture-area-in-AoI exceeds a certain threshold, wherein in some embodiments of the described approach, the threshold is around 10%, wherein the threshold depends on the influence of dry-texture area to the final estimation, which can be estimated from the training and evaluation data.

Defects in the sample: Defects in the sample can seriously affect the trustworthy of the assaying results, wherein these defects can be any unwanted objects in the sample, including and not limited to dusts, oil, etc. They are hard to handle with prior art, because their occurrences and shapes in the sample are all random.

In some embodiments of the present invention, a dedicated process for defects detection is devised and applied to image-based assay, wherein images of good samples without the detects and images of samples with various degree of defects in the sample are collected as training data—from which defect areas in the image are labeled with a rough bonding box labeling. A machine learning model (e.g. Fast RCNN) is selected and trained with the labeled training images—to detect the defects in the image of the sample in bonding boxes, and following that the described fine-grinned image segmentation algorithms in the present invention are applied to determine the segmentation contour masks that covering them.

During the image-based assaying process, detects detection and area determination are performed to verify the trustworthy of the assaying results, comprising:

a) taking the image of the sample from the imager as input;
b) applying the trained machine learning model (e.g. Fast RCNN) for defects to the image of the sample for assaying, and detecting the defects thereof in bonding boxes;
c) determining their segmentation contour masks following the described fine-grinned image segmentation algorithm in the present invention;
d) determining the total areas occupied by the defects in the area-of-interest (AoI) (area-defects-in-AoI) in the image of the sample for assaying, by summing up all areas of detected defects based on the segmentation contour masks that cover them from (c);
e) determining the area ratio between the area-defects-in-Roll and the area-of-AoI in the image of the sample:

ratio-defects-in-AoI=area-defects-in-AoI/area-of-AoI; and f) raising the flag on the trustworthy of the assaying results, if the ratio-defects-in-AoI exceeds a certain threshold, wherein in some embodiments of the described approach, the threshold is around 15%, wherein the threshold depends on the influence of the area of defects to the final estimation, which can be estimated from the training and evaluation data.

Air bubbles in the sample: Air bubbles in the sample is a special type of defects occurring in assaying. Their occurrences are random—which can come from the operation procedures as well as the reactions between the analytes and other agents in the sample. Unlike the solid dusts, their occurrences are more random as their numbers, sizes and shapes can all vary with time.

In some embodiments of the present invention, a dedicated process is devised and applied to detect air bubbles in the sample in the image-based assay, wherein images of good samples without air bubbles and images of samples with various degree of air bubbles are collected as training data—from which air bubbles in the image are only roughly labeled by bounding boxes, regardless of their shape and shape contour details, A machine learning model (e.g. Fast RCNN) is selected and trained with the labeled training images—to detect the air bubbles in the image of the sample in bonding boxes. Then following the described fine-grinned image segmentation algorithm in present invention, it determines the segmentation contour masks that covering them in the image of the sample.

During the image-based assaying process, air bubbles detection and area determination are performed in some embodiments of the present invention, to verify the trustworthy of the assaying results comprising:

a) taking the image of the sample from the imager as input;
b) applying the trained machine learning model (e.g. Fast RCNN) for air bubbles to the image of the sample for assaying, and detecting the air bubbles in bonding boxes;
c) determining their segmentation contour masks by applying the described fine grinned image segmentation algorithm in the present invention;

d) determining the total areas occupied by the air bubbles in the area-of-interest (AoI) (area-defects-in-AoI) in the image of the sample for assaying, by summing up all areas of detected air bubbles based on the segmentation contour masks that cover them in (c);

e) determining the area ratio between the area-air-bubbles-in-AoI and the area-of-AoI in the image of the sample:

ratio-air-bubbles-in-AoI area-air-bubbles-in-AoI/area-of-AoI; and f) raising the flag on the trustworthy of the assaying results, if the ratio-air-bubbles-in-AoI exceeds a certain threshold, wherein in some embodiments of the described approach, the threshold is around 10%, wherein the threshold depends on the influence of air bubble areas to the final estimation, which can be estimated from the training and evaluation data.

In some embodiments of the present invention, a tighter threshold on air bubbles is applied, because a large amount of areas occupied by air bubbles is an indication of some chemical or biological reactions among the components in the sample for assaying or some defects/issues in the sample holding device.

Imaging-Based Assay Using Monitoring Marks

In an image-based assay for assaying an analyte in a sample, an imager is used to create an image of the sample which is on a sample holder, and the image is used in a determination of a property of the analyte.

However, many factors can make the image distorted (i.e. different from a real sample or an image in a perfect condition). The image distortion can lead to inaccuracy in a determination of a property of the analyte. For example, one fact is poor focusing, since a biological sample itself does not have a sharp edge that is preferred in a focusing. When the focusing is poor, the object dimension will be different from the real object, and other object (e.g. blood cells) can become unidentifiable. Another example is that a lens might be perfect, causing different location of the sample having different distortion. And another example is the sample holder is not in the same plane as the optical imaging system, causing a good focus in one area and poor focusing in other area.

The present invention is related to the devices and methods that can get a "true" image from a distorted image, hence improving the accuracy of an assay.

One aspect of the present invention is the devices and methods that use monitoring marks that has an optical observable flat surface that is parallel to neighboring surface Another aspect of the present invention is the devices and methods that use a QMAX card to make at least a part of the sample forming a uniform layer and use monitoring marks on the card to improve the assay accuracy Another aspect of the present invention is the devices and methods that use monitoring marks to together with computational imaging, artificial intelligence, and/or machine learning.

The term "lateral dimension" refers to the linear dimension in the plane of a thin sample layer that is being imaged.

The term "true lateral dimension (TLD)" and "Field of view (FoV)" are interchangeable.

The term "micro-feature in a sample" can refer to analytes, microstructures, and/or micro-variations of a matter in a sample. Analytes refer to particles, cells, macromolecules, such as proteins, nucleic acids and other moieties. Micro-structures can refer to microscale difference in different materials. Micro-variation refers to microscale variation of a local property of the sample. Example of micro-variation is a variation of local optical index and/or local mass. Examples of cells are blood cells, such as white blood cells, red blood cells, and platelets.

A. Monitoring Marks on A Solid-Phase Surface

A1-1. A device for assaying a micro-feature in a sample using an imager, the device comprising:
 (a) a solid-phase surface comprising a sample contact area for contacting a sample which contains a micro-feature; and
 (b) one or more monitoring marks, wherein the monitoring marks:
  i. are made of a different material from the sample;
  ii. are inside the sample during an assaying the microstructure, wherein the sample forms, on the sample contact area, a thin layer of a thickness less than 200 um;
  iii. have their lateral linear dimension of about 1 um (micron) or larger, and
  iv. have at least one lateral linear dimension of 300 um or less; and wherein during the assaying at least one monitoring mark is imaged by the imager
 wherein used during assaying the analyte; and a geometric parameter (e.g. shape and size) of the monitoring mark, and/or a pitch between monitoring marks are (a) predetermined and known prior to assaying of the analyte, and (b) used as a parameter in an algorithm that determines a property related to the micro-feature.

A1-2. A device for assaying a micro-feature in a sample using an imager, the device comprising:
 a solid-phase surface comprising a sample contact area for contacting a sample which contains a micro-feature; and
 one or more monitoring marks, wherein each monitoring mark comprises either a protrusion or a trench from the solid-phase surface, wherein:
  v. the protrusion or the trench comprises a flat surface that is substantially parallel to a neighbor surface that is a portion of the solid-phase surface adjacent the protrusion or the trench;
  vi. a distance between the flat surface and the neighboring surface is about 200 micron (um) or less;
  vii. the flat surface an area that has (a) a linear dimension is at least about 1 um or larger, and (b) at least one linear dimension 150 um or less;
  viii. the flat surface of at least one monitoring mark is imaged by an imager used during assaying the micro-feature; and
  ix. a shape of the flat surface, a dimension of the flat surface, a distance between the flat surface and the neighboring surface, and/or a pitch between monitoring marks are (a) predetermined and known prior to assaying of the micro-feature, and (b) used as a parameter in an algorithm that determines a property related to the micro-feature.

B. Monitoring Marks on QMAX Card

A2-1. A device for assaying a micro-feature in a sample using an imager, the device comprising:
 a first plate, a second plate, spacers, and one or more monitoring marks, wherein:
  i. the first plate and the second plate are movable relative to each other into different configurations;
  ii. each of the first plate and the second plate comprises an inner surface comprising a sample contact area for contacting a sample that contains a micro-feature;

iii. one or both of the first plate and the second plate comprises the spacers that are permanently fixed on the inner surface of a respective plate,
iv. the spacers have a substantially uniform height that is equal to or less than 200 microns, and a fixed inter-spacer-distance (ISD);
v. the monitoring marks are made of a different material from the sample;
vi. the monitoring marks are inside the sample during an assaying the microstructure, wherein the sample forms, on the sample contact area, a thin layer of a thickness less than 200 um; and
vii. the monitoring marks have their lateral linear dimension of about 1 um (micron) or larger, and have at least one lateral linear dimension of 300 um or less;

wherein during the assaying at least one monitoring mark is imaged by the imager wherein used during assaying the micro-feature; and a shape of the flat surface, a dimension of the flat surface, a distance between the flat surface and the neighboring surface, and/or a pitch between monitoring marks are (a) predetermined and known prior to assaying of the micro-feature, and (b) used as a parameter in an algorithm that determines a property related to the micro-feature;

wherein one of the configurations is an open configuration, in which: the two plates are partially or completely separated apart, the spacing between the plates is not regulated by the spacers, and the sample is deposited on one or both of the plates;

wherein another of the configurations is a closed configuration which is configured after the sample is deposited in the open configuration and the plates are forced to the closed configuration by applying the imprecise pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers; and wherein a monitoring mark is (i) a different structure from the spacers, or (ii) the same structure that is used as a spacer.

A2-2. A device for assaying a micro-feature in a sample using an imager, the device comprising:
a first plate, a second plate, spacers, and one or more monitoring marks, wherein:
viii. the first plate and the second plate are movable relative to each other into different configurations;
ix. each of the first plate and the second plate comprises an inner surface comprising a sample contact area for contacting a sample that contains a micro-feature;
x. one or both of the first plate and the second plate comprises the spacers that are permanently fixed on the inner surface of a respective plate,
xi. the spacers have a substantially uniform height that is equal to or less than 200 microns, and a fixed inter-spacer-distance (ISD);
xii. each monitoring mark comprises either a protrusion or a trench on one or both of the sample contact areas;
xiii. the protrusion or the trench comprises a flat surface that is substantially parallel to a neighbor surface that is a portion of the solid-phase surface adjacent the protrusion or the trench;
xiv. a distance between the flat surface and the neighboring surface is about 200 micron (um) or less;
xv. the flat surface an area that has (a) a linear dimension is at least about 1 um or larger, and (b) at least one linear dimension 150 um or less;
xvi. the flat surface of at least one monitoring mark is imaged by an imager used during assaying the micro-feature; and
xvii. a shape of the flat surface, a dimension of the flat surface, a distance between the flat surface and the neighboring surface, and/or a pitch between monitoring marks are (a) predetermined and known prior to assaying the micro-feature, and (b) used as a parameter in an algorithm that determines a property related to the micro-feature.

wherein one of the configurations is an open configuration, in which: the two plates are partially or completely separated apart, the spacing between the plates is not regulated by the spacers, and the sample is deposited on one or both of the plates;

wherein another of the configurations is a closed configuration which is configured after the sample is deposited in the open configuration and the plates are forced to the closed configuration by applying the imprecise pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers; and wherein a monitoring mark is (i) a different structure from the spacers, or (ii) the same structure that is used as a spacer.

A3. A device for image-based assay, comprising:
a device of any prior device embodiment, wherein the device has at least five monitoring marks wherein at least three of the monitoring marks are not aligned on a linear line.

A4. An apparatus for assaying an analyte in a sample using an imager, the system comprising:
(a) a device of any prior device embodiment; and
(b) an imager that is used in assaying a sample of containing an analyte.

A5. A system for performing an imaging-based assay, the system comprising:
(a) a device of any prior device embodiment;
(b) an imager that is used in assaying a sample of containing an analyte; and
(c) An algorithm that utilizes the monitoring marks of the device to determine a property related to the analyte.

In some embodiments, the thickness of the thin layer is configured, so that for a given analyte concentration there are monolayer of analytes in the thin layer. The term "monolayer" means that in the thin sample layer, there is no substantial overlap between two neighboring analyte in the direction normal to the plane of the sample layer.

C. Monitoring Marks with Computation Imaging Artificial Intelligence and/or Machine Learning Another aspect of the present invention is to combining the monitoring marks with computational imaging, artificial intelligence and/or machine learning. It utilizes a process of forming the images from measurements, using algorithms to process the image and map the objects in the image to their physical dimensions in real world. Machine learning (ML) is applied in the present invention to learn the salient features of the objects in the sample, embedded in the ML models built and trained from the images of the sample taken by the imager. Intelligent decision logic is built into and applied in the inference process of the present invention to detect and classify the target objects in the sample according to the knowledge embedded in the ML models. Computational Imaging is the process of indirectly forming images from measurements using algorithms that rely on a significant amount of computing.

A6. A system for assaying an analyte in a sample using an imager, the system comprising:
(a) a device of any prior device embodiment;
(b) an imager that is used in assaying a sample of containing an analyte; and
(c) An algorithm that utilizes monitoring marks of the device to assay a property related to the analyte, wherein the algorithm uses machine learning.

A7. A method for assaying an analyte in a sample using an imager, comprising:
(a) obtaining a device, apparatus, or a system of any prior embodiment;
(b) obtaining a sample and depositing the sample on a sample contact area in the device, apparatus, or system in (a), wherein the sample contains an analyte; and
(c) assaying the analyte.

8. A method for assaying an analyte in a sample using an imager, comprising:
(a) obtaining a device, apparatus, or a system of any prior embodiment;
(b) obtaining a sample and depositing the sample on a sample contact area in the device, apparatus, or system in (a), wherein the sample contains an analyte;
(c) assaying the analyte, wherein the assaying comprise a step of using machine learning.

One key idea of the present invention is to use pillars in the sample holding device, e.g. QMAX device, as detectable anchors for calibration and improving the accuracy of image-based assay. In QMAX device, pillars are monitor marks to keep the gap between the two plates that holds the sample in the sample holding device uniform. However, detecting pillars accurately in the sample holding device as anchors for calibration and improving the accuracy of the assay is a challenge, because pillars are permeated and surrounded by the analytes inside the sample holding device. And moreover, their images are distorted and blurred in microscopic imaging from the spherical (barrel) distortion of the lens, light diffraction from microscopic objects, defects at microscopic level, mis-alignment in focusing, noise in the sample image, etc. And it becomes more difficult if imaging is taken by commodity devices (e.g. cameras from smart phones), because those cameras are not calibrated by the dedicated hardware once they left the manufacture.

In the present invention, the pillar detection is formulated into a machine learning framework—to detect pillars in the sample holding device (e.g. QMAX device)—with an accuracy suitable for calibration and accuracy improvement in image-based assay. Since the distribution and physical configuration of the pillars are known priori and controlled by fine nanoscale fabrication, e.g. QMAX device, it makes this innovative approach of using detectable monitor marks, e.g. pillars, as anchors in image-based assay not only feasible but also effective.

In some embodiments, the algorithm of any prior embodiment comprises an algorithm of computational imaging, artificial intelligence and/or machine learning.

In some embodiments, the algorithm of any prior embodiment comprises an algorithm of machine learning.

In some embodiments, the algorithm of any prior embodiment comprises an algorithm of artificial intelligence and/or machine learning.

In some embodiments, the algorithm of any prior embodiment comprises an algorithm of computational imaging, and/or machine learning.

In some embodiments, it devises a machine learning based pillar detection to detect the pillars from the image of the sample, and from there, it applies the known configuration and distribution of pillars from the card fabrication to construct the good point set, i.e. points at the image plan and points at the physical plan of the card that correspond to each other. Then based on the detected good point set, calculate a homographic (perspective) transform that maps the distorted image plan to the physical plan of the sample with correct TLD (true-lateral-dimension). FIG. 6 is a flow diagram of the true-lateral-dimension (TLD) estimation and correction using machine learning based on pillars, and an embodiment of the present invention comprises:

(1) Using a sample loading device in image-based assay, e.g. QMAX device, wherein there are monitor marks with known configuration residing in the device that are not submerged in the sample and can be imaged from the top by an imager in the image-based assay;
(2) take the image of the sample in the sample loading device including analytes and monitor marks;
(3) build and train a machine learning (ML) model for detecting the monitor marks in the sample holding device from the images taken by the imager;
(4) detect and locate the monitor marks in the sample loading device from the sample image taken by the imager using the said ML detection model from (3);
(5) generate a marker grid from the detected monitor marks in (4);
(6) calculate a homographic transform based on the generated monitor mark grid; and
(7) estimate the TLD, and determine the area, size, and concentration of the imaged analytes in the image-based assay.

The present invention can be further refined to perform region based TLD estimation and calibration to improve the accuracy of the image-based assay. An embodiment of such an approach comprises:

(1) Use a sample loading device in image-based assay, e.g. QMAX device, wherein there are monitor marks—not submerged in the sample and residing in the device that can be imaged from the top by an imager in the image-based assay;
(2) take an image of the sample in the sample holding device including analytes and monitor marks;
(3) build and train a machine learning (ML) model for detecting the monitor marks in the sample holding device from the images taken by the imager;
(4) partition the image of the sample taken by the imager into non-overlapping regions;
(5) detect and locate monitor marks from the sample image taken by the imager using the ML model of (3);
(6) generate a region-based mark grid for each of the region with more than 5 non-colinear monitor marks detected in the local region;
(7) generate a mark grid for all regions not in (6) based on detected monitor marks from the image of the sample taken by the imager;
(8) calculate a region-specific homographic transform for each region in (6) based on its own region-based mark grid generated in (6);
(9) calculate a homographic transform for all other regions based on the mark grid generated in (7);
(10) estimate the region based TLD for each region in (6) based on the region based homographic transform generated in (8);
(11) estimate the TLD for other regions based on the homographic transform from (9); and

(12) apply the estimated TLDs from (10) and (11) to determine the area and concentration of the imaged analytes in each partition in the image-based assay.

In some embodiments, the monitoring mark has a sharp edge and a flat surface.

In some embodiments, the monitoring mark is used to determine the local properties of an image and/or local operating conditions (e.g. gap size, plate qualities)

In some embodiments, the monitoring mark has the same shape as the spacers.

Monitoring Assay Operation Using Monitoring Marks

One aspect of the present invention is that for assaying with a QMAX card that have two moveable plates, monitoring marks placed inside a thin sample can be used to monitor the operating conditions for the QMAX card. The operating conditions can include whether the sample is loaded properly, whether the two plates are closed properly, whether the gap between the two plates is the same or approximately the same as a predetermined value.

In some embodiments, for a QMAX card that comprise two movable plates and has, in a closed configuration, a predetermined gap between the two plates, the operating conditions of the QMAX assay is monitored by taking the images of the monitoring mark in a closed configuration. For example, if the two plates are not closed properly, the monitoring marks will appear differently in an image than if the two plates are closed properly. A monitoring mark surrounded by a sample will have a different appearance than a monitoring mark not surrounded by the sample. Hence, it can provide information on the sample loading conditions.

Z-1.1 A device for using a monitoring mark to monitor an operating condition of the device, the device comprising:
a first plate, a second plate, spacers, and one or more monitoring marks, wherein:
  i. the first plate and the second plate are movable relative to each other into different configurations;
  ii. each of the first plate and the second plate comprises an inner surface comprising a sample contact area for contacting a sample being analyzed;
  iii. one or both of the first plate and the second plate comprises the spacers that are permanently fixed on the inner surface of a respective plate,
  iv. the monitoring mark has at least one of its dimensions that (a) is predetermined and known, and (b) is observable by an imager;
  v. the monitoring mark is a microstructure that has at least one lateral linear dimension of 300 um or less; and
  vi. the monitoring mark is inside the sample;
wherein one of the configurations is an open configuration, in which: the two plates are partially or completely separated apart, the spacing between the plates is not regulated by the spacers, and the sample is deposited on one or both of the plates;
wherein another of the configurations is a closed configuration which is configured after the sample is deposited in the open configuration and the plates are forced to the closed configuration by applying the imprecise pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers; and
wherein, after a force is used in making the two plates reach a close configuration, the monitoring mark is imaged to determine (i) whether the two plates have reached the intended closed configuration thereby regulating the sample thickness to be approximately a predetermined thickness, and/or (ii) to determine whether a sample has been loaded as desired.

In some embodiments, the image of the monitoring mark is used to determine whether the two plates have reached the intended closed configuration, wherein the sample is regulated to have a thickness of approximately a predetermined thickness.

In some embodiments, the image of the monitoring mark is used to determine whether a sample has been loaded as desired.

In some embodiments, the monitoring mark is imaged to determine whether the two plates have reached the intended closed configuration wherein the sample thickness is regulated to be a predetermined thickness, and to determine whether a sample has been loaded as desired.

In some embodiments, the spacers serve as the monitoring marks.

In some embodiments, the system comprises the device and a computational device and a non-transitory computer readable medium having instructions that, when executed, it performs the determination.

In some embodiments, a non-transitory computer readable medium having instructions that, when executed, perform a method comprising using one or more images of a thin sample layer together with monitoring marks to determine (i) whether the two plates have reached the intended closed configuration thereby regulating the sample thickness to be approximately a predetermined thickness, or (ii) whether a sample has been loaded as desired.

In some embodiments, the system comprises a non-transitory computer readable medium having instructions that, when executed, perform any method of the present disclosure.

W-1. A method for using a monitoring mark to monitor an operating condition of the device, the method comprising:
  (a) obtaining a device of any prior embodiment, wherein the device comprises two movable plates, spacers, and one or more monitoring marks where the monitoring marks are in the sample contact area;
  (b) obtaining an imager;
  (c) depositing a sample in the sample contact area of the device of (a), and forcing the two plates into a closed configuration;
  (d) taking, using the imager, one or more images of the thin sample layer together with the monitoring marks; and
  (e) using the image of the monitoring marks to determine (i) whether the two plates have reached the intended closed configuration thereby regulating the sample thickness to be approximately a predetermined thickness, or (ii) whether a sample has been loaded as desired.

In some embodiments, the image of the monitoring mark is used to determine whether the two plates have reached the intended closed configuration, wherein the sample is regulated to have a thickness of approximately a predetermined thickness.

In some embodiments, the image of the monitoring mark is used to determine whether a sample has been loaded as desired.

In some embodiments, the monitoring mark is imaged to determine whether the two plates have reached the intended closed configuration wherein the sample thickness is regulated to be a predetermined thickness, and to determine whether a sample has been loaded as desired.

In some embodiments, the system comprising the device and a computational device and a non-transitory computer readable medium having instructions that, when executed, it performs the determination.

Selecting Area of Interest and/or Removing Defect Image Area

In some embodiments, the sample has defects, a method of removing the effect of the defects to assay, comprising: identifying the defects in the image, taking the defect image our or selecting good area of the image that does not have the image caused by defects.

In some embodiments, the area of taking removed from the image is larger than the area of the defect image area.

In some embodiments, the thickness of the sample is configured to a thin thickness, so that the objects (e.g. cells) of interests forming a monolayer (i.e. there is no significant overlap between the object in the direction normal to the sample layer.

A method for determining a fabrication quality of a QMAX card using an imager, the method comprising:
- (f) obtaining a device of any prior embodiment, wherein the device comprises two movable plates, spacers, and one or more monitoring marks where the monitoring marks are in the sample contact area;
- (g) obtaining an imager;
- (h) depositing a sample in the sample contact area of the device of (a), and forcing the two plates into a closed configuration;
- (i) taking, using the imager, one or more images of the thin sample layer; and
- (j) using the image of the monitoring marks to determine a fabrication quality of the QMAX card.

The method of any prior embodiment, wherein determining the fabrication quality comprises measuring a characteristic (e.g., a length, width, pitch, webbing) of one or more monitoring marks, and comparing the measured characteristic with a reference value to determine a fabrication quality of the QMAX card.

The method of any prior embodiment, wherein determining the fabrication quality comprises measuring a first characteristic (e.g., an amount, a length, width, pitch, webbing) of one or more first monitoring marks, and comparing the measured first characteristic with a second characteristic (e.g., a number, a length, width, pitch, webbing) of one or more second monitoring marks to determine a fabrication quality of the QMAX card.

The method of any prior embodiments, wherein the determining is performed during use of the device of any prior embodiment to analyze a sample.

Another aspect of the present invention is to make the monitor marks have a periodic pattern in the sample holding device, such as in QMAX device, such that they occur periodically with a certain pitch in the image of the sample taken by an imager. Based on this periodic property, the monitor mark detection can become very reliable, since all monitor marks can be identified and derived from just few detected ones as they are positioned periodically in prespecified configuration, and moreover, such configuration can be made precise with nanofabrication technologies such as nanoimprint. And from there, both sample image based and image region based TLD estimation can become more accurate and robust, because of the periodic pattern of the monitor marks.

A. Sample Holder Having Micro-Marks

Single Plate

AA-1.1 A device for assaying a micro-feature in a thin sample using an imager, the device comprising:
- (a) a solid-phase surface comprising a sample contact area for contacting a thin sample having a thickness of 200 um or less, and comprising or is suspected to comprise a micro-feature; and
- (b) one or more marks, wherein the mark:
    - x. has a sharp edge that (i) has predetermined and known shape and dimension, and (ii) is observable by an imager that images the micro-feature;
    - xi. is a microstructure that at least one lateral linear dimension of 300 um or less; and
    - xii. is inside the sample;

wherein at least one of the marks is imaged by the imager during the assaying.

AA-1.2 A device for assaying a micro-feature in a thin sample using an imager, the device comprising:
- (a) a solid-phase surface comprising a sample contact area for contacting a thin sample that (i) has a thickness of 200 um or less and (ii) comprises or is suspected to comprise a micro-feature; and
- (b) one or more marks, wherein the mark:
    - i. comprises either a protrusion or a trench from the solid-phase surface
    - ii. has a sharp edge that is observable by an imager that images the micro-feature;
    - iii. is a microstructure that at least one lateral linear dimension of 300 um or less; and
    - iv. is inside the sample;

wherein at least one of the marks is imaged by the imager during the assaying.

Two Plates with a Constant Spacing

AA-2.1 A device for assaying a micro-feature in a thin sample using an imager, the device comprising:

a first plate, a second plate, and one or more monitoring marks, wherein:
- xviii. each of the first plate and the second plate comprises an inner surface comprising a sample contact area for contacting a sample that comprises or is suspected to comprise a micro-feature;
- xix. at least a portion of the sample is confined by the first and second plates into a thin layer of substantial constant thickness that 200 um or less;
- xx. the monitoring mark has a sharp edge that (a) has predetermined and known shape and dimension, and (b) is observable by an imager that images the micro-feature;
- xxi. the monitoring mark is a microstructure that at least one lateral linear dimension of 300 um or less; and
- xxii. the monitoring mark is inside the sample;

wherein at least one of the marks is imaged by the imager during the assaying.

Two Movable Plates

AA-3 A device for assaying a micro-feature in a thin sample using an imager, the device comprising:

a first plate, a second plate, spacers, and one or more monitoring marks, wherein:
- vii. the first plate and the second plate are movable relative to each other into different configurations;
- viii. each of the first plate and the second plate comprises an inner surface comprising a sample contact area for contacting a sample that comprises or is suspected to comprise a micro-feature;
- ix. one or both of the first plate and the second plate comprises the spacers that are permanently fixed on the inner surface of a respective plate, x. the monitoring mark has a sharp edge that (a) has predetermined and known shape and dimension, and (b) is observable by an imager that images the micro-feature;

xi. the monitoring mark is a microstructure that at least one lateral linear dimension of 300 um or less; and xii. the monitoring mark is inside the sample;

wherein at least one of the marks is imaged by the imager during the assaying.

wherein one of the configurations is an open configuration, in which: the two plates are partially or completely separated apart, the spacing between the plates is not regulated by the spacers, and the sample is deposited on one or both of the plates;

wherein another of the configurations is a closed configuration which is configured after the sample is deposited in the open configuration and the plates are forced to the closed configuration by applying the imprecise pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers; and wherein a monitoring mark is (i) a different structure from the spacers, or (ii) the same structure that is used as a spacer.

B. Image taking Improvement Using Sample Holder Having Micro-Marks

BB-1. An apparatus for improving image-taking of a micro-feature in a sample, the apparatus comprising:
  (c) a device of any prior device embodiment; and
  (d) an imager being used in assaying a sample that comprises or is suspected to comprise a micro-feature;
  wherein the imager takes images, wherein at least one image comprises both a portion of sample and the monitoring.

BB-2. A system for improving image-taking of a micro-feature in a sample, the system comprising:
  (d) a device of any prior device embodiment;
  (e) an imager being used in assaying a sample of comprises or is suspected to comprise a micro-feature; and
  (f) a non-transitory computer readable medium having instructions that, when executed, utilize the mark as a parameter together with an imaging processing method to adjust the setting of the imager for the next image.

C. Imaging Analysis Using Sample Holder Having Micro-Marks

CC-1: An apparatus for improving analysis of an image of a micro-feature in a sample, the apparatus comprising:
  (a) a device of any prior device embodiment; and
  (b) a computation device being used in receiving an image of a mark and a sample that comprises or is suspected to comprise a micro-feature;
  wherein the computation device runs an algorithm that utilizes the mark as a parameter together with an imaging processing method to improve the image quality in the image.

CC-2: A system for improving analysis of images of a micro-feature in a sample, the system comprising:
  (a) a device of any prior device embodiment;
  (b) an imager being used in assaying a sample of comprises or is suspected to comprise a micro-feature by taking one or multiple images of the sample and the mark; and
  (c) a non-transitory computer readable medium having instructions that, when executed, utilize the mark as a parameter together with an imaging processing method to improve the image quality in at least one image taken in (c).

CC-3: A computer program product for assaying a micro-feature in a sample, the program comprising computer program code means applied and adapted for, in at least one image:
  (a) receiving an image of a sample and the monitoring mark(s), wherein the sample is loaded into device of any prior device claim, and wherein the image is taken by an imager; and
  (b) processing and analyzing the image to calculate the amount of the micro-feature, wherein the analyzing uses a detection model that is based on machine learning and the information provided by the image of the monitoring mark(s).

CC-4: A computing devices for assaying a micro-feature in a sample, the computation device comprising a computing devices that operate the algorithms in any of embodiments of the present invention.

CC-5: The method, device, computer program product, or system of any prior embodiment, wherein the improvement of the image quality comprises at least one selected from the group consisting of denoising, image normalization, image sharpening, image scaling, alignment (e.g., for face detection), super resolution, deblurring, and any combination of thereof.

CC-6: The method, device, computer program product, or system of any prior embodiment, wherein the imaging processing method comprises at least one selected from the group consisting of a histogram-based operation, a mathematics-based operation, a convolution-based operation, a smoothing operation, derivative-based operation, a morphology-based operation, shading correction, image enhancement and/or restoration, segmentation, feature extraction and/or matching, object detection and/or classification and/or localization, image understanding, and any combination of thereof.

CC-6.1: The method, device, computer program product, or system of any prior embodiment, wherein the histogram-based operation comprises at least one selected from the group consisting of contrast stretching, equalization, minimum filtering, median filtering, maximum filtering, and any combination thereof.

CC-6.2: The method, device, computer program product, or system of any prior embodiment, wherein the mathematics-based operation comprises at least one selected from the group consisting of binary operation (e.g., NOT, OR, AND, XOR, and SUB) arithmetic-based operations (e.g., ADD, SUB, MUL, DIV, LOG, EXP, SQRT, TRIG, and INVERT), and any combination thereof.

CC-6.3: The method, device, computer program product, or system of any prior embodiment, wherein the convolution-based operation comprises at least one selected from the group consisting of an operation in the spatial domain, Fourier transform, DCT, integer transform, an operation in the frequency domain, and any combination thereof.

CC-6.4: The method, device, computer program product, or system of any prior embodiment, wherein the smoothing operation comprises at least one selected from the group consisting of a linear filter, a uniform filter, a triangular filter, a Gaussian filter, a non-linear filter, a medial filter a kuwahara filter, and any combination thereof.

CC-6.5: The method, device, computer program product, or system of any prior embodiment, wherein the derivative-based operation comprises at least one selected from the group consisting of a first-derivative operation, a gradient filter, a basic derivative filter, a Prewitt gradient filters, a Sobel gradient filter, an alternative gradient filter, a Gaussian gradient filter, a second derivative filter, a basic second derivative filter, a frequency domain Laplacian, a Gaussian second derivative filter, an Alternative Laplacian filter, a Second-Derivative-in-the-Gradient-Direction (SDGD) filter, a third derivative filter, a higher derivative filter (e.g., a greater than third derivative filter), and any combination thereof.

CC-6.6: The method, device, computer program product, or system of any prior embodiment, wherein the morphology-based operation comprises at least one selected from the group consisting of dilation, erosion, Boolean convolution, opening and/or closing, hit-and-miss operation, contour, skeleton, propagation, gray-value morphological processing, Gray-level dilation, gray-level erosion, gray-level opening, gray-level closing, morphological smoothing, morphological gradient, morphological Laplacian, and any combination thereof.

CC-6.7: The method, device, computer program product, or system of any prior embodiment, wherein the image enhancement and/or restoration comprises at least one selected from the group consisting of sharpening, unsharpening, noise suppression, distortion suppression, and any combination thereof.

CC-6.8: The method, device, computer program product, or system of any prior embodiment, wherein the segmentation comprises at least one selected from the group consisting of thresholding, fixed thresholding, Histogram-derived thresholding, Isodata algorithm, background-symmetry algorithm, Triangle algorithm, Edge finding, Gradient-based procedure, zero-crossing based procedure, PLUS-based procedure, Binary mathematical morphology, salt-or-pepper filtering, Isolate objects with holes, filling holes in objects, removing border-touching objects, Exo-skeleton, Touching objects, Gray-value mathematical morphology, Top-hat transform, thresholding, Local contrast stretching, and any combination thereof.

CC-6.9: The method, device, computer program product, or system of any prior embodiment, wherein the feature extraction and/or matching comprises at least one selected from the group consisting of Independent component analysis, Isomap, Kernel Principal Component Analysis, Latent semantic analysis, Partial least squares, Principal component analysis, Multifactor dimensionality reduction, Nonlinear dimensionality reduction, Multilinear principal component Analysis, Multilinear subspace learning, Semidefinite embedding, Autoencoder, and any combination thereof.

NN1. A device for assaying a micro-feature in a sample using an imager, the device comprising:
  (a) a solid-phase surface comprising a sample contact area for contacting a sample which comprises a micro-feature; and
  (b) one or more monitoring marks, wherein the monitoring marks:
    v. are made of a different material from the sample;
    vi. are inside the sample during an assaying the microstructure, wherein the sample forms, on the sample contact area, a thin layer of a thickness less than 200 um;
    vii. have their lateral linear dimension of about 1 um (micron) or larger, and
    viii. have at least one lateral linear dimension of 300 um or less; and
  wherein during the assaying at least one monitoring mark is imaged by the imager wherein used during assaying the analyte; and a geometric parameter (e.g. shape and size) of the monitoring mark, and/or a pitch between monitoring marks are (a) predetermined and known prior to assaying of the analyte, and (b) used as a parameter in an algorithm that determines a property related to the micro-feature.

NN2. A device for assaying a micro-feature in a sample using an imager, the device comprising:
  a solid-phase surface comprising a sample contact area for contacting a sample which comprises a micro-feature; and
  one or more monitoring marks, wherein each monitoring mark comprises either a protrusion or a trench from the solid-phase surface, wherein:
    ix. the protrusion or the trench comprises a flat surface that is substantially parallel to a neighbor surface that is a portion of the solid-phase surface adjacent the protrusion or the trench;
    x. a distance between the flat surface and the neighboring surface is about 200 micron (um) or less;
    xi. the flat surface an area that has (a) a linear dimension is at least about 1 um or larger, and (b) at least one linear dimension 150 um or less;
    xii. the flat surface of at least one monitoring mark is imaged by an imager used during assaying the micro-feature; and
    xiii. a shape of the flat surface, a dimension of the flat surface, a distance between the flat surface and the neighboring surface, and/or a pitch between monitoring marks are (a) predetermined and known prior to assaying of the micro-feature, and (b) used as a parameter in an algorithm that determines a property related to the micro-feature.

NN3. A device for assaying a micro-feature in a sample using an imager, the device comprising:
  a first plate, a second plate, spacers, and one or more monitoring marks, wherein:
    xiii. the first plate and the second plate are movable relative to each other into different configurations;
    xiv. each of the first plate and the second plate comprises an inner surface comprising a sample contact area for contacting a sample that comprises a micro-feature;
    xv. one or both of the first plate and the second plate comprises the spacers that are permanently fixed on the inner surface of a respective plate;
    xvi. the spacers have a substantially uniform height that is equal to or less than 200 microns, and a fixed inter-spacer-distance (ISD);
    xvii. the monitoring marks are made of a different material from the sample;
    xviii. the monitoring marks are inside the sample during an assaying the microstructure, wherein the sample forms, on the sample contact area, a thin layer of a thickness less than 200 um; and
    xix. the monitoring marks have their lateral linear dimension of about 1 um (micron) or larger, and have at least one lateral linear dimension of 300 um or less;
  wherein during the assaying at least one monitoring mark is imaged by the imager wherein used during assaying the micro-feature; and a shape of the flat surface, a dimension of the flat surface, a distance between the flat surface and the neighboring surface, and/or a pitch between monitoring marks are (a) predetermined and known prior to assaying of the micro-feature, and (b) used as a parameter in an algorithm that determines a property related to the micro-feature;
  wherein one of the configurations is an open configuration, in which: the two plates are partially or completely separated apart, the spacing between the plates is not regulated by the spacers, and the sample is deposited on one or both of the plates;

wherein another of the configurations is a closed configuration which is configured after the sample is deposited in the open configuration and the plates are forced to the closed configuration by applying the imprecise pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers; and wherein a monitoring mark is (i) a different structure from the spacers, or (ii) the same structure that is used as a spacer.

NN4. A device for assaying a micro-feature in a sample using an imager, the device comprising:

a first plate, a second plate, spacers, and one or more monitoring marks, wherein:
  xx. the first plate and the second plate are movable relative to each other into different configurations;
  xxi. each of the first plate and the second plate comprises an inner surface comprising a sample contact area for contacting a sample that comprises a micro-feature;
  xxii. one or both of the first plate and the second plate comprises the spacers that are permanently fixed on the inner surface of a respective plate,
  xxiii. the spacers have a substantially uniform height that is equal to or less than 200 microns, and a fixed inter-spacer-distance (ISD);
  xxiv. each monitoring mark comprises either a protrusion or a trench on one or both of the sample contact areas;
  xxv. the protrusion or the trench comprises a flat surface that is substantially parallel to a neighbor surface that is a portion of the solid-phase surface adjacent the protrusion or the trench;
  xxvi. a distance between the flat surface and the neighboring surface is about 200 micron (um) or less;
  xxvii. the flat surface an area that has (a) a linear dimension is at least about 1 um or larger, and (b) at least one linear dimension 150 um or less;
  xxviii. the flat surface of at least one monitoring mark is imaged by an imager used during assaying the micro-feature; and
  xxix. a shape of the flat surface, a dimension of the flat surface, a distance between the flat surface and the neighboring surface, and/or a pitch between monitoring marks are (a) predetermined and known prior to assaying the micro-feature, and (b) used as a parameter in an algorithm that determines a property related to the micro-feature.

wherein one of the configurations is an open configuration, in which: the two plates are partially or completely separated apart, the spacing between the plates is not regulated by the spacers, and the sample is deposited on one or both of the plates;

wherein another of the configurations is a closed configuration which is configured after the sample is deposited in the open configuration and the plates are forced to the closed configuration by applying the imprecise pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers; and wherein a monitoring mark is (i) a different structure from the spacers, or (ii) the same structure that is used as a spacer.

NN5. A device for image based assay, comprising:

a device of any prior device embodiment, wherein the device has at least five monitoring marks wherein at least three of the monitoring marks are not aligned on a linear line.

NN6. An apparatus for assaying a micro-feature in a sample using an imager, the system comprising:
  (c) a device of any prior device embodiment; and
  (d) an imager that is used in assaying a sample of comprising a micro-feature.

NN7. A system for performing an imaging-based assay, the system comprising:
  (d) a device of any prior device embodiment;
  (e) an imager that is used in assaying a sample of comprising a micro-feature; and
  (f) a non-transitory computer readable medium comprising instructions that, when executed, utilize the monitoring marks of the device to determine a property related to the micro-feature.

NN8. A system for assaying a micro-feature in a sample using an imager, the system comprising:
  (g) a device of any prior device embodiment;
  (h) an imager that is used in assaying a sample of comprising a micro-feature; and
  (i) a non-transitory computer readable medium comprising instructions that, when executed, utilize monitoring marks of the device to assay a property related to the micro-feature, wherein the instructions comprise machine learning.

NN9. A method for assaying a micro-feature in a sample using an imager, comprising:
  (d) obtaining a device, apparatus, or a system of any prior embodiment;
  (e) obtaining a sample and depositing the sample on a sample contact area in the device, apparatus, or system in (a), wherein the sample comprises a micro-feature; and
  (f) assaying the micro-feature.

NN10. A method for assaying a micro-feature in a sample using an imager, comprising:
  (d) obtaining a device, apparatus, or a system of any prior embodiment;
  (e) obtaining a sample and depositing the sample on a sample contact area in the device, apparatus, or system in (a), wherein the sample comprises a micro-feature;
  (f) assaying the micro-feature, wherein the assaying comprise a step of using machine learning.

T1. A method for determining, from a distorted image, a true-lateral-dimension (TLD) of a sample on a sample holder, the method comprising:
  (a) obtaining a device of any prior embodiment, wherein the device comprises one or more monitoring marks in the sample contact area;
  (b) obtaining an imager, a computation hardware, and a non-transitory computer readable medium comprising an algorithm;
  (c) depositing, in the sample contact area of the device of (a), a thin sample layer comprising a micro-feature;
  (d) taking, using the imager, one or more images of the thin sample layer together with the monitoring marks, wherein the imager is positioned above the thin sample layer; and
  (e) determining the true-lateral-dimension of the sample using the algorithm;

wherein
- (i) the algorithm is a computer code that is executed on a computer system; and
- (ii) the algorithm uses an image of the monitoring marks as parameters.

T2. A method for determining, from a distorted image, the true-lateral-dimension (TLD) of a sample on a sample holder, the method comprising:
- (a) obtaining a device of any prior embodiment, wherein the device comprises the one or more monitoring marks in the sample contact area;
- (b) obtaining an imager, a computation hardware, and a non-transitory computer readable medium comprising an algorithm;
- (c) depositing, in the sample contact area of the device in (a), a thin sample layer comprising a micro-feature;
- (d) taking, using the imager, one or more images of the thin sample layer together with the monitoring marks, wherein the imager is positioned above the thin sample layer; and
- (e) determining the true-lateral-dimension and the coordinates of the imaged sample in real world by physical metrics (e.g. micrometers) using the algorithm;

wherein
- (i) the algorithm is a computer code that is executed on a computer system; and
- (ii) the algorithm uses an image of the monitoring marks as parameters.

T3. The device, method, or system of any prior embodiment, wherein micro-features from the sample and monitoring marks are disposed within the sample holding device.

T4. The device, method, or system of any prior embodiment, wherein the determining comprises detecting and locating the monitoring marks in the image of the sample taken by the imager.

T5. The device, method, or system of any prior embodiment, wherein the determining comprises generating a monitoring mark grid based on the monitoring marks detected from the image of the sample taken by the imager.

T6. The device, method, or system of any prior embodiment, wherein the determining comprises calculating a homographic transform from the generated monitoring mark grid.

T7. The device, method, or system of any prior embodiment, wherein the determining comprises estimating the TLD from the homographic transform, and determining the area, size, and concentration of the detected micro-features in the image-based assay.

T8. The method, device or system of any prior embodiment, wherein the TLD estimation is based on regions in a sample image taken by the imager, comprising:
- (a) obtaining a sample;
- (b) loading the sample into a sample holding device, e.g. QMAX device, wherein there are monitoring marks, wherein the monitoring marks are not submerged in the sample and reside in the device that can be imaged from the top by an imager in the image-based assay;
- (c) taking an image of the sample in the sample loading device including micro-features and monitoring marks;
- (d) detecting the monitoring marks in the sample image taken by the imager;
- (e) partitioning the sample image into non-overlapping regions;
- (f) generating a region-based mark grid for each of the non-overlapping regions with more than 5 non-colinear monitoring marks detected in the local region;
- (g) generating a mark grid for all other regions not in (f) based on the monitoring marks detected from the sample image taken by the imager;
- (h) calculating a region-specific homographic transform for each region in (f) based on its own region-based mark grid generated from (f);
- (i) calculating a homographic transform for all other regions not in (f) based on the mark grid generated in (g);
- (j) estimating the region-based TLD for each region in (f) based on the region-based homographic transform of (g);
- (k) estimating the TLD for other regions not in (f) based on the homographic transform of (i); and
- (l) applying the estimated TLDs from (j) and (k) to determine the area and concentration of the imaged micro-features in each image partition in the image-based assay.

T9. The method, device or system of any prior embodiment, wherein the monitoring marks in the sample holding device are distributed according to a periodic pattern with a defined pitch period.

T10. The method, device or system of any prior embodiment, wherein the said monitoring marks are detected and applied as detectable anchors for calibration and improving the measurement accuracy in the image-based assay.

T11. The method, device or system of any prior embodiment, wherein the detection of the monitoring marks in the sample image taken by the imager utilizes the periodicity of the monitoring mark distribution in the sample holding device for error correction and/or the reliability of the detection.

T12. The method, device or system of any prior embodiment, wherein the detection, identification, area and/or shape contour estimation of the said monitoring marks in image-based assay are through machine learning (ML) with ML based monitoring mark detection models and apparatus built or trained from the image taken by the imager on the said device in the image-based assay.

T13. The method, device or system of any prior embodiment, wherein the detection, identification, area and/or shape contour estimation of the said monitoring marks in image-based assay are through image processing or image processing combined with machine learning.

T14. The method, device or system of any prior embodiment, wherein the detected monitoring marks are applied to TLD estimation in the image-based assay to calibrate the system and/or improve the measurement accuracy in the imaged-based assay.

T15. The method, device or system of any prior embodiment, wherein the detected monitoring marks are applied and not limited to micro-feature size, volume and/or concentration estimation in image-based assay to calibrate the system and/or improve the measurement accuracy.

T16. The method, device or system of any prior embodiment, wherein the detection of the monitoring marks and/or TLD estimation are applied to the fault detection in image-based assay, including and not limited to detecting defects in the sample holding device, mis-placement of the sample holding device in the imager, and/or the focusing fault of the imager.

T17. The method, device or system of any prior embodiment, wherein the said monitoring marks are detected as anchors to apply in a system to estimate the area of an object in image-based assay, comprising:

i. loading the sample to a sample holding device having monitoring marks residing in said device in image-based assay;
ii. taking the image of the sample in the sample holding device including the micro-features and the monitoring marks; and
iii. detecting the monitoring marks in the image of the sample taken by the imager on the sample holding device, determine the TLD and calculate the area estimation in the image-based assay to determine the size of the imaged object from pixels in the image to its physical size of micrometers in the real world.

T18. The method, device or system of any prior embodiment, wherein the system comprises:
i. detecting the monitoring mark in a digital image;
ii. generating a monitoring mark grid;
iii. calculating the image transform based on the monitoring mark grid; and
iv. estimating the area of the object in image of the sample and its physical size in the real world in image-based assay.

T19. The method, device or system of any prior embodiment, wherein the generated monitoring mark grid from the detected monitoring marks is used to calculate a homographic transform to estimate TLD, the area of the object in the image of the sample taken by the imager, and the physical size of the object in the real world.

T20. The method, device or system of any prior embodiment, wherein the method comprises:
i. partitioning the image of the sample taken by the imager in image-based assay into nonoverlapping regions;
ii. detecting and local monitoring marks in the image;
iii. generating a region-based mark grid for that region if more than 5 non-colinear monitoring marks are detected in the region;
iv. generating a mark grid for all other regions based on the monitoring marks detected in the image of the sample taken by the imager;
v. calculating a region-based homographic transform from the generated region-based mark grid for each region in (iii);
vi. calculating a homographic transform for all other regions not in (iii) based on the mark grid generated in (iv); and
vii. estimating the TLDs for each region based on the homographic transforms generated from (v) and (vi), determine the area of the objects in the image of the sample at each region and their size in the real world in the image-based assay.

T21. The method, device or system of any prior embodiment, wherein the assay is a medical, a diagnostic, a chemical or a biological test.

T22. The method, device or system of any prior embodiment, wherein said micro-feature is a cell.

T23. The method, device or system of any prior embodiment, wherein said micro-features is a blood cells.

T24. The method, device or system of any prior embodiment, wherein said micro-feature is a protein, peptide, DNA, RNA, nucleic acid, small molecule, cell, or nanoparticle.

T25. The method, device or system of any prior embodiment, wherein said micro-feature comprises a label.

T26. The method, device or system of any prior embodiment, wherein said algorithm comprises a computer program product comprising computer program code means adapted for, in at least one image:
(a) receiving an image of a sample, wherein the sample is loaded into a QMAX device and the image is taken by an imager connected to the QMAX device, wherein the image includes both the sample and monitoring marks;
(b) analyzing the image with a detection model and generating a 2-D data array of the image, wherein the 2-D data array includes probability data of the micro-feature for each location in the image, and the detection model is established through a training process that comprises:
i. feeding an annotated data set to a convolutional neural network, wherein the annotated data set is from samples that are the same type as the test sample and for the same micro-feature; and
ii. training and establishing the detection model by convolution; and
(c) analyzing the 2-D data array to detect local signal peaks with:
i. signal list process, or
ii. local searching process; and
(d) calculating the amount of the micro-feature based on local signal peak information.

T27. The method, device or system of any prior embodiment, wherein said algorithm comprises a computer program product comprising computer program code means applied and adapted for, in at least one image:
(a) representing a pattern of inference between an object in the sample and a pixel contour map of the said object in the image of the sample taken by the imager on the sample holding device,
(b) numerically reconstructing an image of at least one object detected from the inference pattern in the image of the sample and generate the contour masks enclosing the object identified by inference module where the object is in focus,
(c) identifying at least one portion of the image of the sample for at least one object in the selected portion of the image of the sample, and
(d) calculating, from said at least one portion, at least one feature of the object to identify the objects in the selected portion of the image of the sample taken by the imager,
(e) calculating, from the selected portion of the image of the sample, the count of the detected objects in the selected portion and its concentration,
when said program is run on a computing device, or in a computing Cloud by means of network connection.

T28. The method, device or system of any prior embodiment, wherein said algorithm comprises a computer program product comprising computer program code means adapted for, in at least one image:
(a) receiving an image of a sample, wherein the sample is loaded into a QMAX device and the image is taken by an imager connected to the QMAX device, wherein the image includes both the sample and monitoring marks; and
(b) analyzing the image to calculate the amount of the micro-feature, wherein the analyzing uses a detection model that is based on machine learning and the information provided by the image of the monitoring marks.

The method, device or system of any prior embodiment further comprises computer readable storage medium or memory storage unit comprising a computer program of any prior embodiment.

The method, device or system of any prior embodiment further comprises a computing arrangement or mobile apparatus comprising the calculation device of any prior embodiment.

The method, device or system of any prior embodiment further comprises a computing arrangement or mobile apparatus comprising the computer program product of any prior embodiment.

The method, device or system of any prior embodiment further comprises a computing arrangement or mobile apparatus comprising the computer readable storage medium or storage unit of any prior embodiment.

A device for analyzing a sample comprising:
a first plate, a second plate, a surface amplification layer, and a capture agent, wherein
(a) the first and second plats are movable relative to each other into different configurations, and have, on its respective surface, a sample contact area for contacting a sample that comprises a target analyte,
(b) the surface amplification layer is on one of the sample contact areas,
(c) the capture agent is immobilized on the surface amplification layer, wherein the capture agent specifically binds the target analyte,
wherein the surface amplification layer amplifies an optical signal from the target analyte or a label attached to the target analyte when they are is in proximity of the surface amplification layer much stronger than that when they are micron or more away,
wherein one of the configurations is an open configuration, in which the average spacing between the inner surfaces of the two plates is at least 200 um; and
wherein another of the configurations is a close configuration, in which, at least part of the sample is between the two plates and the average spacing between the inner surfaces of the plates is less than 200 um.

A device for analyzing a sample comprising:
a first plate, a second plate, a surface amplification layer, and a capture agent, wherein
(d) the first and second plats are movable relative to each other into different configurations, and have, on its respective surface, a sample contact area for contacting a sample that comprises a target analyte,
(e) the surface amplification layer is on one of the sample contact areas,
(f) the capture agent is immobilized on the surface amplification layer, wherein the capture agent specifically binds the target analyte,
wherein the surface amplification layer amplifies an optical signal from a label attached to the target analyte when it is in proximity of the surface amplification layer much stronger than that when it is micron or more away,
wherein one of the configurations is an open configuration, in which the average spacing between the inner surfaces of the two plates is at least 200 um;
wherein another of the configurations is a close configuration, in which, at least part of the sample is between the two plates and the average spacing between the inner surfaces of the plates is less than 200 um;
wherein the thickness of the sample in the closed configuration, the concentration of the labels dissolved in the sample in the closed configuration, and the amplification factor of the surface amplification layer are configured such that any the labels that are bound directly or indirectly to the capture agents are visible in the closed configuration without washing away of the unbound labels.

An apparatus comprising a device of any prior embodiment and a reader for reading the device.

A homogeneous assay method using a device of any prior embodiment, wherein the thickness of the sample in a closed configuration, the concentration of labels, and amplification factor of the amplification surface are configured to make the label(s) bound on the amplification surface visible without washing away of the unbound labels.

The method of any prior embodiment, wherein the method is performed by:
obtaining a device of any of any prior embodiment
depositing a sample on one or both of the plates when the plates are in an open configuration;
closing the plates to the closed configuration; and
reading the sample contact area with a reading device to produce an image of signals.

The device or method of any prior embodiment, wherein the labels bound to the amplification surface are visible in less than 60 seconds.

The device or method of any prior embodiment, wherein the method is a homogeneous assay in which the signal is read without using a wash step to remove any biological materials or labels that are not bound to the amplification surface.

The device or method of any prior embodiment, wherein the labels bound to the amplification surface are read by a pixelated reading method.

The device or method of any prior embodiment, wherein the labels bound to the amplification surface are read by a lump-sum reading method.

The device or method of any prior embodiment, wherein the assay has a detection sensitivity of 0.1 nM or less.

The device or method of any prior embodiment, wherein the method biological materials or labels that are not bound to the amplification surface are removed by a sponge prior to reading.

The device or method of any prior embodiment, wherein the signal amplification layer comprises a D2PA.

The device or method of any prior embodiment, wherein the signal amplification layer comprises a layer of metallic material.

The device or method of any prior embodiment, wherein the signal amplification layer comprises a continuous metallic film that is made of a material selected from the group consisting of gold, silver, copper, aluminum, alloys thereof, and combinations thereof.

The device or method of any prior embodiment, wherein the different metals layers either locally enhance or act as a reflector, or both, to enhance an optical signal.

The device or method of any prior embodiment, wherein the signal amplification layer comprises a layer of metallic material and a dielectric material on top of the metallic material layer, wherein the capture agent is on the dielectric material.

The device or method of any prior embodiment, wherein the metallic material layer is a uniform metallic layer, nanostructured metallic layer, or a combination.

The device or method of any prior embodiment, wherein the amplifies signals by plasmonic enhancement.

The device or method of any prior embodiment, wherein assay comprises detecting the labels by Raman scattering.

The device or method of any prior embodiment, wherein the capture agent is an antibody.

The device or method of any prior embodiment, wherein the capture agent is a polynucleotide.

The device or method of any prior embodiment, wherein the device further comprise spacers fixed on one of the plate, wherein the spacers regulate the spacing between the first plate and the second plate in the closed configuration.

The device or method of any prior embodiment, wherein the amplification factor of the surface amplification layer is adjusted to make the optical signal from a single label that is bound directly or indirectly to the capture agents visible.

The device or method of any prior embodiment, wherein the amplification factor of the surface amplification layer is adjusted to make the optical signal from a single label that is bound directly or indirectly to the capture agents visible, wherein the visible single labels bound to the capture agents are counted individually.

The device or method of any prior embodiment, wherein the spacing between the first plate and the second plate in the closed configuration is configured to make saturation binding time of the target analyte to the capture agents 300 sec or less.

The device or method of any prior embodiment, wherein the spacing between the first plate and the second plate in the closed configuration is configured to make saturation binding time of the target analyte to the capture agents 60 sec or less.

The device or method of any prior embodiment, wherein the amplification factor of the surface amplification layer is adjusted to make the optical signal from a single label visible.

The device or method of any prior embodiment, wherein the capture agent is a nucleic acid.

The device or method of any prior embodiment, wherein the capture agent is a protein.

The device or method of any prior embodiment, wherein the capture agent is an antibody.

The device or method of any prior embodiment, wherein the sample contact area of the second plate has a reagent storage site, and the storage site is approximately above the binding site on the first plate in the closed configuration.

The device or method of any prior embodiment, wherein the reagent storage site comprises a detection agent that binds to the target analyte.

The device or method of any prior embodiment, wherein the detection agent comprises the label.

The device or method of any prior embodiment, wherein the capture agent and detection agent both bind to the target analyte to form a sandwich that comprises the label.

The device or method of any prior embodiment, wherein the signal amplification layer comprises a layer of metallic material.

The device or method of any prior embodiment, wherein the signal amplification layer comprises a layer of metallic material and a dielectric material on top of the metallic material layer, wherein the capture agent is on the dielectric material.

The device or method of any prior embodiment, wherein the metallic material layer is a uniform metallic layer, nanostructured metallic layer, or a combination.

The device or method of any prior embodiment, wherein the amplification layer comprises a layer of metallic material and a dielectric material on top of the metallic material layer, wherein the capture agent is on the dielectric material, and the dielectric material layer has a thickness of 0.5 nm, 1 nm, 5 nm, 10 nm, 20 nm, 50 nm, 00 nm, 200 nm, 500 nm, 1000 nm, 2 um, 3 um, 5 um, 10 um, 20 um, 30 um, 50 um, 100 um, 200 um, 500 um, or in a range of any two values.

The device or method of any prior embodiment, wherein the method further comprises quantifying a signal in an area of the image to providing an estimate of the amount of one or more analytes in the sample.

The device or method of any prior embodiment, wherein the method comprises identifying and counting individual binding events between an analyte with the capture agent in an area of the image, thereby providing an estimate of the amount of one or more analytes in the sample.

The device or method of any prior embodiment, wherein the identifying and counting steps comprise: (1) determining the local intensity of background signal, (2) determining local signal intensity for one label, two labels, three labels, and four or more labels; and (3) determining the total number of labels in the imaged area.

The device or method of any prior embodiment, wherein the identifying and counting steps comprises: (1) determining the local spectrum of background signal, (2) determining local signal spectrum for one label, two labels, three labels, and four or more labels; and (3) determining the total number of labels in the imaged area.

The device or method of any prior embodiment, wherein the identifying and counting steps comprise: (1) determining the local Raman signature of background signal, (2) determining local signal Raman signature for one label, two labels, three labels, and four or more labels; and (3) determining the total number of labels in the imaged area.

The device or method of any prior embodiment, wherein the identifying and counting step comprises determining one or more of the local intensity, spectrum, and Raman signatures.

The device or method of any prior embodiment, wherein the method comprises quantifying a lump-sum signal in an area of the image, thereby providing an estimate of the amount of one or more analytes in the sample.

The device or method of any prior embodiment, wherein the sample contact area of the second plate has a reagent storage site, and the storage site is, in a closed configuration, approximately above the binding site on the first plate.

The device or method of any prior embodiment, wherein the method further comprises a step of labeling the target analyte with a detection agent.

The device or method of any prior embodiment, wherein the detection agent comprises a label.

The device or method of any prior embodiment, wherein the capture agent and detection agent both bind to the target analyte to form a sandwich.

The device or method of any prior embodiment, wherein the method further comprises measuring the volume of the sample in the area imaged by the reading device.

The device or method of any prior embodiment, wherein the target analyte is a protein, peptide, DNA, RNA, nucleic acid, small molecule, cell, or nanoparticle.

The device or method of any prior embodiment, wherein the image shows the position, local intensity, and local spectrum of the signals.

The device or method of any prior embodiment, wherein the signals are luminescence signals selected from the group consisting of fluorescence, electroluminescence, chemiluminescence, and electrochemiluminescence signals.

The device or method of any prior embodiment, wherein the signals are Raman scattering signals.

The device or method of any prior embodiment, wherein the signals are the forces due to local electrical, local mechanical, local biological, or local optical interaction between the plate and the reading device.

The method or device of any prior embodiment, wherein the spacers have pillar shape and nearly uniform cross-section.

The method or device of any prior embodiment, wherein the inter spacer distance (SD) is equal or less than about 120 um (micrometer).

The method or device of any prior embodiment, wherein the inter spacer distance (SD) is equal or less than about 100 um (micrometer).

The method or device of any prior embodiment, wherein the fourth power of the inter-spacer-distance (ISD) divided by the thickness (h) and the Young's modulus (E) of the flexible plate (ISD$^4$/(hE)) is $5 \times 10^6$ um$^3$/GPa or less.

The method or device of any prior embodiment, wherein the fourth power of the inter-spacer-distance (ISD) divided by the thickness (h) and the Young's modulus (E) of the flexible plate (ISD$^4$/(hE)) is $5 \times 10^5$ um$^3$/GPa or less.

The method or device of any prior embodiment, wherein the spacers have pillar shape, a substantially flat top surface, a predetermined substantially uniform height, and a predetermined constant inter-spacer distance that is at least about 2 times larger than the size of the analyte, wherein the Young's modulus of the spacers times the filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one).

The method or device of any prior embodiment, wherein the spacers have pillar shape, a substantially flat top surface, a predetermined substantially uniform height, and a predetermined constant inter-spacer distance that is at least about 2 times larger than the size of the analyte, wherein the Young's modulus of the spacers times the filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one), wherein the fourth power of the inter-spacer-distance (ISD) divided by the thickness (h) and the Young's modulus (E) of the flexible plate (ISD$^4$/(hE)) is $5 \times 10^6$ um$^3$/GPa or less.

The method or device of any prior embodiment, wherein the ratio of the inter-spacing distance of the spacers to the average width of the spacer is 2 or larger, and the filling factor of the spacers multiplied by the Young's modulus of the spacers is 2 MPa or larger.

The method or device of any prior embodiment, wherein the analytes is proteins, peptides, nucleic acids, synthetic compounds, or inorganic compounds.

The method or device of any prior embodiment, wherein the sample is a biological sample selected from amniotic fluid, aqueous humour, vitreous humour, blood (e.g., whole blood, fractionated blood, plasma or serum), breast milk, cerebrospinal fluid (CSF), cerumen (earwax), chyle, chime, endolymph, perilymph, feces, breath, gastric acid, gastric juice, lymph, mucus (including nasal drainage and phlegm), pericardial fluid, peritoneal fluid, pleural fluid, pus, rheum, saliva, exhaled breath condensates, sebum, semen, sputum, sweat, synovial fluid, tears, vomit, and urine.

The method or device of any prior embodiment, wherein the spacers have a shape of pillars and a ratio of the width to the height of the pillar is equal or larger than one.

The method or device of any prior embodiment, wherein the sample that is deposited on one or both of the plates has an unknown volume.

The method or device of any prior embodiment, wherein the spacers have a shape of pillar, and the pillar has substantially uniform cross-section.

The method or device of any prior embodiment, wherein the samples is for the detection, purification and quantification of chemical compounds or biomolecules that correlates with the stage of certain diseases.

The method or device of any prior embodiment, wherein the samples is related to infectious and parasitic disease, injuries, cardiovascular disease, cancer, mental disorders, neuropsychiatric disorders, pulmonary diseases, renal diseases, and other and organic diseases.

The method or device of any prior embodiment, wherein the samples is related to the detection, purification and quantification of microorganism.

The method or device of any prior embodiment, wherein the samples is related to virus, fungus and bacteria from environment, e.g., water, soil, or biological samples.

The method or device of any prior embodiment, wherein the samples is related to the detection, quantification of chemical compounds or biological samples that pose hazard to food safety or national security, e.g. toxic waste, anthrax.

The method or device of any prior embodiment, wherein the samples is related to quantification of vital parameters in medical or physiological monitor.

The method or device of any prior embodiment, wherein the samples is related to glucose, blood, oxygen level, total blood count.

The method or device of any prior embodiment, wherein the samples is related to the detection and quantification of specific DNA or RNA from biosamples.

The method or device of any prior embodiment, wherein the samples is related to the sequencing and comparing of genetic sequences in DNA in the chromosomes and mitochondria for genome analysis.

The method or device of any prior embodiment, wherein the samples is related to detect reaction products, e.g., during synthesis or purification of pharmaceuticals.

The method or device of any prior embodiment, wherein the samples is cells, tissues, bodily fluids, and stool.

The method or device of any prior embodiment, wherein the sample is the sample in the fields of human, veterinary, agriculture, foods, environments, and drug testing.

The method or device of any prior embodiment, wherein the sample is a biological sample is selected from hair, finger nail, ear wax, breath, connective tissue, muscle tissue, nervous tissue, epithelial tissue, cartilage, cancerous sample, or bone.

The method or device of any prior embodiment, wherein the inter-spacer distance is in the range of 5 um to 120 um.

The method or device of any prior embodiment, wherein the inter-spacer distance is in the range of 120 um to 200 um.

The method or device of any prior embodiment, wherein the flexible plates have a thickness in the range of 20 um to 250 um and Young's modulus in the range 0.1 to 5 GPa.

The method or device of any prior embodiment, wherein for a flexible plate, the thickness of the flexible plate times the Young's modulus of the flexible plate is in the range 60 to 750 GPa-um.

The method or device of any prior embodiment, wherein the layer of uniform thickness sample is uniform over a lateral area that is at least 1 mm$^2$.

The method or device of any prior embodiment, wherein the layer of uniform thickness sample is uniform over a lateral area that is at least 3 mm$^2$.

The method or device of any prior embodiment, wherein the layer of uniform thickness sample is uniform over a lateral area that is at least 5 mm$^2$.

The method or device of any prior embodiment, wherein the layer of uniform thickness sample is uniform over a lateral area that is at least 10 mm$^2$.

The method or device of any prior embodiment, wherein the layer of uniform thickness sample is uniform over a lateral area that is at least 20 mm$^2$.

The method or device of any prior embodiment, wherein the layer of uniform thickness sample is uniform over a lateral area that is in a range of 20 mm² to 100 mm².

The method or device of any prior embodiment, wherein the layer of uniform thickness sample has a thickness uniformity of up to +/−5% or better.

The method or device of any prior embodiment, wherein the layer of uniform thickness sample has a thickness uniformity of up to +/−10% or better.

The method or device of any prior embodiment, wherein the layer of uniform thickness sample has a thickness uniformity of up to +/−20% or better.

The method or device of any prior embodiment, wherein the layer of uniform thickness sample has a thickness uniformity of up to +/−30% or better.

The method, device, computer program product, or system of any prior embodiment having five or more monitoring marks, wherein at least three of the monitoring marks are not in a straight line.

The method, device, computer program product, or system of any prior embodiment, wherein each of the plates comprises, on its respective outer surface, a force area for applying an imprecise pressing force that forces the plates together;

The method, device, computer program product, or system of any prior embodiment, wherein one or both plates are flexible;

The method, device, computer program product, or system of any prior embodiment, wherein the fourth power of the inter-spacer-distance (IDS) divided by the thickness (h) and the Young's modulus (E) of the flexible plate (ISD4/(hE)) is 5×106 um3/GPa or less;

The method, device, computer program product, or system of any prior embodiment, wherein at least one of the spacers is inside the sample contact area;

The method, device, computer program product, or system of any prior embodiment, wherein fat specification of analyte The method, device, computer program product, or system of any prior embodiment, wherein fat specification of algorithms The method, device, computer program product, or system of any prior embodiment, wherein fat specification of impression force and press by hands.

The device, system, or method of any prior embodiment, wherein the algorithm is stored on a non-transitory computer-readable medium, and wherein the algorithm comprises instructions that, when executed, perform a method that utilizes monitoring marks of the device to determine a property corresponding to the analyte.

Some Examples of Marks

In the present invention, in some embodiments, the marks have the same shapes as the spacers.

In some embodiments, the marks is periodic or aperiodic.

In some embodiments, the distance between two marks are predetermined and known, but the absolution coordinates on a plate are unknown.

In some embodiments, the marks have predetermined and know shapes.

In some embodiments, the marks is configured to have a distribution in a plate, so that regardless the position of the plate, there are always the marks in the field of the view of the imaging optics.

In some embodiments, the marks is configured to have a distribution in a plate, so that regardless the position of the plate, there are always the marks in the field of the view of the imaging optics and that the number of the marks are sufficient to for local optical information.

In some embodiments, the marks are used to control the optical properties of a local area of the sample, whereas the area size is 1 um^2, 5 um^2, 10 um^2, 20 um^2, 50 um^2, 100 um^2, 200 um^2, 500 um^2, 1000 um^2, 2000 um^2, 5000 um^2, 10000 um^2, 100000 um^2, 500000 um^2, or a range between any of two values.

Use of "Limited Imaging Optics"

In the present invention, in some embodiments, the optical system for imaging the assay have "limited imaging optics". Some embodiments of limited imaging optics include, but not limited to:

1. The limited imaging optics system, comprising:
    imaging lenses;
    an imaging sensor;
    wherein the imaging sensor is a part of the camera of a smartphone;
    wherein at least one of the imaging lenses is a part of the camera of smartphone;
2. The limited imaging optics system of any prior embodiment, wherein: the optical resolution by physics is worse than 1 um, 2 um, 3 um, 5 um, 10 um, 50 um, or in a range between any of the two values.
3. The limited imaging optics system of any prior embodiment, wherein: the optical resolution per physics is worse than 1 um, 2 um, 3 um, 5 um, 10 um, 50 um, or in a range between any of the two values.
4. The limited imaging optics system of any prior embodiment, wherein: the preferred optical resolution per physics is between 1 um and 3 um;
5. The limited imaging optics system of any prior embodiment, wherein: the numerical aperture is less than 0.1, 0.15, 0.2, 0.2, 0.25, 0.3, 0.35, 0.4, 0.45, 0.5, or in a range between any of the two values.
6. The limited imaging optics system of any prior embodiment, wherein: the preferred numerical aperture is between 0.2 and 0.25.
7. The limited imaging optics system of any prior embodiment, wherein: the working distance is 0.2 mm, 0.5 mm, 1 mm, 2 mm, 5 mm, 10 mm, 20 mm, or in a range between any of the two values.
8. The limited imaging optics system of any prior embodiment, wherein: the working distance is 0.2 mm, 0.5 mm, 1 mm, 2 mm, 5 mm, 10 mm, 20 mm, or in a range between any of the two values.
9. The limited imaging optics system of any prior embodiment, wherein: the preferred working distance is between 0.5 mm to 1 mm.
10. The limited imaging optics system of any prior embodiment, wherein: the focal depth is 100 nm, 500 nm, 1 um, 2 um, 10 um, 100 um, 1 mm, or in a range between any of the two values.
11. The limited imaging optics system of any prior embodiment, wherein: the focal depth is 100 nm, 500 nm, 1 um, 2 um, 10 um, 100 um, 1 mm, or in a range between any of the two values.
12. The limited imaging optics system of any prior embodiment, wherein: the image sensor is a part of the smartphone camera module.
13. The limited imaging optics system of any prior embodiment, wherein: the diagonal length of the image sensor is less than 1 inch, ½ inch, ⅓ inch, ¼ inch, or in a range between any of the two values;

14. The limited imaging optics system of any prior embodiment, wherein: the imaging lenses comprises at least two lenses, and one lens is a part of the camera module of a smartphone.
15. The limited imaging optics system of any prior embodiment, wherein: at least one external lens is paired with the internal lens of smartphone.
16. The limited imaging optics system of any prior embodiment, wherein: the optical axis of external lens is aligned with the with the internal lens of smartphone, the alignment tolerance is less than 0.1 mm, 0.2 mm, 0.5 mm, 1 mm, or in a range between any of the two values.
17. The limited imaging optics system of any prior embodiment, wherein: the height of the external lens is less than 2 mm, 5 mm, 10 mm, 15 mm, 20 m, or in a range between any of the two values.
18. The limited imaging optics system of any prior embodiment, wherein: the preferred height of the external lens is between 3 mm to 8 mm.
19. The limited imaging optics system of any prior embodiment, wherein: the preferred height of the external lens is between 3 mm to 8 mm.
20. The limited imaging optics system of any prior embodiment, wherein: the diameter of the external lens is less than 2 mm, 4 mm, 8 mm, 10 mm, 15 mm, 20 mm, or in a range between any of the two values.
21. The limited imaging optics system of any prior embodiment, wherein: the optical magnification per physics is less than $0.1\times$, $0.5\times$, $1\times$, $2\times$, $4\times$, $5\times$, $10\times$, or in a range between any of the two values.
22. The limited imaging optics system of any prior embodiment, wherein: the preferred optical magnification per physics is less than $0.1\times$, $0.5\times$, $1\times$, $2\times$, $4\times$, $5\times$, $10\times$, or in a range between any of the two values.

The term "image-based assay" refers to an assay procedure that utilizes the image of the sample taken by an imager, where the sample can be and not limited to medical, biological and chemical sample.

The term "imager" refers to any device that can take image of the objects. It includes and not limited to cameras in the microscope, smartphone, or special device that can take image at various wavelength.

The term "sample feature" refers to some property of the sample that represents a potentially interesting condition. In certain embodiments, a sample feature is a feature that appears in an image of a sample and can be segmented and classified by a machine learning model. Examples of sample features include and not limited to analyte types in the sample, e.g. red blood cells, white blood cells, and tumor cells, and it includes analyte count, size, volume, concentration and the like.

The term "machine learning" refers to algorithms, systems and apparatus in the field of artificial intelligence that often use statistical techniques and artificial neural network to give computer the ability to "learn" (i.e., progressively improve performance on a specific task) from data without being explicitly programmed.

The term "artificial neural network" refers to a layered connectionist system inspired by the biological networks that can "learn" to perform tasks by considering examples, generally without being programmed with any task-specific rules.

The term "convolutional neural network" refers to a class of multilayer feed-forward artificial neural networks most commonly applied to analyzing visual images.

The term "deep learning" refers to a broad class of machine learning methods in artificial intelligence (AI) that learn from data with some deep network structures.

The term "machine learning model" refers to a trained computational model that is built from a training process in the machine learning from the data. The trained machine learning model is applied during the inference stage by the computer that gives computer the capability to perform certain tasks (e.g. detect and classify the objects) on its own. Examples of machine learning models include ResNet, DenseNet, etc. which are also named as "deep learning models" because of the layered depth in their network structure.

The term "image segmentation" refers to an image analysis process that partitions a digital image into multiple segments (sets of pixels, often with a set of bit-map masks that cover the image segments enclosed by their segment boundary contours). Image segmentation can be achieved through the image segmentation algorithms in image processing, such as watershed, grabcuts, mean-shift, etc., and through machine learning algorithms, such as MaskRCNN, etc.

The term "defects in the sample" refers to the artifacts that should not exist in an ideal sample condition or should not be considered in the features of the sample. They can come from and not limited to pollutants, e.g. dusts, air bobbles, etc., and from the peripheral objects in the sample, e.g. monitor marks (such as pillars) in the sample holding device. Defects can be of significant size and take significant amount of volume in the sample, e.g. air bubbles. They can be of different shape, in addition to their distribution and amounts in the sample—which are sample dependent.

The term "threshold" herein refers to any number that is used as, e.g., a cutoff to classify a sample feature as particular type of analyte, or a ratio of abnormal to normal cells in the sample. Threshold values can be identified empirically or analytically.

Use of "Limited Sample Manipulation"

In the present invention, in some embodiments, the sample position system for imaging the assay have "limited sample manipulation". Some embodiments of limited sample manipulation include, but not limited to: Description of the limited sample manipulation system:
1. The limited sample manipulation system, comprising: a sample holder; wherein the sample holder has a receptacle for taking in the sample card.
2. The limited sample manipulation system of any prior embodiment, wherein: the accuracy of positioning a sample in the direction along the optical axis is worse than 0.1 um, 1 um, 10 um, 100 um, 1 mm, or in a range between any of the two values.
3. The limited sample manipulation system of any prior embodiment, wherein: the preferred accuracy of positioning a sample in the direction along the optical axis is between 50 um and 200 um.
4. The limited sample manipulation system of any prior embodiment, wherein: the accuracy of positioning a sample in the plane perpendicular to the optical axis is worse than 0.01 um, 0.1 um, 1 um, 10 um, 100 um, 1 mm, or in a range between any of the two values.
5. The limited sample manipulation system of any prior embodiment, wherein: the preferred accuracy of positioning a sample in the plane perpendicular to the optical axis is between 100 um and 1 mm.
6. The limited sample manipulation system of any prior embodiment, wherein, the level error of positioning a sample card is worse than 0.01 degree, 0.1 degree, 0.5 degree, 1 degree, 10 degree, or in a range between any of the two values.

7. The limited sample manipulation system of any prior embodiment, wherein, the preferred level error of positioning a sample card is between 0.5 degree to 10 degree.

8. The limited sample manipulation system of any prior embodiment, wherein, the preferred level error of positioning a sample card is between 0.5 degree to 10 degree.

TLD and Volume Estimation with Monitor Marks

FIG. 2 shows an embodiment of the sample holding device, QMAX device, and its monitor marks, pillars, used in some embodiments of the present invention. Pillars in QMAX device make the gap between two parallel plates of the sample holding device uniform. The gap is narrow and relevant to the size of the analytes where analytes form a monolayer in the gap. Moreover, the monitor marks in QMAX device are in the special form of pillars, and consequently, they are not submerged by the sample and can be imaged with the sample by the imager in image based assay.

Examples TLD (True-Lateral-Dimension) Estimation with Monitor Marks

In some embodiments of the present invention for TLD and true volume estimation. the monitor marks (pillars) are used as detectable anchors. However, detecting monitor marks with an accuracy suitable for TLD estimation in image-based assay is difficult. This is because these monitor marks are permeated and surrounded by the analytes inside the sample holding device, and they are distorted and blurred in the image due to the distortion from the lens, light diffraction from microscopic objects, defects at microscopic level, mis-alignment in focusing, noise in the image of the sample, etc. And it becomes more difficult if imagers are cameras from commodity devices (e.g. cameras from smart phones), since those cameras are not calibrated by the dedicated hardware once they left the manufacture.

In the present invention, the detection and locating the monitor marks as detectable anchors for TLD estimation is formulated in a machine-learning framework and dedicated machine-learning model is built/trained to detect them in microscopic imaging. Moreover, the distribution of the monitor marks in some embodiments of the present invention is intentionally made to being periodic and distributed in a predefined pattern. This makes the approach in the present invention more robust and reliable.

In particular, an embodiment of the present invention comprises:

(8) load the sample to a sample holding device, e.g. QMAX device, wherein there are monitor marks with known configuration residing in the device that are not submerged in the sample and can be imaged by an imager;

(9) take an image of the sample in the sample holding device including analytes and monitor marks;

(10) build and train a machine learning (ML) model to detect the monitor marks in the image of the sample;

(11) detect and locate the monitor marks in the sample holding device from the image of the sample using the said ML detection model from (3);

(12) generate a mark grid from the detected monitor marks in (4);

(13) calculate a homographic transform based on the generated monitor mark grid;

(14) estimate and save the true-lateral-dimension of the image of the sample from the homographic transform from (6); and

(15) apply the estimated TLD from (7) in subsequent image-based assay to determine area, size, volume and concentration of the analytes.

In some embodiments of the present invention, region based TLD estimation and calibration are employed in image based assay. It comprises:

(13) load the sample to a sample holding device, e.g. QMAX device, wherein there are monitor marks in the device—not submerged in the sample and can be imaged by an imager in the image based assay;

(14) take an image of the sample in the sample holding device including analytes and monitor marks;

(15) build and train a machine learning (ML) model for detecting the monitor marks from the image of the sample taken by the imager;

(16) partition the image of the sample taken by the imager into non-overlapping regions;

(17) detect and locate monitor marks from the image of the sample taken by the imager using the ML model of (3);

(18) generate a region-based mark grid for each of the region with more than 5 non-colinear monitor marks detected in the local region;

(19) generate a mark grid for all regions not in (6) based on detected monitor marks from the image of the sample taken by the imager;

(20) calculate a region-specific homographic transform for each region in (6) based on its own region-based mark grid generated in (6);

(21) calculate a homographic transform for all other regions based on the mark grid generated in (7);

(22) estimate the region based TLD for each region in (6) based on the region based homographic transform generated in (8);

(23) estimate the TLD for other regions based on the homographic transform from (9); and

(24) save and apply the estimated TLDs from (10) and (11) in subsequent image-based assay on partitioned regions.

When the monitor marks are distributed in a pre-defined periodic pattern, such as in QMAX device, they occur and distribute periodically with a certain pitch, and as a result, detection the monitor marks become more robust and reliable in the procedures described above. This is because with periodicity, all monitor marks can be identified and determined from just few detected ones, and detection errors can be corrected and eliminated, should the detected location and configuration do not follow the pre-defined periodic pattern.

Volume Estimation with Monitor Marks

To estimate the true volume of the sample in the assay, it needs to remove the volume from defects and peripheral objects in the sample, an embodiment of the present invention comprises:

(1) load the sample to a sample holding device with monitor marks, e.g. QMAX device, and take an image of the sample by an imager;

(2) estimate the true-lateral-dimension (TLD) of the image by detecting the monitor marks in the image of the sample as anchors with methods and apparatus described above;

(3) detect and locate the defects, e.g. air bubbles, dusts, monitor marks, etc. in the image of the sample using a machine learning (ML) detection model—built and trained from images of the sample;

(4) determine the covering masks of the said detected defects in the image of the sample using a machine learning (ML) segmentation model—built and trained from images of the sample;

(5) determine a margin distance Δ—based on the size of the analytes/objects in the sample and the sample holding device (e.g. 2× max-analyte-diameter);

(6) determine Δ+ masks for all detected defects, i.e. masks with an extra margin Δ extension to their covering masks from (4);

(7) remove the detected defects based on Δ+ masks in (6) in the image of the sample;

(8) save the image from (7) and save the corresponding volume after removal of the volume with the corresponding Δ+ masks of (7) in subsequent image-based assay; and (9) reject the sample if the area of the removed Δ+ masks or the remaining true volume of the sample exceeds some preset threshold.

In present invention, defects are removed from the image of the sample with an extra margin Δ+ masks. This is important, because defects can impact their surroundings. For example, some defects can alter the height of the gap in the sample holding device, and local volume or concentration distribution around the defects can become different.

The term "monitoring mark", "monitor mark", and "mark" are interchangeable in the description of the present invention.

The term "imager" and "camera" are interchangeable in the description of the present invention.

The term "denoise" refers to a process of removing noise from the received signal. An example is to remove the noise in the image of sample as the image from the imager/camera can pick up noise from various sources, including and not limited to white noise, salt and pepper noise, Gaussian noise, etc. Methods of denoising, include and not limited to: linear and non-linear filtering, wavelet transform, statistic methods, deep learning. etc.

The term "image normalization" refers to algorithms, methods and apparatus that change the range of pixel intensity values in the processed image. For example, it includes and not limited to increasing the contrast by histogram stretching, subtract the mean pixel value from each image, etc.

The term "image sharping" refers to the process of enhance the edge contrast and edge content of the image.

The term "image scaling" refers to the process of resizing the image. For example, if an object is too small in the image of the sample, image scaling can be applied to enlarge the image to help the detection. In some embodiments of the present invention, images need to be resized to a specified dimension before input to a deep learning model for training or inference purposes.

The term "alignment" refers to transforming different set of data into one common coordinate system so that they be compared and combined. For example, in image processing, the different set of data are from and not limited to images from multiple imager sensors, and images from the same sensor but at different time, focusing depths, etc.

The term "super resolution" refers to the process of getting a higher resolution image from one or multiple low resolution images.

The term "deblur" refers to the process of removing blurring artifacts from the image, such as removing the blur caused by defocus, shake, motion, etc. in the imaging process.

In some embodiments of the current invention, methods and algorithms are devised to take advantage of the monitor marks in the sample holding device, e.g. QMAX device.

This includes and not limited to the estimation and adjustment of the following parameters in the imaging device:
1. shutter speed,
2. ISO,
3. focus (lens position),
4. exposure compensation,
5. white balance: temperature, tint, and
6. zooming (scale factor).

Examples of Image Processing/Analyzing Algorithms Used with Marks

In some embodiments of the present invention, the image processing/analyzing are applied and strengthened with the monitoring marks in the present invention. They include and not limited to the following image processing algorithms and methods:
1. Histogram-based operations include and not limited to:
   a. contrast stretching;
   b. equalization;
   c. minimum filter;
   d. median filter; and
   e. maximum filter.
2. Mathematics-based operations include and not limited to:
   a. binary operations: NOT, OR, AND, XOR, SUB, etc., and
   b. arithmetic-based operations: ADD, SUB, MUL, DIV, LOG, EXP, SQRT, TRIG, INVERT, etc.
3. Convolution-based operations in both spatial and frequency domain, include and not limited to Fourier transform, DCT, Integer transform, wavelet transform, etc.
4. Smoothing operations include and not limited to:
   a. linear filters: uniform filter, triangular filter, gaussian filter, etc., and
   b. non-linear filters: medial filter, kuwahara filter, etc.
5. Derivative-based operations include and not limited to:
   a. first derivatives: gradient filters, basic derivative filters, prewitt gradient filters, sobel gradient filters, alternative gradient filters, gaussian gradient filters, etc.;
   b. second derivatives: basic second derivative filter, frequency domain Laplacian, Gaussian second derivative filter, alternative laplacian filter, second-derivative-in-the-gradient-direction (SDGD) filter, etc., and
   c. other filters with higher derivatives, etc.
6. Morphology-based operations include and not limited to:
   a. dilation and erosion;
   b. boolean convolution;
   c. opening and closing;
   d. hit-and-miss operation;
   e. segmentation and contour;
   f. skeleton;
   g. propagation;
   h. gray-value morphological processing: Gray-level dilation, gray-level erosion, gray-level opening, gray-level closing, etc.; and
   i. morphological smoothing, morphological gradient, morphological Laplacian, etc.

Other Examples of Image Processing/Analyzing Techniques

Figure 11:
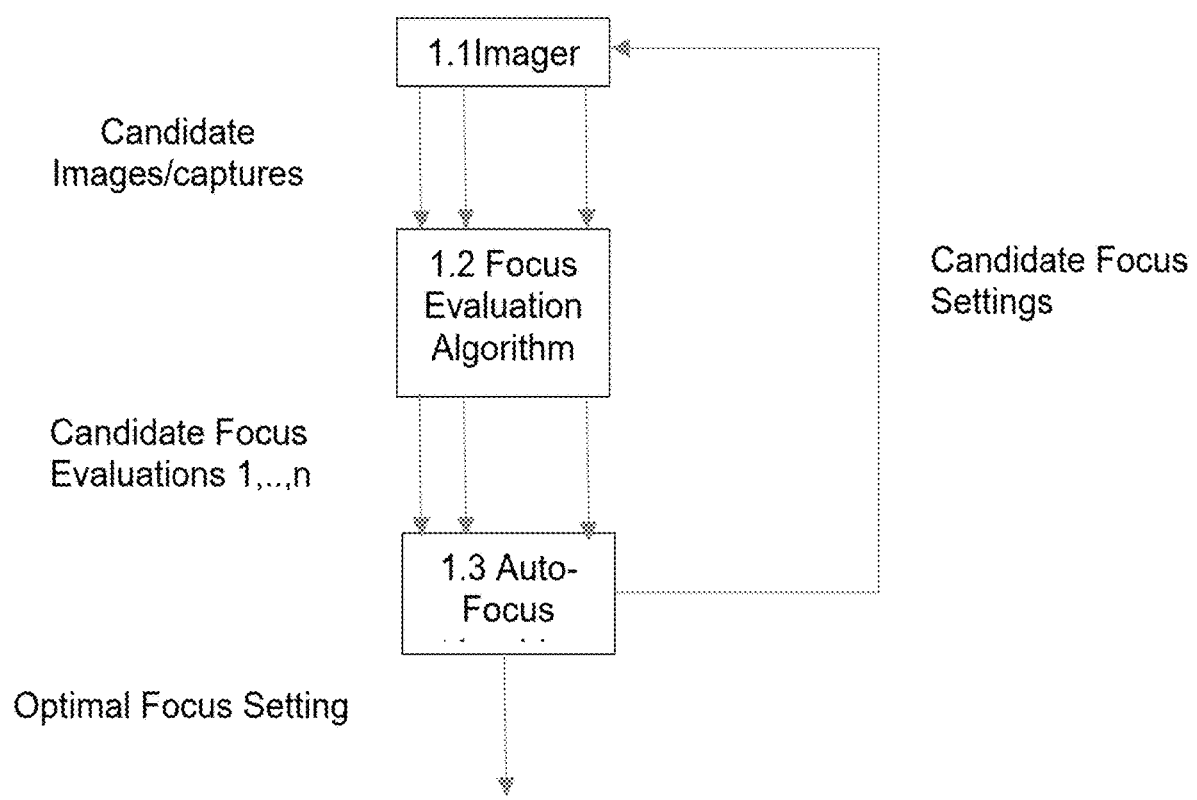
FIG. 11 shows a diagram of auto-focus in microscopic photography

In some embodiments of the present invention, image processing/analyzing algorithms are used together with and enhanced by the monitoring marks described in this disclosure. They include and not limited to the following:
1. Image enhancement and restoration include and not limited to a. sharpen and un-sharpen,
b. noise suppression, and
c. distortion suppression.
2. Image segmentation include and not limited to:
   a. thresholding—fixed thresholding, histogram-derived thresholding, Isodata algorithm, background-symmetry algorithm, triangle algorithm, etc.;
   b. edge finding—gradient-based procedure, zero-crossing based procedure, PLUS-based procedure, etc.;
   c. binary mathematical morphology—salt-or-pepper filtering, Isolate objects with holes, filling holes in objects, removing border-touching objects, exo-skeleton, touching objects, etc.; and
   d. gray-value mathematical morphology—top-hat transform, adaptive thresholding, local contrast stretching, etc.
3. Feature extraction and matching include and not limited to:
   a. independent component analysis;
   b. Isomap;
   c. principle component analysis and kernel principal component analysis;
   d. latent semantic analysis;
   e. least squares and partial least squares;
   f. multifactor dimensionality reduction and nonlinear dimensionality reduction;
   g. multilinear principal component analysis;
   h. multilinear subspace learning;
   i. semidefinite embedding; and
   j. autoencoder/decoder.
4. Object detection, classification, and localization
5. Image understanding Improvement of Microscopic Imaging Using Monitoring Mark Monitoring marks can be used to improve focus in microscopic imaging. In particular, Marks with sharp edge will provide detectable (visible features) for the focus evaluation algorithm to analyze the focus conditions of certain focus settings especially in low lighting environment and in microscopic imaging. In some embodiments of the present invention, the monitoring marks on the card are used to do microscopic image correction and enhancement. For example, focus evaluation algorithm is at the core part in the auto-focus implementations as shown in FIG. 11.

For some diagnostic applications (e.g. colorimetric, absorption-based hemoglobin test, and CBC for samples with very low cell concentrations), detectable features provided by the analyte in the image of the sample is often not enough for the focus evaluation algorithm to run accurately and smoothly. Marks with sharp edges, e.g. the monitor marks in QMAX device, provide additional detectable features for the focus evaluation program to achieve the accuracy and reliability required in the image-based assay.

For some diagnostic applications, analytes in the sample are distributed unevenly. Purely relying on features provided by analytes tends to generate some unfair focus setting that gives high weight of focusing on some local high concentration regions and low analyte concentration regions are off target. In some embodiments of the current invention, this effect is controlled with the focusing adjustments from the information of the monitor marks which have strong edges and are distributed evenly with a accurately processed periodic pattern.

Using Super Resolution from Single Image to Generate Image with Higher Resolutions.

Each imager has an imaging resolution limited in part by the number of pixels in its sensor that varies from one million to multimillion pixels. For some microscopic imaging applications, analytes are of small or tiny size in the sample, e.g. the size of platelets in human blood has a dimeter about 1.4 um. The limited resolution in the image sensors put a significant constraint on the capability of the device in the image based assay, in addition to the usable size of FOV, when certain number of pixels is required by the target detection programs.

Single Image Super Resolution (SISR) is a technique to use image processing and/or machine learning techniques to up-sample the original source image to a higher resolution and remove as much blur caused by interpolation as possible, such that the object detection program can run on the newly generated images as well. This will significantly reduce the constraints mentioned above and enable some otherwise impossible applications. Marks with known shape and structure (e.g. the monitor marks in QMAX) can serve as local references to evaluate the SISR algorithm to avoid over-sharpening effect generated with most existing state-of-art algorithms.

In some embodiments of the present invention, image fusion is performed to break the physical SNR (signal-to-noise) limitation in image-based assay.

Signal to noise ratio measures the quality of the image of the sample taken by the imager in microscopic imaging. There is a practical limitation for an imaging device due to the cost, technology, fabrication, etc. In some situation, e.g. in mobile healthcare, the application requires higher SNR than the the imaging device can provide. In some embodiments of the present invention, multiple images are taken and processed (with same and/or different imaging setting, e.g. an embodiment of a 3D fusion to merge multiple images focused at different focus depth into one super focused image) to generate output image(s) with higher SNR to make such applications possible.

However, images taken by an imager or multiple imagers tend to have some imperfections and defects, caused by physical limitation and implementation constraints. The situation becomes acute in the microscopic imaging of the sample in image based assay, because the analytes in the sample are of tiny size and often without distinct edge features. In some embodiments of the present invention, monitor marks in the image holding device, e.g. the QMAX device, are used for enhanced solutions.

Figure 12:
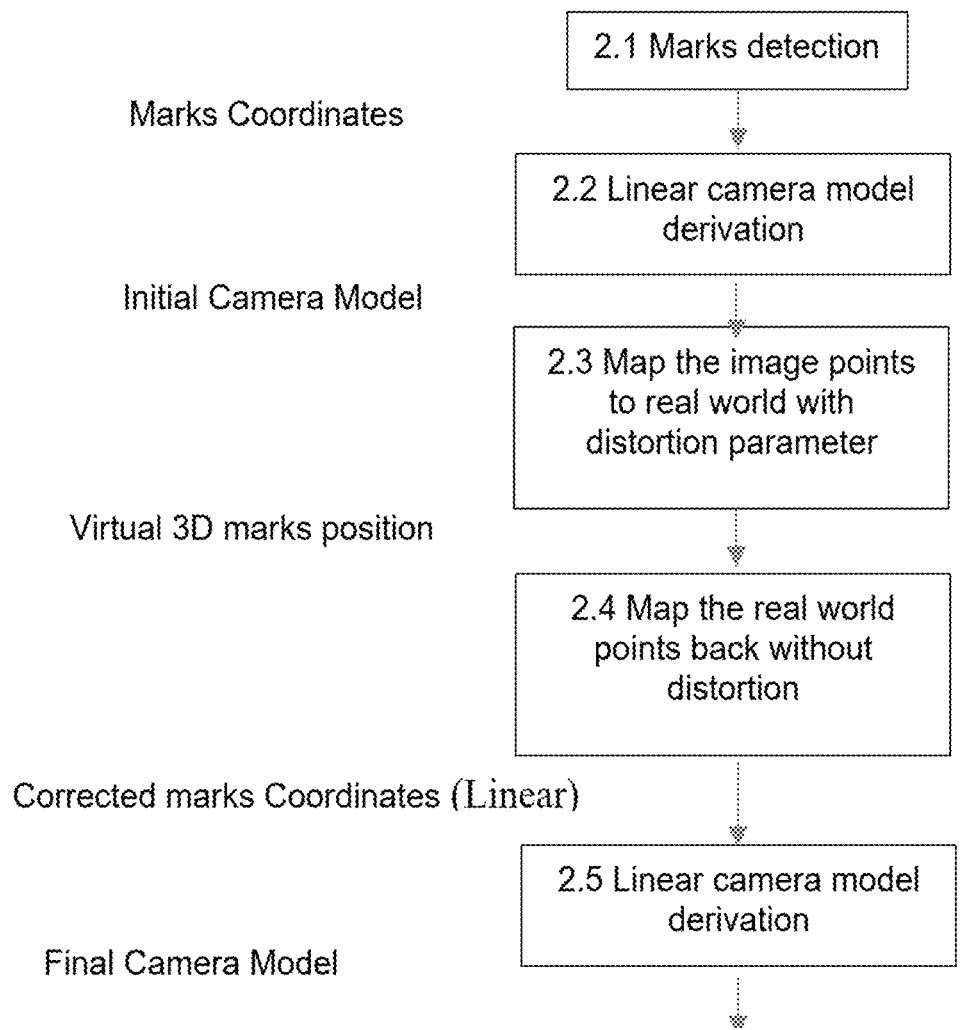
FIG. 12 shows the diagram of distortion removal with known distortion parameter
Figure 13:
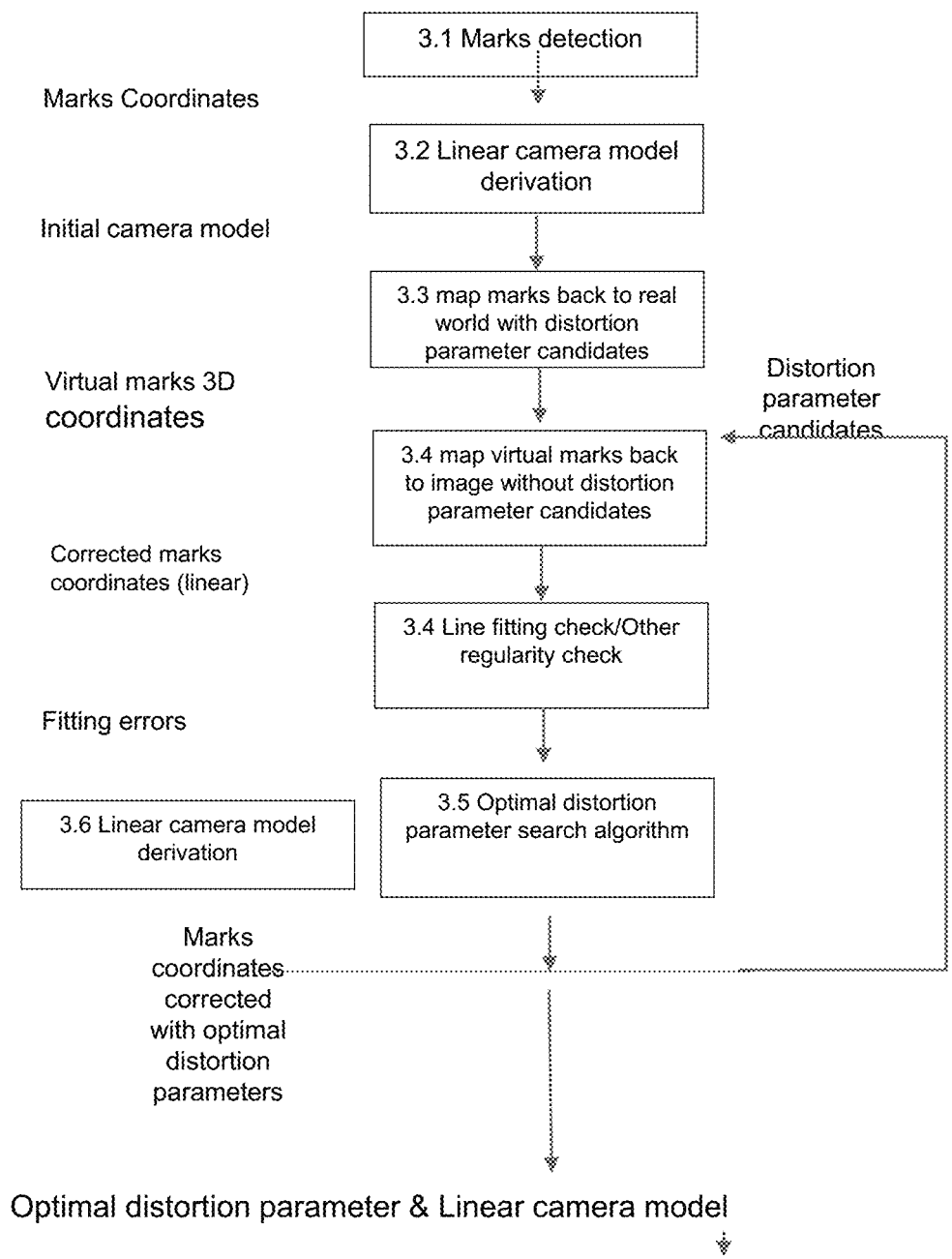
FIG. 13 shows the diagram of distortion removal and camera adjustment without knowing the distortion parameter

One such embodiment is to handle distortions in the image of the sample taken by the imager. FIG. 12 is a diagram of a refinement to the general camera model. The situation is relatively simple when the distortion parameter is known (most manufacture gives a curve/table for their lens to describe ratio distortion, other distortions can be measured in well-defined experiments). However, when the distortion parameters are unknown with the monitoring marks, it can iteratively estimate distortion parameters using regularly and even periodically placed monitor marks of the sample holding device (e.g. QMAX device) without requiring a single coordinate references as shown in FIG. 13.

Some Additional Embodiments

In the present invention, in some embodiments, the sample holding device has a flat surface with some special monitor marks for the purpose of analyzing the microfeatures in the image-based assay. Some embodiments of the present invention are listed below:

A1: True-lateral-dimension (TLD) estimation for the microscopic image of the sample in the image-based assay. True Lateral Dimension (TLD) determines the physical dimension of the imaged analytes in the real would, and it also determines the coordinates of image of the sample in the real world that is related to the concentration estimation in image-based assay. The monitor marks can be used as detectable anchors to determine the TLD and improve the accuracy in the image-based assay. In an embodiment of the present invention, the monitor marks are detected using machine-learning model for the monitor marks, from which the TLD of the image of the sample is derived. Moreover, if the monitor marks have a periodic distribution pattern on the flat surface of the sample holding device, the detection of monitor marks and the per-sample based TLD estimation can become more reliable and robust in image-based assay.

A2: Analyzing the analytes using the measured response from the analyte compound at a specific wavelength of light or at multiple wavelength of light to predict the analyte concentration. Monitor marks that are not submerged in the sample can be used to determine the light absorption of the background corresponding to no analyte compound—to determine the analyte concentration through light absorption, e.g. HgB test in complete-blood-test. In addition, each monitor mark can act as an independent detector for the background absorption to make the concentration estimate robust and reliable.

A3: Focusing in microscopic imagine for image-based assay. Evenly distributed monitor marks can be used to improve the focus accuracy. (a) It can be used to provide minimum amount of vision features for samples with no/less than necessary number of features to do reliable focusing and this can be performed in low light due to the edge contents of the monitor marks. (b) It can be used to provide vision features when features in the sample is unevenly distributed to make the focus decision fairer. (c) It can provide a reference for local illumination conditions that have no/less/different impacts by the content of sample to adjust the weight in focus evaluation algorithms.

Figure 14:
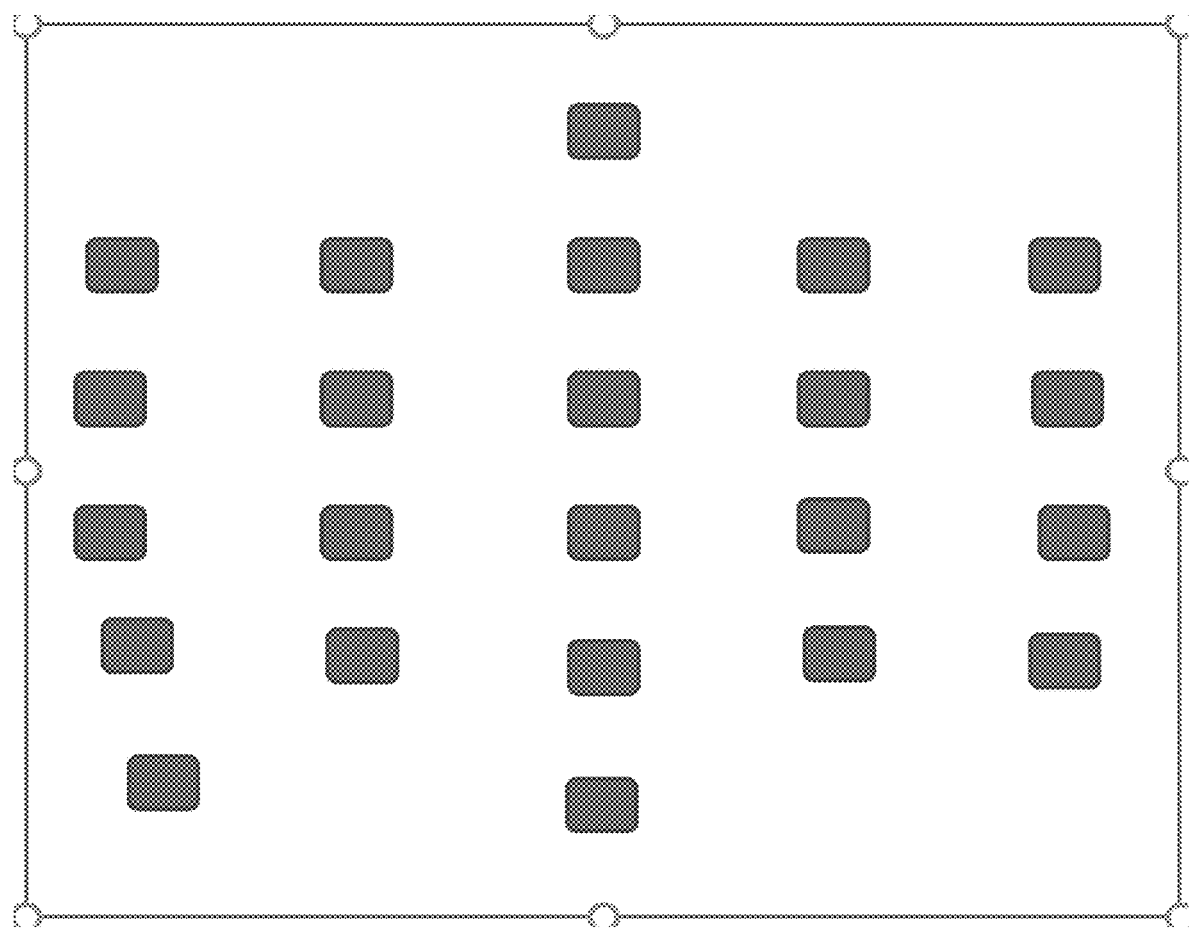
FIG. 14 shows the distorted positions of the monitoring mark pillars in the image of the sample from the distortion of the imager.

A4: Monitor marks can be used as references to detect and/or correct image imperfection caused by but not limited to: unevenly distributed illumination, various types of image distortions, noises, and imperfect image pre-processing operations. (a) For example, as shown in FIG. 14 positions of the marks in the image of the sample can be used to detect and/or correct the ratio distortion when the straight line in 3D world is mapped to the image into a curve. Ratio distribution parameters of the entire image can be estimated based on the position changes of the marks. And the value of ratio distortion parameters can be iteratively estimated by linear testing of horizontal/vertical lines in reproduced images with distortion removal based on assumed ratio distortion parameters.

Examples of Machine Learning (ML) calculation

B1: One way of using machine learning is to detect the analytes in the image of the sample and calculate the bounding boxes that covering them for their locations, and it is performed using trained machine-learning models in the inference process of the processing. Another way of using machine learning method to detect and locate analytes in the image of the sample is to build and train a detection and segmentation model which involving the annotation of the analytes in the sample image at pixel level. In this approach, analytes in the image of the sample can be detected and located with a tight binary pixel masks covering them in image-based assay.

B2: When testing hemoglobin in human blood, images are taken at the given narrowband wavelength, and then the average energy pass through the analytes areas and reference areas are analyzed. Based on the known rate of absorption of analytes at the given wavelength and the height of the analyte sample area, the concentration can be estimated. However, this measurement has noises. To cancel out the noise, multiple images can be taken using different wavelength of light, and use machine learning regression to achieve a more accurate and robust estimation. In some embodiments of the present invention, the machine learning based inference takes multiple input images of the sample, taken at different wavelength, and output a single concentration number.

Example of Identifying Error Risk to Improve the measurement reliability

In some embodiments, a method for improving the reliability of the assay, the method comprising:

(a) imaging the sample on the QMAX card;
(b) analyzing the error risk factor; and
(c) rejecting the card from reporting a measurement result of the card, if the error risk factor is higher than a threshold;

wherein the error risk factor is one of the following factors or any combination thereof. The factors are, but not limited to, (1) edge of blood, (2) air bubble in the blood, (3) too small blood volume or too much blood volume, (4) blood cells under the spacer, (5) aggregated blood cells, (6) lysed blood cells, (7) over exposure image of the sample, (8) under exposure image of the sample, (8) poor focus of the sample, (9) optical system error as wrong lever position, (10) not closed card, (11) wrong card as card without spacer, (12) dust in the card, (13) oil in the card, (14) dirty out of the focus plane one the card, (15) card not in right position inside the reader, (16) empty card, (17) manufacturing error in the card, (18) wrong card for other application, (19) dried blood, (20) expired card, (21) large variation of distribution of blood cells, (22) not blood sample or not target blood sample and others.

In some embodiments, the error risk analyzer is able to detect, distinguish, classify, revise and/or correct following cases in biological and chemical application in device: (1) at the edge of sample, (2) air bubble in the sample, (3) too small sample volume or too much sample volume, (4) sample under the spacer, (5) aggregated sample, (6) lysed sample, (7) over exposure image of the sample, (8) under exposure image of the sample, (8) poor focus of the sample, (9) optical system error as wrong lever, (10) not closed card, (11) wrong card as card without spacer, (12) dust in the card, (13) oil in the card, (14) dirty out of the focus plane one the card, (15) card not in right position inside the reader, (16) empty card, (17) manufacturing error in the card, (18) wrong card for other application, (19) dried sample, (20) expired card, (21) large variation of distribution of blood cells, (22) wrong sample and others.

wherein the threshold is determined from a group test.

wherein the threshold is determined from machine learning.

Wherein the monitoring marks are used as comparison to identify the error risk factor.

Wherein the monitoring marks are used as comparison to assess the threshold of the error risk factor.

The following brief summary is not intended to include all features and aspects of the present invention.

Disclosed herein are methods and systems of image-based assay to analyze the morphological, molecular, physical, colorimetric and pathological features of the sample in bio, chemical, and medical diagnostics. For example, in CBC (complete-blood-count) test, it is to characterize the blood cells, such as red blood cells, white blood cells and so forth, from the image of the sample; in molecular and nucleic acid test, it is to capture the binding of antigen and antibodies or particles in the image of the sample taken under various conditions with reagents, and in colorimetric test, it is to determine the sample feature and particle concentration from the absorption of light at various wavelength captured in the image of the sample.

However, all these tests are performed with many unknown factors from the sample preparation to the device operation during the test, which can affect the trustworthy of the test results. For example, in blood test, the common unknown factors include and not limited to cell aggregations, dusts, air bubbles, uneven distribution, dry texture, and so forth. There is a critical need for methods and systems that can put these unknown factors in control which is in addition to the regular testing procedures.

One aspect of the methods and systems disclosed herein is a trustworthy framework in image-based assay. It runs in parallel with the regular image-based assay but it analyzes the meta features of the sample being tested from the same image used in the image-based assaying. These meta-features about the sample being tested provide the critical information to determine the trustworthy of the test results. Moreover, in some embodiments, these meta features about the image-based assay are captured and characterized by dedicated machine-learning models that can perform in noisy and diverse environments.

In particular, critical methods and systems are disclosed for validating the trustworthy of the test results, including:
  (a) Method and system to detect uneven distribution of the sample in the image-based assay, wherein an uneven distributed (smeared) sample is a cause of inaccuracy and error.
  (b) Method and system to detect dry textures of the sample in the image-based assay, wherein a partially dried (e.g. blood) sample can impact the accuracy of the test result.
  (c) Method and system to detect aggregations of the sample in the image-based assay, wherein the degree of aggregations in the test sample is a strong indication of the sample quality, the reagent used for the test, and so forth.
  (d) Method and system to detect the defects in the sample for the image-based assay, wherein the defects in the sample include and not limited to dusts, air bubbles, fibers, and so forth.

The proposed trustworthy test framework for image-based assay is powered by machine learning, wherein the dedicated machine learning models are built for fast and robust estimation of the trustworthy of the assaying result. It has been applied to practical applications such as blood and colorimetric tests.

In addition, a dedicated segmentation method is disclosed herein to obtain the fine grind contour mask level segmentation of the objects in the image-based assay. It is applied to cell detection and characterization, and also to trustworthy assaying to detect and characterize defects and abnormalities in the sample.

The proposed approach applies the machine learning based segmentation to the segmentation at the bounding box level, which is fast and easy to build. Then for each object in the bounding box, a dedicated morphological analysis method is devised to obtain the fine grind contour mask segmentation. This method is applied to many applications in image-based assay with efficacy.

Another aspect of the methods and systems disclosed herein is a framework of image-based assay with a specially designed sample holder, wherein the sample holder has a monitoring mark structure in the form of pillars, visible from the image of the sample in the sample holder during the image-based assay. The specially designed sample holder opens many new capabilities and features in image-based assay, including:
  (a) Method and system for the true-lateral-dimension (TLD) correction for image based assay, wherein TLD determines the dimension of the cells in the image to their real size in physical world, a critical parameter that affects the accuracy of the assaying results, because of the distortions in the image of the sample taken by the imager.
  (b) Method and system of spectrophotometer in the image system based on the image of the sample with the said sample holder, wherein the image of the sample is divided into two sub-regions using machine learning models. The first sub-regions corresponding to the sample and the second sub-regions corresponding to pillars. The spectrochemistry measurements are made on the two class of sub-regions based on one or multiple images taken under single or multiple wavelength of lights, and these data are collected and applied to derive the chemical and physical properties, such as the compound concentration, of the sample.
  (c) Method and systems of determining the sample volume based on the monitoring mark pillars with uniform height, wherein the volume of the sample can be determined by the surface area of the sample in image, because the sample is sandwiched between two parallel plates of the sample holder with a uniform gap controlled by pillars. This proposed structure enables to virtually remove any visible defects, pillars, dusts, air bubbles, and so forth from the sample and still has a precise control of the sample volume after the removal for assaying.
  (d) Method and systems of improving the microscopic imaging quality in image-based assay using the monitoring mark pillars, wherein the local illumination, evenness of the lighting, and ratio distortion control can be based on the images of the detected pillars in the image-based assay. These parameters are hard to control in microscopic imaging, especially with different types of samples being imaged for assaying.

In general, detecting, locating and segmenting pillars in the image of the sample is a challenge problem especially in microscopic images such as those from the image-based assay. In the described approach and embodiments, the special machine learning models are also built for pillar detection, and the segmentation method described above is combined with the true-lateral-dimension (TLD) correction for high precision estimation of pillar location, shape contour and size, making the abovementioned methods effective for image-based assay.

The invention claimed is:
1. A method for improving the accuracy of an assay device that detects an analyte in a sample, wherein the sample, the assay device, or an operation of the assay device has one or more imperfect conditions, the method comprising:
  (a) detecting, using the assay device, under the one or more imperfect conditions, the analyte in the sample placed in a sample holder of the assay device, to generate a detection result;
  (b) determining a trustworthiness of the detection result by:
    (i) imaging, using an imager, the sample in the sample holder to obtain image(s), and

(ii) analyzing the image(s) and a reliability analysis of the detection result, using at least one of a machine learning algorithm, a statistical model, a lookup table, or any combination of, to generate a trustworthiness of the detection results, wherein the trustworthiness is higher when the reliability analysis shows that the detection result has a lesser likelihood of being inaccurate; and (c) reporting the detection result, if the trustworthiness is higher than a predetermined trustworthiness threshold; otherwise not reporting the detection result.

2. A system for improving the accuracy of an assay device that detects an analyte in a sample, wherein the sample, the assay device, or an operation of the assay device has one or more imperfect conditions, the system comprising:

(a) an assay device that detects, under the one or more imperfect conditions, the analyte in the sample to generate a detection result, wherein the assay device has a sample holder that holds the sample;

(b) an imager that images the sample in the sample holder to obtain images;

(c) a non-transitory storage medium that stores an algorithm that analyzes the image(s) and a reliability of the detection result to generate a trustworthiness of the detection results, wherein the trustworthiness is higher when the analysis of the reliability shows that the detection result has a lesser likelihood of being inaccurate, and wherein the algorithm comprises at least a machine learning algorithm, a statistical model, a lookup table, or any combination of;

(d) a processor that executes the algorithm to determine the trustworthiness of the detection result; and (e) a data-output device that outputs the detection result, if the trustworthiness is higher than a predetermined trustworthiness threshold; otherwise not reporting the detection result.

3. The system of claim 2, the assay device comprises an imager that images the sample and detects an analyte in the sample.

4. The system of claim 2, wherein in determining the trustworthiness, under the one or more imperfection condition comprises: (1) edge of blood, (2) air bubble in the blood, (3) too small blood volume or too much blood volume, (4) blood cells under the spacer, (5) aggregated blood cells, (6) lysed blood cells, (7) over exposure image of the sample, (8) under exposure image of the sample, (8) poor focus of the sample, (9) optical system error as wrong lever position, (10) not closed card, (12) wrong card as card without spacer, (12) dust in the card, (14) oil in the card, (14) dirty out of the focus plane one the card, (15) card not in right position inside the reader, (16) empty card, (17) manufacturing error in the card, (18) wrong card for other application, (19) dried blood, (20) expired card, (21) large variation of distribution of blood cells, (22) none blood sample or (23) none targeted blood sample.

5. The system of claim 2, wherein the one or more imperfect condition comprises having dusts, air bubble, oil, non-sample materials, or any combination of thereof.

6. The system of claim 2, wherein the assay device performs a cellular assay, immunoassay, nucleic acid assay, colorimetric assay, luminescence assay, or any combination of thereof.

7. The system of claim 2, wherein the assay devices comprises two plates facing each other with a gap, wherein at least a part of the sample is inside of a gap and wherein one or both of the two plates comprises spacers that regulate spacing between the two plates, and wherein a sample thickness is regulated by the two plates and the spacers, and is 200 nm or less.

8. The method of claim 7, wherein the two plates are movable relative to each other into an open configuration and a closed configuration, wherein, in the open configuration, the two plates are partially or completely separated apart, the spacing between the plates is not regulated by the spacers, and the sample is deposited on one or both of the plates; and wherein, in the closed configuration, which is configured after the sample is deposited in the open configuration, the sample is compressed by the two plates into a thin layer, wherein the thickness of the layer is confined by a surfaces of the plates and is regulated by the plates and the spacers plates movable to each other and spacers that regulate the spacing between the plates.

9. The system of claim 2, wherein the sample is selected from cells, tissues, bodily fluids, and stool.

10. The system of claim 2, wherein the sample is amniotic fluid, aqueous humour, vitreous humour, blood, breast milk, cerebrospinal fluid (CSF), cerumen (earwax), chyle, chime, endolymph, perilymph, feces, gastric acid, gastric juice, lymph, mucus, pericardial fluid, peritoneal fluid, pleural fluid, pus, rheum, saliva, sebum, semen, sputum, sweat, synovial fluid, tears, vomit, urine, or exhaled breath condensate.

11. The system of claim 2, wherein the analyte comprising a molecule, a cell, a tissue, a virus, and a nanoparticle, wherein the molecule comprising protein, peptides, DNA, RNA, nucleic acid, synthetic compounds, inorganic compounds, or other molecules.

12. The system of claim 2, wherein the samples are the samples that are non-flowable but deformable.

13. The system of claim 2, wherein the predetermined trustworthiness threshold is determined by the training and evaluation of data.

14. The method of claim 8, wherein the spacers are a monitoring mark, wherein the spacers have a substantially uniform height that is equal to or less than 200 microns, and a fixed inter-spacer-distance (ISD).

15. The method of claim 14, wherein the monitoring mark is used for estimating the TLD (true-lateral-dimension) and true volume estimation.

16. The method of claim 3, wherein the image is obtained by the imager of the assay device for detecting the analyte in the sample and the image(s) for determining the trustworthiness of the detection result are the same image.

17. The method of claim 3, wherein step (b) of determining the trustworthiness of the detection result comprises a focus checking of the imager of the assay device.

18. The method of claim 3, wherein step (b) of determining the trustworthiness of the detection result comprises an evenness of analyte distribution in the sample.

19. The system of claim 2, wherein step (b) of determining the trustworthiness of the detection result comprises an analyze and detection for aggregated analytes in the sample.

20. The system of claim 2, wherein step (b) of determining the trustworthiness of the detection result comprises an analyze for dry-texture in the image of the sample in the sample.

21. The system of claim 2, wherein step (b) of determining the trustworthiness of the detection result comprises an analyze for defects in the sample.

22. The system of claim 2, wherein step (b) further comprises a correction of camera parameters and conditions as distortion removal, temperature correction, brightness correction, contrast correction.

23. The system of claim 2, wherein the algorithm further comprising a statistical method or lookup table, or any combination of thereof.

24. The method of claim 14, wherein the monitoring mark are pillar arrays.

25. The method of claim 8, wherein the spacers have an inter spacer distance (ISD) that is equal or less than about 120 urn (micrometer).

26. The system of claim 2, wherein the step of detecting the analyte comprises detecting a signal, wherein the signal is a luminescence signal selected from the group consisting of fluorescence, electroluminescence, chemiluminescence, and electrochemiluminescence.

27. The method of claim 14, wherein the one or more imperfect conditions of the assay device comprising, the sample holders operation and conditions, sample conditions, or reagent condition, or measurement instrument conditions.

\* \* \* \* \*